United States Patent
Yan et al.

(10) Patent No.: US 10,289,598 B2
(45) Date of Patent: May 14, 2019

(54) NON-BLOCKING NETWORK

(71) Applicant: Futurewei Technologies, Inc., Plano, TX (US)

(72) Inventors: Peter Yan, Frisco, TX (US); Alex Elisa Chandra, Plano, TX (US); YwhPyng Harn, Milpitas, CA (US); Xiaotao Chen, Basking Ridge, NJ (US); Alan Gatherer, Richardson, TX (US); Fang Yu, San Jose, CA (US); Xingfeng Chen, Shanghai (CN); Zhuolei Wang, Shanghai (CN); Yang Zhou, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 99 days.

(21) Appl. No.: 15/096,982

(22) Filed: Apr. 12, 2016

(65) Prior Publication Data
US 2017/0293587 A1    Oct. 12, 2017

(51) Int. Cl.
*G06F 13/38*    (2006.01)
*G06F 13/42*    (2006.01)
*G06F 13/40*    (2006.01)

(52) U.S. Cl.
CPC ...... *G06F 13/4265* (2013.01); *G06F 13/4022* (2013.01); *G06F 13/4045* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 6,526,462 B1 | 2/2003 | Elabd | |
| 6,826,640 B1 | 11/2004 | Chang | |
| 6,944,170 B2* | 9/2005 | Minkenberg | H04L 49/25 370/411 |
| 9,584,431 B2* | 2/2017 | Szymanski | |
| 2003/0110306 A1 | 6/2003 | Bailis et al. | |
| 2003/0208653 A1 | 11/2003 | Butcher et al. | |

(Continued)

FOREIGN PATENT DOCUMENTS

| | | |
|---|---|---|
| CN | 1908927 A | 2/2007 |
| WO | 2005017752 A1 | 2/2005 |

OTHER PUBLICATIONS

Keckler, S.W., et al., "GPUs and the Future of Parallel Computing," IEEE Micro, vol. 31, Issue 5, Oct. 17, 2011, pp. 7-17.

*Primary Examiner* — Cheng Yuan Tseng
(74) *Attorney, Agent, or Firm* — Slater Matsil, LLP

(57) ABSTRACT

A described embodiment of the present invention includes a network having a first, second and third plurality of routers connected to a plurality of endpoints. At least one of the first plurality of routers includes a plurality of interposers having a number of queues. The at least one of the first plurality of routers has a demultiplexer for each interposer configured to receive multiplexed data from the interposer and provide demultiplexed data on to a plurality of second queues corresponding to the first queues of the number of queues. The at least one of the first plurality of routers also includes a number multiplexers, each of the number multiplexers having inputs configured to receive data from the number of queues.

21 Claims, 36 Drawing Sheets

(56) References Cited

U.S. PATENT DOCUMENTS

2005/0034039 A1    2/2005   Prasadh et al.
2007/0033369 A1    2/2007   Kasama et al.
2007/0236584 A1   10/2007   Frost-Ruebling et al.
2009/0066366 A1    3/2009   Solomon
2013/0010636 A1    1/2013   Regula
2016/0092363 A1    3/2016   Wang et al.

\* cited by examiner

Type 1
Type 2
Type 3

Mask Generator 3404

| msb | input | | lsb | | msb | output | | lsb |
|---|---|---|---|---|---|---|---|---|
| 0 | 0 | 0 | 1 | 1 | 1 | 0 | 0 | 0 |
| 0 | 0 | 1 | 0 | 2 | 0 | 1 | 0 | 0 |
| 0 | 0 | 1 | 1 | 3 | 1 | 0 | 0 | 0 |
| 0 | 1 | 0 | 0 | 4 | 0 | 0 | 1 | 0 |
| 0 | 1 | 0 | 1 | 5 | 1 | 0 | 0 | 0 |
| 0 | 1 | 1 | 0 | 6 | 0 | 1 | 0 | 0 |
| 0 | 1 | 1 | 1 | 7 | 1 | 0 | 0 | 0 |
| 1 | 0 | 0 | 0 | 8 | 0 | 0 | 0 | 1 |
| 1 | 0 | 0 | 1 | 9 | 1 | 0 | 0 | 0 |
| 1 | 0 | 1 | 0 | 10 | 0 | 1 | 0 | 0 |
| 1 | 0 | 1 | 1 | 11 | 1 | 0 | 0 | 0 |
| 1 | 1 | 0 | 0 | 12 | 0 | 0 | 1 | 0 |
| 1 | 1 | 0 | 1 | 13 | 1 | 0 | 0 | 0 |
| 1 | 1 | 1 | 0 | 14 | 0 | 1 | 0 | 0 |
| 1 | 1 | 1 | 1 | 15 | 1 | 0 | 0 | 0 |

Mask Generator 3404

| msb | input | | lsb | | msb | output | | lsb |
|---|---|---|---|---|---|---|---|---|
| 0 | 0 | 0 | 0 | 0 | 0 | 0 | 0 | 0 |
| 0 | 0 | 0 | 1 | 1 | 1 | 0 | 0 | 0 |
| 0 | 0 | 1 | 0 | 2 | 0 | 1 | 0 | 0 |
| 0 | 0 | 1 | 1 | 3 | 1 | 0 | 0 | 0 |
| 0 | 1 | 0 | 0 | 4 | 0 | 0 | 1 | 0 |
| 0 | 1 | 0 | 1 | 5 | 1 | 0 | 0 | 0 |
| 0 | 1 | 1 | 0 | 6 | 0 | 1 | 0 | 0 |
| 0 | 1 | 1 | 1 | 7 | 1 | 0 | 0 | 0 |
| 1 | 0 | 0 | 0 | 8 | 0 | 0 | 0 | 1 |
| 1 | 0 | 0 | 1 | 9 | 1 | 0 | 0 | 0 |
| 1 | 0 | 1 | 0 | 10 | 0 | 1 | 0 | 0 |
| 1 | 0 | 1 | 1 | 11 | 1 | 0 | 0 | 0 |
| 1 | 1 | 0 | 0 | 12 | 0 | 0 | 1 | 0 |
| 1 | 1 | 0 | 1 | 13 | 1 | 0 | 0 | 0 |
| 1 | 1 | 1 | 0 | 14 | 0 | 1 | 0 | 0 |
| 1 | 1 | 1 | 1 | 15 | 1 | 0 | 0 | 0 |

Figure 36

NON-BLOCKING NETWORK

CROSS REFERENCE

This application is related to U.S. patent application Ser. No. 15/097,091 entitled "NoC Interconnect with Linearly-Tunable QoS Guarantees for Real-time Isolation", filed on Apr. 12, 2016 and U.S. patent application Ser. No. 15/096,966 entitled "Scalable Autonomic Message-Transport with Synchronization" filed on Apr. 12, 2016, which are assigned to the assignee of the present application.

TECHNICAL FIELD

The present invention relates generally to a system and method for message-passing and synchronization between endpoints with QoS guarantees, and, in particular embodiments, to a system and method for endpoints on a system-on-chip (SoC) and multiple SoCs.

BACKGROUND

Integrated circuit complexity is developing at an accelerating pace driven by density of endpoints such as the number of transistors that can be fabricated in a given area. This has led to the development of chips of enormous complexity that are known in the industry as Systems on a Chip (SoCs). With this type of device, many functional units are incorporated onto one chip. The functional configurations of this type of chip are virtually limitless. However, this type of chip is commonly used for computing systems, embedded systems, and networking. For example, in a traditional computer, many chips are used for I/O control, instruction processing and many other functions. These endpoints are then connected by a network for communication between the endpoints. Historically, bus-type systems were used for this communication. However, with this type of system, only one pair of endpoints communicates at a time. Also, with the very narrow wires and very long distances between endpoints, capacitive and resistive loading creates timing and power consumption problems.

A more detailed explanation of these issues is found in Keckler, et al. "GPUs and the Future of Parallel Computing," IEEE Micro (September/October 2011) (http://www.cs.nyu.edu/courses/spring12/CSCI-GA.3033-012/ieee-micro-echelon.pdf), which is hereby incorporated by reference into this specification in its entirety. Keckler et al. note that:

> From 2010 to 2017, active components will scale by about $\frac{1}{16}$ in area as line widths scale from 40 nm to 10 nm, while wire energy will scale by only $\frac{1}{2}$.
>
> With the scaling projections to 10 nm, the ratios between DFMA [double-precision fused-multiply add], on-chip SRAM, and off-chip DRAM access energy stay relatively constant.
>
> However, the relative energy cost of 10-mm global wires goes up to 23 times the DFMA energy because wire capacitance per square mm remains approximately constant across process generations.
>
> Because communication dominates energy, both within the chip and across the external memory interface, energy-efficient architectures must decrease the amount of state changes per instruction and must exploit locality to reduce the distance data must move.

To address this problem, SoC designers have developed sophisticated NoCs to connect these components more efficiently than point-to-point busses and simple routers. A key advantage of NoCs is that they facilitate quality of service (QoS) guarantees. With a QoS guarantee, the NoC is configured such data flows receive at least the bandwidth which is provisioned.

However, designing NoCs presents several challenges, among them:

a. NoC interconnect energy does not scale well compared to compute energy and will increasingly become a bottleneck for SoC cost.

b. NoC interconnect bandwidth must be controlled effectively in order to support real-time constraints without over-engineering.

c. Traditional techniques waste bandwidth with over-engineering, without the ability to support isolation and meet real-time constraints.

Therefore, it is important to develop an Interconnect that can be incorporated onto an SoC and between SoCs that will not create QoS bottlenecks, is energy efficient and exploits locality as much as possible.

Another issue with bus-type systems involves managing data transport, such as for message-passing. For a SoC having multiple cores, conventional inter-process communication (IPC) approaches require a core to manage data-movement and synchronization, which is not efficient since core cycles are expensive in terms of gate-count and power. For example, a core may need to configure a one-sided direct memory access (DMA) to move data, which requires long latency, since the core needs to have information of the entire SoC address space. Such a one-sided DMA can read from any memory location in the entire SoC space and write in any memory location in the entire SoC space, which is complicated and error-prone, leading to long test times and low reliability. Conventionally, between ten and twenty percent of a core's cycles may be used for moving data, allocating buffers, and synchronization. To address this problem, an Autonomic Transport Block can be developed which offloads core cycles and speeds up message-passing, synchronization, and task scheduling.

SUMMARY

In accordance with a preferred embodiment of the present invention, a described embodiment of the present invention includes a circuit for routing in a network communications between a plurality of endpoints, including a plurality of n interposers, each interposer serving one endpoint. Each interposer includes a first demultiplexer having an input configured to receive data from an input port and m output ports, m first queues, each first queue having an input configured to receive data from respective ones of the m output ports of the first demultiplexer and having an output port, and a multiplexer having m input ports, each input port configured to receive data from an output port of one of the m first queues and an output port. In addition at least one router with n input ports, each port connecting to an interposer. Wherein each input port of the router includes a second demultiplexer for each interposer configured to receive data from the output port of the multiplexer of the interposer and m output ports, and m second queues, each having an input configured to receive data from a respective one of the m first queues on a respective one of the m output ports of the second demultiplexer and an output port. The router also including a plurality of m multiplexers, each having n input ports configured to receive data on a corresponding one of the m output ports of each of the m second queues and an output port.

Another embodiment includes a network including a plurality of n interposers, each interposer includes a first demultiplexer having an input port connected to an endpoint and m output ports, m first queues, each first queue having an input port configured to receive data from respective ones of the m output ports of the first demultiplexer and an output port, and a multiplexer having m input ports, each input configured to receive data from an output port of one of the m first queues and an output port. A first plurality of routers is provided. Each of the first plurality of routers has n input ports connected to an output port of one of the plurality of n interposers and having m output ports, a second plurality of m routers having a plurality of input ports, each input port connected to one of the output ports of the first plurality of routers, and having a plurality of output ports, and a third plurality of routers, each of the third plurality of routers having a plurality of input ports, one input port connected to one of the output ports of a corresponding one of the second plurality of routers, and having a plurality of output ports connected to a portion of the plurality of interposers such that each interposer is connected to at least one output of one of the third plurality of routers. At least one of the first plurality of routers includes a second demultiplexer for each interposer having an input port configured to receive data from the output port of the multiplexer of the interposer and m output ports, and m second queues, each having an input port configured to receive data from a respective one of the m output ports of the second demultiplexer and an output port configured to provide data on respective ones of the m output ports of the at least one of the first plurality of routers.

An additional embodiment includes a method for providing communication between endpoints, including communicating data from one of the endpoints to a first router including a next-hop virtual output queue corresponding to a destination of the data on a next hop and storing the data in the next-hop virtual output queue. The data is transferred, through a demultiplexer in the first router, from the next-hop virtual output queue to a virtual output queue. The data is transferred from the virtual output queue to a second router. The data is transferred the data from the second router to a third router. The data is also transferred from the third router to a destination component.

BRIEF DESCRIPTION OF THE DRAWINGS

For a more complete understanding of the present invention, and the advantages thereof, reference is now made to the following descriptions taken in conjunction with the accompanying drawings, in which:

FIG. 35 is a chart illustrating the operation of the mask generator of FIG. 34;

FIG. 36 is a chart illustrating how a mask generated by the mask generator of FIG. 34 is applied to the port weighting;

DETAILED DESCRIPTION OF ILLUSTRATIVE EMBODIMENTS

Figure 1:
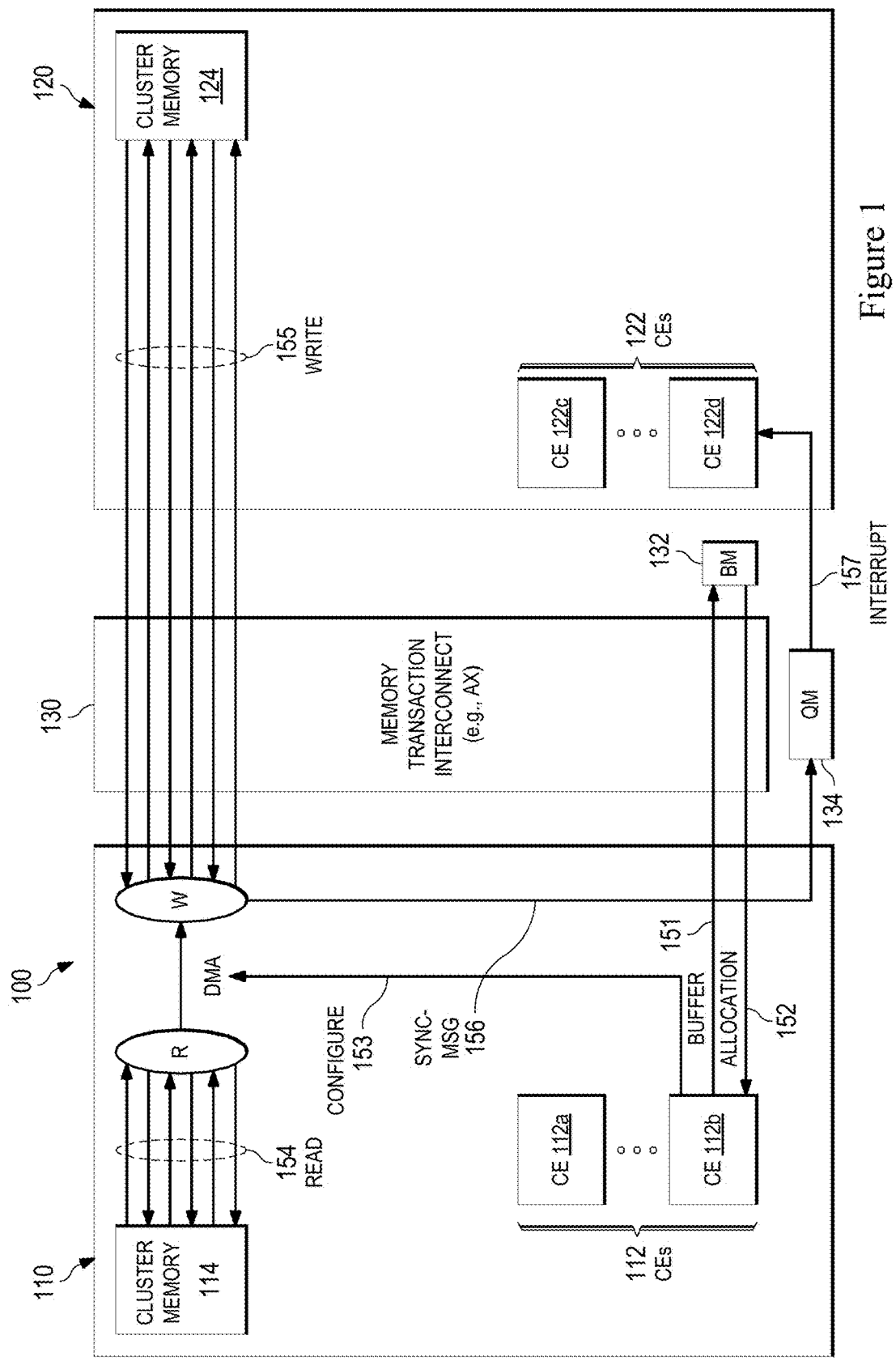
FIG. 1 is a diagram of clusters (end points) and conventional inter-process communication (IPC) between the clusters.

The structure, manufacture and use of the preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments described herein include a network suitable for use in a system-on-chip. The network includes a plurality of n interposers, each interposer serving one endpoint, each interposer including a first demultiplexer having an input configured to receive data from an input port and m output ports. The interposer also includes m first queues, each first queue having an input configured to receive data from respective ones of the m output ports of the first demultiplexer and having an output port. The first queues provide a function of a next hop virtual output queue, as explained in more detail below. The interposer also includes a multiplexer having m input ports, each input port configured to receive data from an output port of one of the m first queues and an output port. The network also includes at least one router with n input ports, each port connecting to an interposer, where each input port having a second demultiplexer for each interposer configured to receive data from the output port of the multiplexer of the interposer and m output ports, the at least one router also including m second queues, each having an input configured to receive data from a respective one of the m first queues on a respective one of the m output ports of the second demultiplexer and an output port. The second queues provide a function of a virtual output queue, as explained in more detail below. The router also includes a plurality of m multiplexers, each having n input ports configured to receive data on a corresponding one of the m output ports of each of the m second queues and an output port. This provides a next hop virtual output queue in the interposer for each virtual output queue allowing for a data pathway that avoids head-of-line blocking. The combination of next hop virtual output queues and virtual output queues can also be provided in subsequent hops between routers in the network.

Aspects of the present disclosure provide an apparatus and method that reduce the processing requirements on computation elements (CEs), such as cores and hardware accelerators, during inter-process communication (IPC) between CEs. This is accomplished by providing an autonomic-transport system (ATS) block within each cluster to perform functions for IPC, such as managing data-movement and synchronization. In some embodiments, all messages are moved in a cluster or a tile before a task requiring the messages as inputs is scheduled for a CE in the cluster. Thus when a task starts running, the CE only needs to access a memory within the cluster (as opposed to accessing far memory) for all the data (in the messages) that the task needs, which speeds up task execution time. In one embodiment, a CE in a first cluster that needs to transfer a message to a second cluster may send a request to an ATS block in the first cluster, and the ATS block of the first cluster may perform the message transfer to the second cluster. An ATS block in the second cluster allocates a buffer in the second cluster, receives the transmitted message, and performs synchronization of the message transfer for the second cluster. Aspects of the present disclosure do not need to use the global address space, since tasks of a CE in a cluster only access a memory in the cluster. Aspects of the present disclosure may be used for IPC and synchronization between clusters on a single system-on-chip (SoC), or multiple SoCs, and are highly scalable for complex SoCs using many CEs. Throughout this disclosure, the term "cluster" and the term "tile" will be used interchangeably.

FIG. 1 illustrates a diagram 100 of clusters in a SoC and inter-process communication (IPC) between the clusters. A cluster herein refers to a group of hardware blocks sharing a memory in a circuit. A cluster may include one or more computation-elements (CEs), one or more memory devices, and other components which function together for task execution by the one or more CEs. A CE herein refers to a device which is configured to perform computations and/or processing related tasks. Examples of a CE may include a core, a processor, or a hardware accelerator for signal processing, such as for performing Fast Fourier Transform (FFT). As shown in FIG. 1, two clusters, namely cluster 110 and cluster 120, communicate data through a bus or interconnect 130. Cluster 110 includes one or more computational elements (CEs) 112, such as a CE 112a and CE 112b, and a cluster memory 114. Likewise, cluster 120 includes one or more CEs 122, such as a CE 122c and a CE 122d, and a cluster memory 124.

In some embodiments, when the CE 112, such as the CE 112b, in cluster 110 needs to transfer a message stored in the cluster memory 114 to cluster 120, the CE 112 in cluster 110 may first send a request for buffer allocation to a centralized buffer manager (BM) 132 Step 151), and receive a buffer allocation from the BM 132 Step 152). The buffer allocation process causes a long latency for the CE 112 suffers a round-trip time to request a resource. The CE 112 may then configure a direct memory access (DMA) to transfer the message (Step 153). Configuration of the DMA may also result in a long latency since the CE 112 needs to comprehend an entire SoC address space.

After the configuration of the DMA, the DMA issues read transactions to the cluster memory 114 of cluster 110 (Step 154), which may be referred to as a local cluster memory of the DMA (i.e., the memory at a transmission side), and issues write transactions to the cluster memory 124 of cluster 120 (Step 155), which may be referred to as a remote cluster memory to the DMA (i.e., the memory at a receiving side). It can be seen that the write transaction in cluster 120 by the DMA traverses the interconnect 130, and requires the DMA to access a remote memory, which may result in long latency. Further, a conventional interconnect, such as an advanced extensible interface (AXI), requires a response for each transaction. For example, a write transaction in cluster 120 from cluster 110, which is a write side of the DMA, requires a write-response from cluster 120, which results in further latency. In another example, it is known that for memory transaction based interconnects, utilization can be expressed as the number of outstanding multiplied by the average burst length, and divided by an average round-trip latency. Therefore the utilization is reciprocally proportional to transaction latency, and is thus limited by the long latency as discussed above.

When the DMA has completed the message transfer, it writes a synchronization message to a centralized queue manager (QM) 134 (Step 156), which is also a remote transaction and requires long latency. The QM 134 accumulates synchronization messages and may interrupt a CE 122, such as the CE122d, in cluster 120, informing the CE 122 that the message has arrived. The CE may be interrupted multiple times for multiple input messages before a task is ready to run, and the overhead caused by such interrupts may be high. Further, the centralized QM 134 may not scale well with the number of clusters. In addition, the centralized approach as shown in FIG. 1 requires the QM 134 to have global information, which may not be reliable, e.g., due to being a single point of failure.

Figure 2:
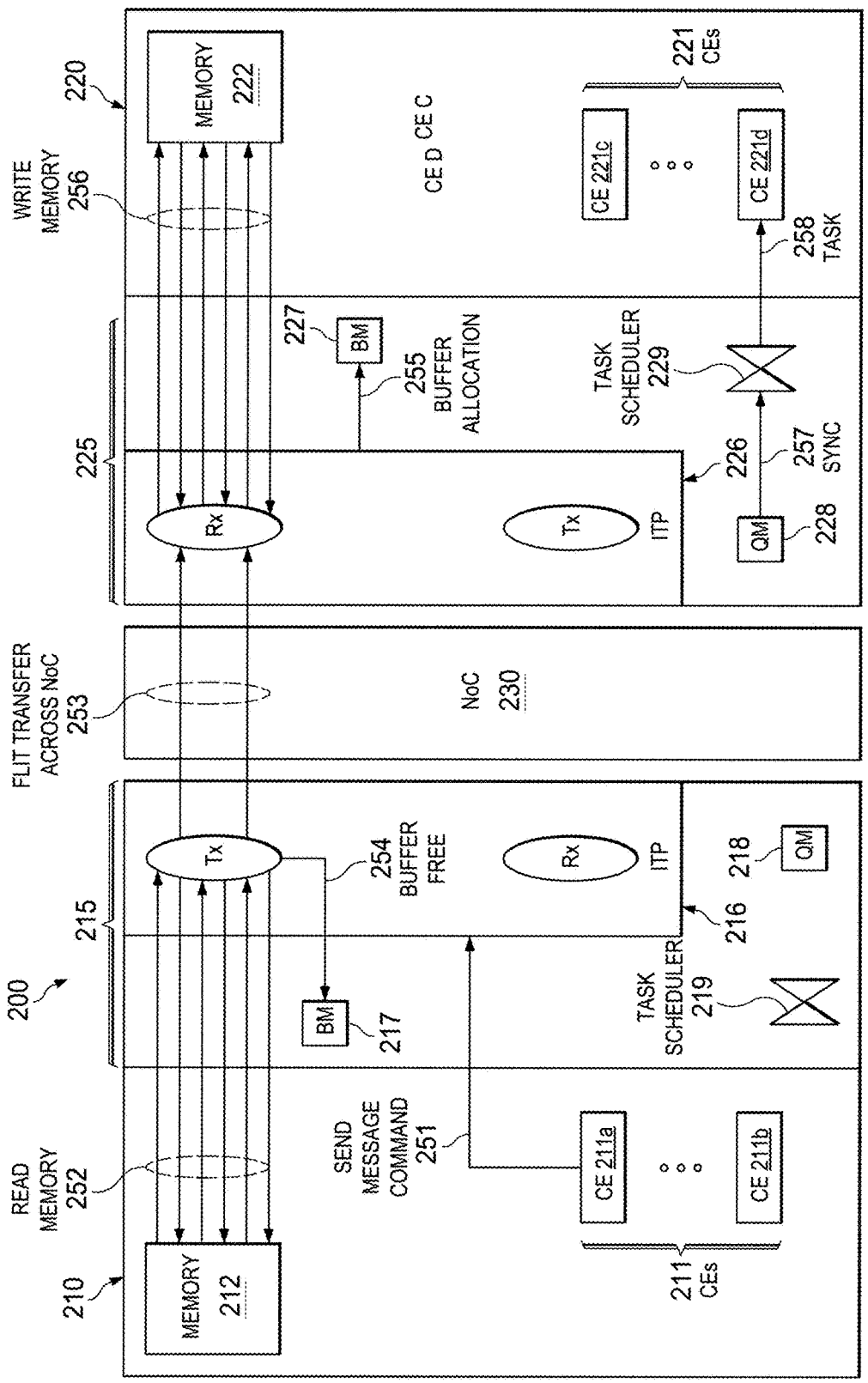
FIG. 2 is a diagram of an embodiment of clusters (end points) and inter-process communication between the clusters.

FIG. 2 illustrates a diagram 200 of embodiment clusters and autonomic IPC between the clusters. FIG. 2 illustrates two clusters, namely cluster 210 and cluster 220, communicating through message-passing via an interconnect 230, such as a network-on-chip (NoC). From the viewpoint of the NoC, clusters 210 and 220 are endpoints. Therefore, the term "endpoint" will be used below in the detailed discussion of the NoC. In some embodiments, the two clusters are on a circuit or a SoC. Alternatively, the two clusters may be located on different SoCs. In another embodiment, the two clusters are on a chip-on-board (CoB). The interconnect 230 is configured to support read and write transactions between clusters, and also support message transfer between clusters. In some embodiments, each of the clusters 210 and 220 includes one or more CEs, a cluster memory, and an autonomic transport system (ATS) block operatively coupled to the CEs and the cluster memory.

An ATS block of a cluster is configured to perform inter-process communication for the cluster. The ATS block of the cluster may also be configured to manage synchronization for message transfer of the cluster, and to schedule tasks for the CEs in the cluster. As illustrated in FIG. 2, the cluster 210 includes multiple CEs 211, such as a CE A and a CE B, a memory 212, and an ATS block 215. Similarly, the cluster 220 includes multiple CEs 221, such as a CE C and a CE D, a memory 222, and an ATS block 225.

In some embodiments, an ATS block of a cluster is configured to perform message passing or movement within the cluster. For instance, an ATS may move a message (e.g., copying) between different memories residing in the same cluster. In another example, an ATS may perform a logical message movement (i.e., no copying) between various queues, which may be managed by the ATS. In some embodiments, an ATS block of a cluster is configured to perform message passing or movement between the cluster and a different cluster. The message passing or movement herein refers to transferring a message or receiving a message. For example, an ATS block of a cluster transfers a message within the cluster or to a different cluster upon a request from a CE, or receives a message within the cluster or from a different cluster.

In some embodiments, an ATS block of a cluster may be configured to provide synchronization and task scheduling for the CEs. In one embodiment, the ATS block of a cluster may be configured to manage synchronization of messages to be used by the CEs in executing a task and to schedule tasks for one or more of the CEs when the messages required by the task is ready for use. For example, an ATS block of a cluster keeps track of all messages which are inputs to a task. When the ATS block receives all such messages, it may determine that the task is ready to run, and determine when the task will be run and on which CE the task will be run.

In some embodiments, an ATS block of a cluster may be configured to communicate with a memory buffer manager, and a CE in the cluster. This communication may be for performing IPC, synchronization and task scheduling. For example, an ATS block of a cluster may communicate with a CE of the cluster for transferring a message or for scheduling a task for the CE to run. In another example, an ATS block of a cluster may communicate with a memory buffer manager, for buffer allocation or queue management.

When one or more CEs of a cluster require a message to be moved between the cluster and a different cluster for executing a task or an application, the ATS block of the cluster, instead of the CEs, will perform the message movement and synchronization, offloading the CEs from managing message movement and synchronization. As a result, the CEs of the cluster may spend more cycles on computation and greatly reduce overhead for managing IPC. Also, since most and perhaps all input data (messages) for a task has generally already been transferred into a cluster before the task runs, the task may predominately need to access one or more memories within the cluster (which is a near memory as opposed to far memories in other clusters), which significantly reduces application execution time.

In some embodiments, an ATS block of a cluster may further include an interposer (ITP), a buffer manager (BM), and a queue manager (QM). The ATS block may also include a task scheduler (TS). The ITP may be operatively coupled to the BM, QM, and the TS. As discussed in more detail below. the ITP may be configured to perform message movement within a cluster and/or between clusters, such as transferring a message within a cluster or to a different cluster, or receiving a message within the cluster or from a different cluster. In one embodiment, when transferring message between different clusters, pairs of ITPs work together to implement a two-sided DMA, in which a transmit ITP, i.e., an ITP of a first cluster transmitting a message to a second cluster, may only access a memory (e.g., read) in its local cluster (i.e., the first cluster), and a receive ITP, i.e., the second cluster, may only access memory (e.g., write) in its local cluster (i.e., the second cluster). The transmit ITP may send messages to the receive ITP through a NoC. In such a two-sided transfer, global addressing is not needed, which not only simplifies the architecture, but also localizes errors to within clusters, limiting the scope for debug. The two-sided transfer may be used in networking, e.g. in transmission control protocol/Internet protocol (TCP/IP) and/or Ethernet packet transport, and is highly reliable and scalable.

The BM may be configured to manage buffers in a memory that store messages to be transferred. The BM may also be configured to manage buffers where received message should be stored. The QM may be configured to manage queues of messages that are to be transferred or have been received, e.g., manage queues of messages to be sent from and received by its cluster. The TS may be configured to schedule tasks for the one or more CEs of the cluster. For example, the TS may keep track of all ready-to-run tasks, and determine when and on which CE(s) a particular task will be run. In some embodiments, the TS may schedule tasks according to a first-in first-out (FIFO) order of each task. So a task which is ready first (as determined by the time when all input messages have arrived into the cluster) will be the one to be dispatched to a CE first. In other embodiments, the TS may schedule tasks according to priority orders of the tasks. For example, different tasks may be given different priorities, and a task with a higher priority may be assigned to CEs prior to a task with a lower priority. Alternatively, the TS may schedule tasks according to an algorithm of earliest deadline first, where a task that has the earliest deadline is scheduled first.

Two clusters are illustrated in FIG. 2 for simplicity. In general there may be many more than two clusters instantiated, e.g., in an SoC, where each of the clusters are connected to an NoC. The ATS block 215 of cluster 210 includes an ITP 216, a BM 217, a QM 218, and a TS 219. The ATS block 225 of cluster 220 includes an ITP 226, a BM 227, a QM 228, and a TS 229. ITP 216 includes transmit queue Tx and receive queue Rx. In other embodiments described below, these queues are shown in separate interposers for clarity. In some embodiments, when a CE in CE group 211, such as CE A, in cluster 210 needs to transfer a message to cluster 220 for a task to run in cluster 220, the CE may send a request, such as a Send-Msg command, to its ITP 216, for transferring the message to cluster 220 (Step 251). The ITP 216, upon receipt of the request, may read flits of the message from a buffer in the memory 212 (Step 252), and transfer the flits of the message through the NoC 230 to the ITP 226 (Step 253). A packet is composed of multiple "flits", where each flit takes one cycle on a bus. When the entire message has been transferred, the ITP 216 frees the buffer storing the message in the memory 212 by informing the BM 217 that the buffer is no longer needed (Step 254).

Upon receipt of a first flit of the message, the ITP 226 may request the BM 227 to allocate a buffer in the memory 222 for storing the message (Step 255), and then writes the successive flits of the message into the buffer of the memory 222 (Step 256) after the buffer has been allocated. In one embodiment, the ITP 226 informs the QM 228 of cluster 220 upon receipt of the entire message. The QM 228 keeps track of all messages that are inputs to each task. When all messages have arrived which are needed by a particular task, then this task is ready to run. So when the QM 228 is informed of the receipt of the message, it sends a synchronization signal to the TS 229 (Step 257) indicating that the task associated with the message is ready to run. The task scheduler 229 maintains a list of ready-to-run tasks, and may schedule the task that is ready to run on any one or more of the CEs of cluster 220 (Step 258). In some embodiments, buffer allocation by the BM 227 may be done in parallel with the transfer of flits of the message across the NoC 230. For example, some temporary buffers in cluster 220 or the ITP 226 may be used to buffer in-flight flits of the message until a buffer can be allocated by the BM 227. When the buffer allocation by BM 227 is quick, the temporary buffers needed in the ITP 226 will be small. This example further reduces the latency for transferring the message compared to the case when a buffer must be allocated before the message transmission can begin.

An ATS block of a cluster may be implemented by hardware, software, or a combination of both. In one embodiment, an ATS block of a cluster may include one or more additional CEs, which are separate and distinct from the CEs, such as the CEs 211 or 221 of cluster 210 or cluster 220, to perform the functions of the ATS block. Alternatively, the ATS block may use one of the CEs of the cluster to perform some or all of the processing tasks. For example, the ATS block 215 may use one of the CEs 211, such as the CE A, to implement one or more functions of the ATS block 215. The ATS block and the associated methods in the embodiments of the present disclosure may be applied to any groups of hardware blocks communicating with each other, such as groups of hardware blocks on a chip, on a board, or on a chassis. Aspects of the present disclosure may also be applied to clusters located on different SoCs communicating with each other. In one embodiment, a circuit may include multiple clusters communicating with each other, and the multiple clusters may belong to one SoC or different SoCs, or belong to different groups of hardware blocks.

Figure 3:
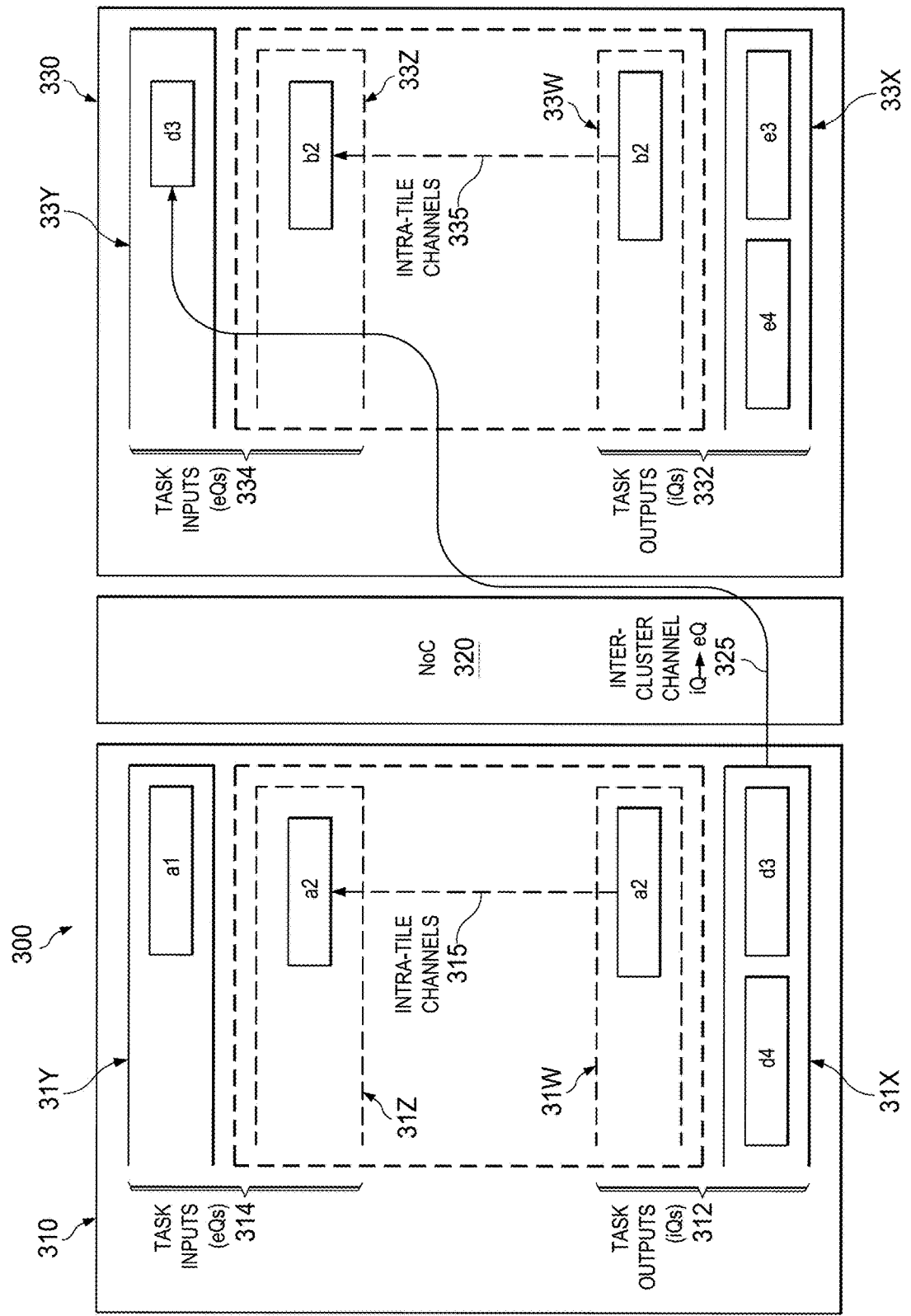
FIG. 3 is a diagram illustrating embodiment method for queue management.

FIG. 3 illustrates a diagram 300 of an embodiment method for queue management. FIG. 3 illustrates a plurality of queues for a cluster 310 and a plurality of queues for of a cluster 330. Cluster 310 and cluster 330 are clusters as discussed above with respect to FIG. 2, and each may include memories, CEs, and an ATS block. Cluster 310 and cluster 330 communicate through an interconnect NoC 320. In some embodiments, data of messages may be located in a cluster memory of a cluster, and a descriptor, or a message descriptor, e.g. a pointer, may be defined for each of the messages, indicating the location of a buffer in the cluster memory storing a respective message. The terms "descriptor" and "message descriptor" are used interchangeably throughout this disclosure. Each of the clusters 310 and 330 may have an ingress-queue (iQ) and an egress-queue (eQ). An iQ of a cluster holds descriptors for messages to be transferred within the cluster or to a different cluster, and an eQ holds descriptors for messages to be received. A channel may be referred to as a binding between a pair of iQ and eQ. When both the iQ and the eQ are in a same cluster, the channel may be referred to as an intra-cluster channel within a cluster. When the iQ and the eQ are in different clusters, the channel may be called an inter-cluster channel.

As shown in FIG. 3, cluster 310 has multiple iQs 312, with iQ 31W holding a message descriptor a2 and iQ 31X holding message descriptors d3 and d4. Cluster 310 further has multiple eQs 314, with eQ 31Y holding a message descriptor a1 and eQ 31Z holding a message descriptor a2. Each message descriptor indicates a buffer location and size of a corresponding message. A transfer of a message for an intra-cluster channel can involve either zero copy transfer (which entails only a message descriptor transfer from an iQ to an eQ), or a copy transfer (i.e., message moved). If a cluster has multiple memories (e.g. Level 1 and Level 2 memories), an ATS of the cluster may copy a message between memories within the cluster. A message located in a buffer indicated by the message descriptor a2 in the iQ 31W may be copied to a buffer indicated by the descriptor a2 in the eQ 31Z through an intra-cluster channel 315. Alternatively, for zero-copy transfer, the message indicated by descriptor a2 may not be moved within cluster 310, and only the descriptor a2 is transferred from iQ 31W to eQ 31Z. Cluster 330 also has multiples iQs 332, with iQ 33W holding a message descriptor b2 and iQ 33X holding message descriptors e3, and e4, and multiple eQs 334 with eQ 33Y holding a message descriptor d3 and eQ 33Z holding a message descriptor b2. A message located in a buffer indicated by the message descriptor b2 in the iQs 332 may be copy or zero-copy transferred to eQ 33Z though an intra-cluster channel 335. A message indicated by the message descriptor d3 in the iQs 312 of cluster 310 may be moved to cluster 330 through an inter-cluster channel 325 through the interconnect 320. This message will be placed in a buffer indicated by the message descriptor d3 in the eQ 33Y of cluster 330. Since the transfer is between clusters a copy transfer must be used.

In some embodiments, an iQ or eQ of a cluster may be implemented in a memory with an iQ or eQ pointer, which is managed by an ATS block or a QM of the ATS block of the cluster. When a CE of the cluster requests for transferring a message, the CE may specify to the ATS block a starting and an ending addresses of the message in a memory of the cluster. The ATS block or the QM of the ATS block may then put a message descriptor for the message into an iQ. In one embodiment, the message descriptor may include the starting and ending addresses of the message, or the starting address and a length of the message. The ATS block or an ITP in the ATS block may then move the message by using the message descriptor in the iQ. For a cluster receiving a message, an ATS block of the receiving cluster may first request a BM of the cluster to allocate a buffer in a memory for receiving the message. The BM returns a message-descriptor pointing to an unused buffer. The ATS block may then write the message into the buffer according to the returned message descriptor from the BM. After the message has been completely written into the memory, the ATS block or a QM of the ATS block may place a message descriptor, which indicates the location of the buffer, in an eQ of the cluster.

With such an iQ and eQ defined, one or more CEs of a cluster requesting for message transfer may specify a message descriptor in an iQ of the cluster for each message to be transmitted. This generally requires less overhead (e.g., about 10s of cycles) than to setup a DMA (e.g., about 100s of cycles). In some embodiments, an iQ-eQ channel may be defined by a controller according to an application dataflow, and a task running on a CE of the cluster need not know where its output message should go. This simplifies the task to only computation, since the message transfer, associated synchronization when the message has been completely transferred, which task is ready to run based on all of its input messages having been received by the cluster, and which task is scheduled to run is taken care of by an ATS block of each cluster.

In some embodiments, an iQ or an eQ may hold messages to be transmitted or received, instead of message descriptors indicating buffer locations for the messages. For example, an ATS block of a cluster may directly place a message to be moved into an iQ, and transfer the message. An ATS block receiving such a message may also directly place the message in its eQ. In this example, messages are moved from an iQ to an eQ (through an intra-cluster or inter-cluster channel), which does not involve buffer allocation, or message transfer between buffer memories. This mode of operation may be used to transfer short messages.

Figure 4:
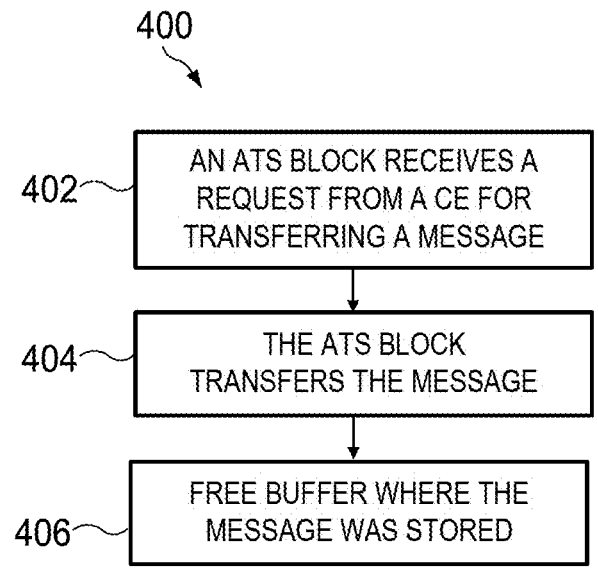
FIG. 4 is a flow chart of an embodiment method for IPC of a circuit including a cluster.

FIG. 4 illustrates a flow chart of an embodiment method 400 for IPC of a circuit including a first cluster. The first cluster includes a CE, a memory, and an ATS block configured to perform IPC for the first cluster. In one embodiment, the ATS block is separate and distinct from the CE. The method 400 starts from Step 402 where the ATS block receives a request from the CE for transferring a message stored in the cluster's memory, and proceeds to Step 404, where the ATS block transfers the message. In step 406, if the entire message has been transmitted (copied) to another cluster, the buffer where that message was stored is freed. In one embodiment, the ATS block may transfer the message within the first cluster or to a second cluster communicating with the first cluster. In another embodiment, the ATS block may place a message descriptor of the message in an ingress queue (iQ) of the first cluster before the message is transmitted, where the message descriptor indicates a location of the message in the memory. The ATS block may also free a buffer storing the message in the memory after the message is transmitted to another cluster. The ATS block may include an ITP configured to transfer messages to a second cluster, a BM configured to manage buffers for the messages, and a QM configured to manage queues of the messages. The second cluster may also include a second CE, a second memory and a second ATS block configured to perform IPC for the second cluster.

Figure 5:
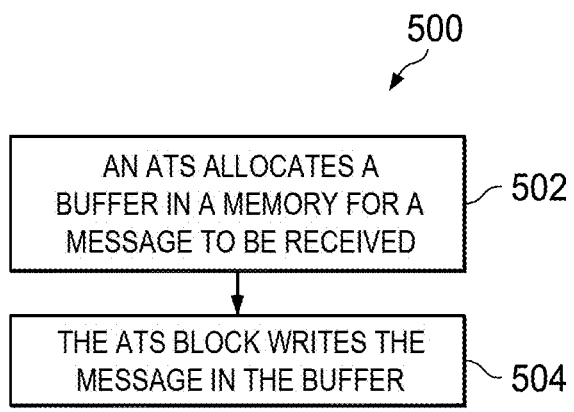
FIG. 5 is a flow chart of another embodiment method for IPC of a circuit including a cluster.

FIG. 5 illustrates a flow chart of another embodiment method 500 or IPC of a circuit including a first cluster. The first cluster includes a CE, a memory, and an ATS block configured to perform IPC. In one embodiment, the ATS block is separate and different from the CE. In another embodiment, the ATS block is configured to perform task scheduling for the first cluster. In the method 500, the ATS block allocates a buffer in the memory for a message to be received (Step 502), and writes the message in the buffer (Step 504). In some embodiments, a buffer allocation for receiving a message by an ATS of a cluster (i.e., the receiving ATS) may be initiated by a request from an ATS of a different cluster transmitting the message (i.e., the transmitting ATS), followed by a grant from the receiving ATS, after the buffer has been allocated, to the transmitting ATS. This grant allows the transmitting ATS to begin transmitting that message. In other embodiments, the buffer allocation may be initiated by the first flit (which may occupy one cycle) of the message, with the subsequent flits of the message being buffered by the receiving ATS while the receiving ATS is queried to allocate the buffer (perhaps done by the BM in the receiving ATS). In this example, allocation of the buffer is performed concurrently with the message transfer, which reduces latency. In one embodiment, the method 500 may place a message descriptor in an eQ of the first cluster after writing the message in the buffer, and the message descriptor indicates a location of the buffer in the memory. In one embodiment, the message is transmitted by a second cluster in the circuit communicating with the first cluster. The second cluster may also include a second CE, a second memory and a second ATS block configured to perform IPC for the second cluster, and the message is transmitted by the second ATS block of the second cluster. In one embodiment, the message may be transmitted by the second ATS block to the ATS of the first cluster upon a request from the second CE. In another embodiment, the ATS block may write the message in a buffer of the memory of the first cluster indicated by an eQ. In another embodiment, the ATS block may be configured to manage synchronization of the message, and schedule a task for the CE. In another example, the ATS block may include an interposer (ITP) configured to transfer and receive messages, a buffer manager (BM) configured to manage buffer for the messages, and a queue manager (QM) configured to manage queues of the messages. The ATS block may further include a TS for scheduling tasks for the CE. In one embodiment, the QM may send a synchronization signal to the TS of the ATS block after receipt of a message, indicating readiness of a task associated with the message. The QM can also keep track of triggering conditions such as N messages having been received in eQ 33Y and M messages in eQ 33Z. When such a condition has been met, QM informs the TS that a particular task (which requires such input messages) is ready to run. TS schedules the task to run based on arbitration between all other tasks which are also ready to run.

Figure 6:
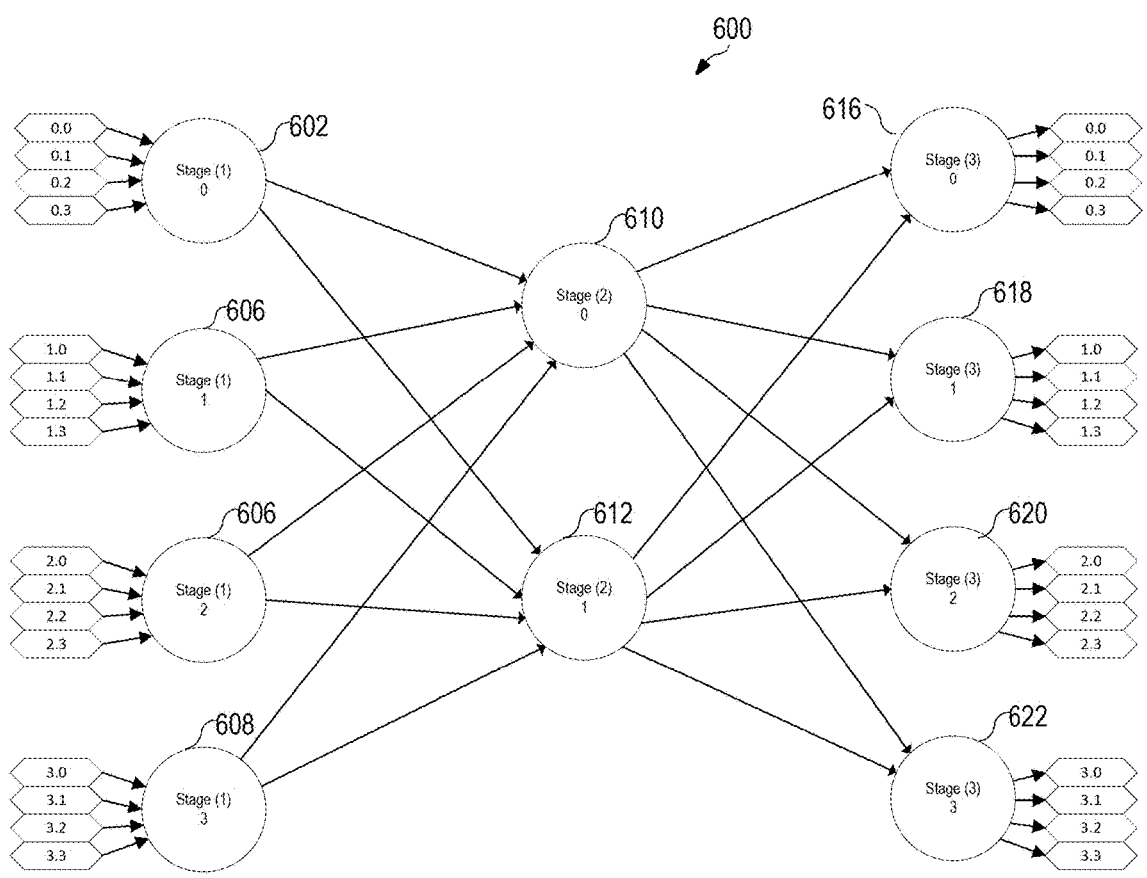
FIG. 6 is a diagram of a basic Clos-type network.

NoCs 230 (FIGS. 2) and 320 (FIG. 3) may take many configurations. An example configuration is a Clos-type network. FIG. 6 shows a basic Clos-type network. Each stage includes a number of routers (Stage(1) routers 602, 604, 606,608, Stage(2) routers 610, 612, and Stage(3) routers 616, 618, 620 and 622) that can route packets from any one of its inputs to any of its outputs. Usually, the number of Stage(1) routers is the same as the number of Stage(3) routers. The number of Stage(2) routers can be more or less than the number of Stage (1) and Stage(3) routers. In this configuration, there are four endpoints that provided inputs to each stage(1) router. Endpoints are tiles, clusters, or other IP blocks. In network 600, endpoints 0.0, 0.1, 0.2 and 0.3 provide inputs to stage 602. Because there are two stage(2) routers (610, 612) in the example of network 600, each stage(1) router (602. 604, 606, 608) has two outputs directed to each of the stage(2) routers. Similarly, each of the stage(2) routers has one output for each of the four stage(3) routers (616, 618, 620 and 122). Each of the stage(3) routers has four outputs to provide data to their attached endpoints. For example, stage(3) router 622 provides data to endpoints 3.0, 3.1,3.2 and 3.3.

To explain the operation of network 600, assume an example transmission where packet must be transported from component 1.3 to component 3.2. A packet is composed of multiple "flits", where each flit takes one cycle on a bus. The flits will be accepted by stage(1) router 604 and then routed to one of stage(2) routers 610 or 612. The stage(2) router that received the data then routes the packet to stage(3) router 622, which routes the packet to component 3.2. Of note, network 600 includes two stage(2) routers, but could include any number of routers, depending on throughput needs. This indicates the high scalability of the Clos-type network, as is explained further below.

Figure 7:
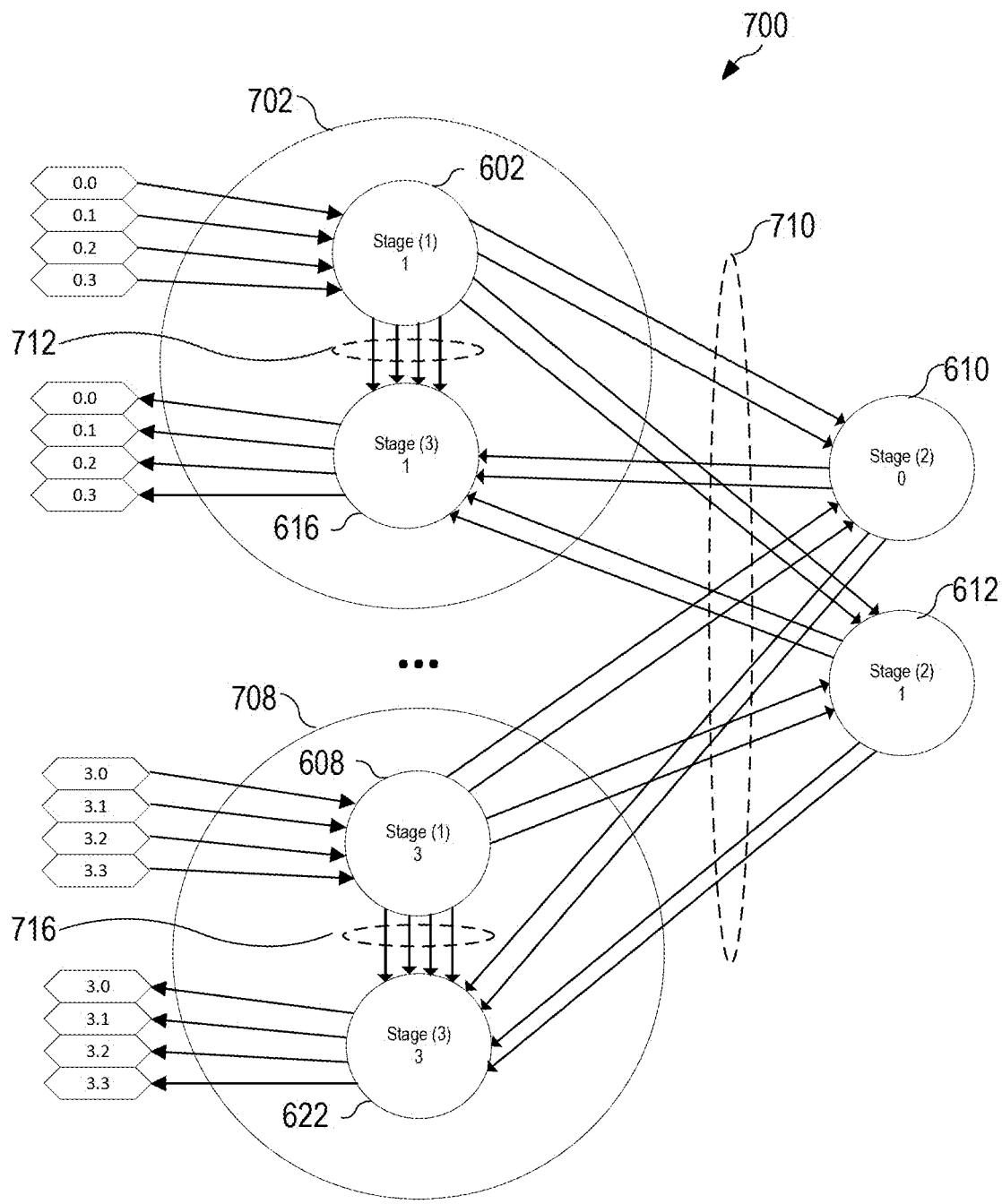
FIG. 7 is a diagram of a folded Clos-type network 200.

FIG. 7 is a conceptual diagram of a folded Clos-type network 700. In a folded Clos network, the Stage(1) and Stage(3) routers are collocated and, in some configurations, the stage(1) and stage(3) routers use combined circuitry. For example, the Stage(1,3) router 702 comprises both stage(1) router 602 and stage(3) router 616. Buses 710 provide communication from the stage(1) routers 602-608 to stage (2) routers 610 and 612; and from stage(2) routers 610 and 612 to stage three routers 616-622.

Although shown as single lines, buses 710 commonly contain a power-of-2 number of data lines (e.g. 32, 64, 128, etc), although any number is also possible, and several control lines. For example, the control lines may provide, among other information, a digital address of the destination component for the data on the data lines, message descriptor, quality of service, and packet delineation information. This allows the routers to route the data to the appropriate endpoint and to make sophisticated routing decisions based on traffic flow. For example, in the network of FIG. 1, a stage(1) router can monitor (through the occupancy of the VoQ in stage(1)) for each of stage(2) routers 610 and 612 to determine which router has the least traffic and thus would allow the fastest communication of the data to the desired destination. This also allows for load-balancing across the stage(2) routers, and thus reducing uneven loading amongst the various stage(2) routers. On method for load-balancing is illustrated in FIGS. 32-37.

Figure 23:
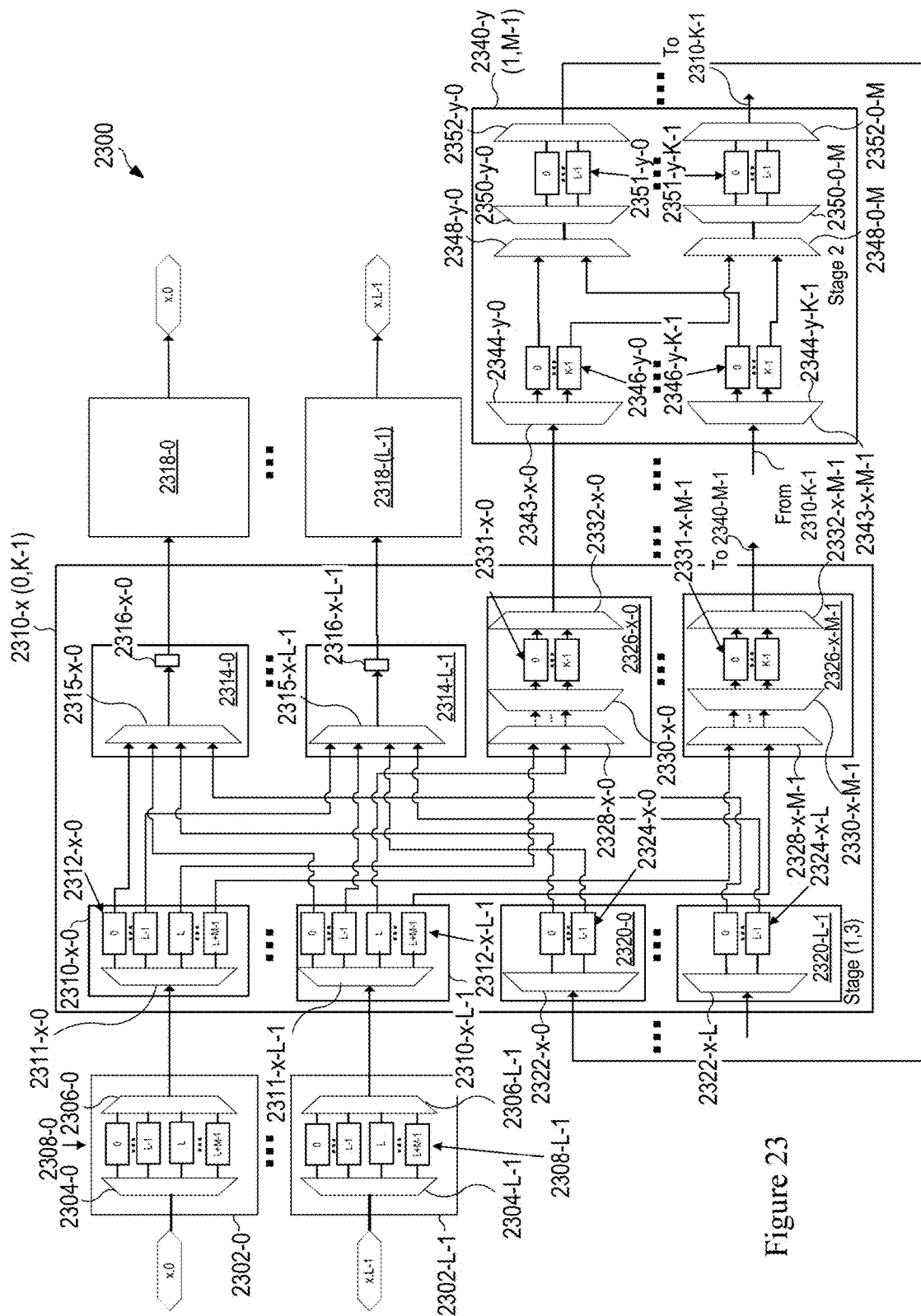
FIG. 23 is a diagram showing an implantation of the embodiments FIGS. 7 and 8.

One aspect of folded Clos network 700 is local buses 712 and 714 in stage(1,3) router 204 and stage(1,3) router 208, respectively. In one embodiment, local busses 712 and 714 comprise actual busses. However, in most embodiments, these busses are conceptual representations because the circuitry of the stage(1) and stage(3) routers are combined, as shown in FIG. 23, which is explained below.

In the stage(1,3) router, if the data is transmitted from one local component to another local component, the local bus can be used to bypass the stage(2) routers entirely. This provides a short, efficient and fast data path for these types of transmissions. An example of this type of transmission is a transmission from component 0.0 to component 0.3. Both of these endpoints are assigned to stage(1,3) router 702. This transmission can use stage(1) router 602, bus 712 and stage(3) router 616 to deliver the transmission to endpoint 0.3. Because stage(1) router 602 and stage(3) router 616 are collocated in folded Clos network 700, the path between the two routers is very short. Therefore, this type of transmission has the following benefits: 1) it avoids one routing hop for local traffic (2 hops instead of 3 hops), 2) by avoiding the stage(2) routers, it minimizes the chance of congestion at those routers, and 3) it uses a very short path, thus allowing for fast transmission with minimal capacitive and resistance losses.

Figure 8:
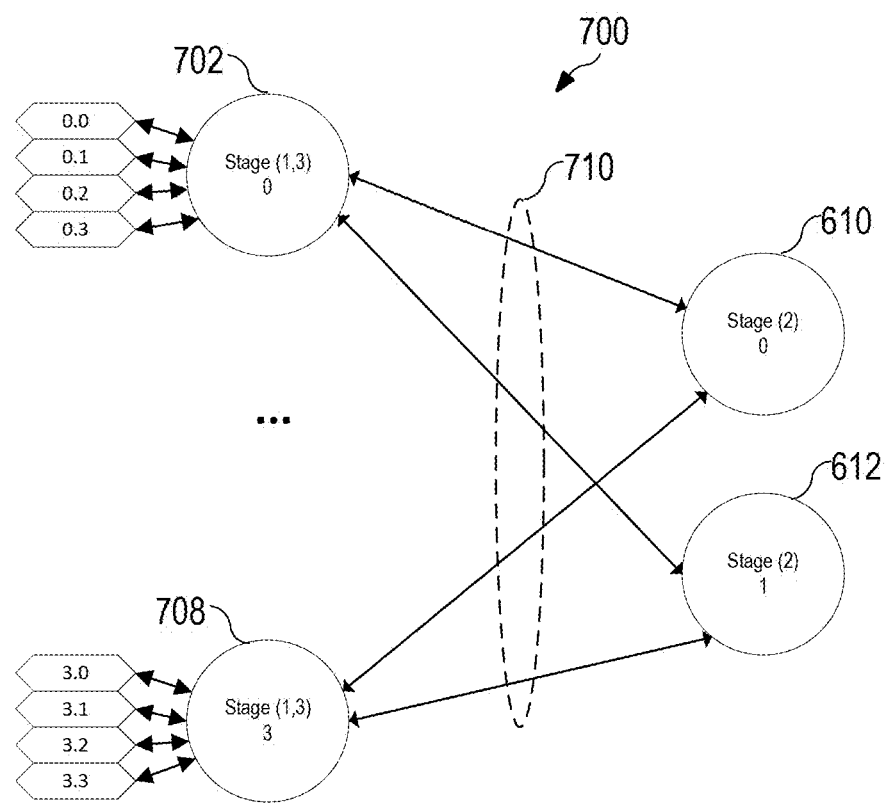
FIG. 8 is a diagram of a Clos-type network with the Stage(1) and Stage(3) routers as a combined unit Stage(1,3)

FIG. 8 shows the stage(1,3) routers of network 700 of FIG. 2 as a single unit. As shown in FIG. 2, Network 700 is a folded Clos-type network. FIG. 8 is a simplified version of network 700 with only the first and last stage(1,3) routers 702 and 708 shown with stage(2) routers 610 and 612. In this case, local traffic need traverse only 1 hop instead of 2 hops (using the local busses 712 and 716 in FIG. 7); and instead of 3 hops (using Stages (1), (2), and (3) in the original network 600 in FIG. 6. There is no conceptual limit on the number of stage(1,3) and stage(2) routers that can be utilized. As explained below, this makes network 700 highly scalable.

Figure 9:
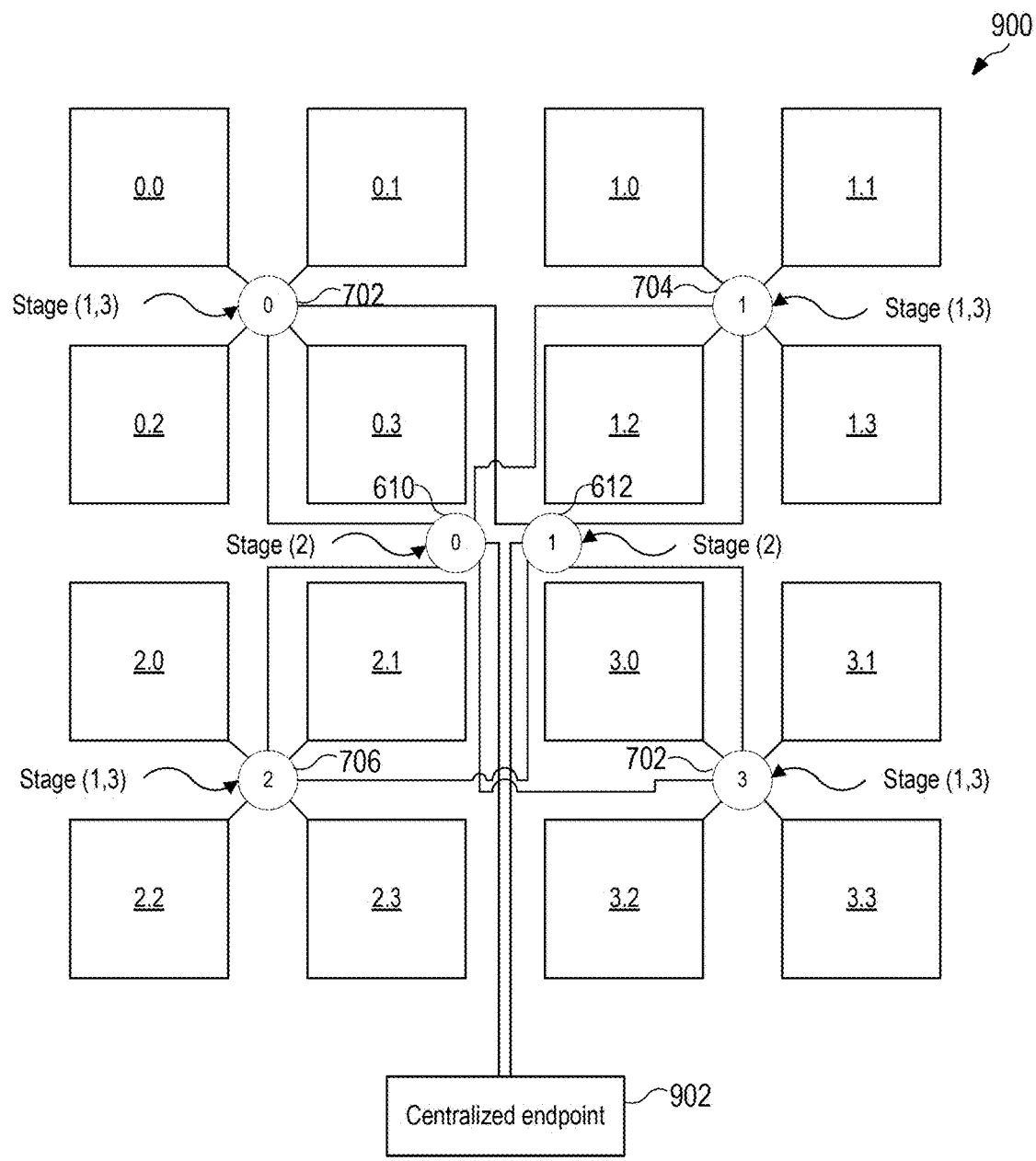
FIG. 9 is a topological diagram of an SoC 900.

FIG. 9 is a schematic layout diagram of an SoC 900. For simplicity, SoC 900 includes only 16 endpoints (0.0-0.3, 1.0-1.3, 2.0-2.3 and 2.-3.3). Most SoCs will include many more endpoints. Examples of endpoints that may be included in SoCs include CEs 110, 120, 210, 220, 310 and 330. Additional examples can be found in U.S. Pat. No. 6,526,462, U.S. Patent 5Application Publication No. 2003/0208653 and U.S. Patent Application Publication No. 2003/0110306, which are hereby incorporated herein by reference. These endpoint examples are only exemplary and many other types of endpoints that are suitable for use with this embodiment will become apparent to those skilled in the art in light of this specification. Communication between endpoints is provided by a folded Clos network like network 700 of FIG. 7. In the configuration shown in FIG. 9, stage(1,3) router 702 is connected to endpoints 0.0-0.3. Stage(1,3) router 704 is connected to endpoints 1.0-1.3. Stage(1,3) router 706 is connected to endpoints 2.0-2.3. Stage(1,3) router 708 is connected to endpoints 3.0-3.3. The configuration of FIG. 9 also includes centralized endpoint 902 that provides common services. Common services can be any service utilized by a large number of endpoints. For example, common services may include an I/O port or many configurations of memory, such as DDR and various levels of cache memory. The centralized endpoint or any of its common services may be located on the SoC or off of the SoC. Centralized Endpoints, such as SerDes (serializer/deserializer) or DDR PHY are located at the periphery of the SoC die, as illustrated in FIG. 9.

Figure 10:
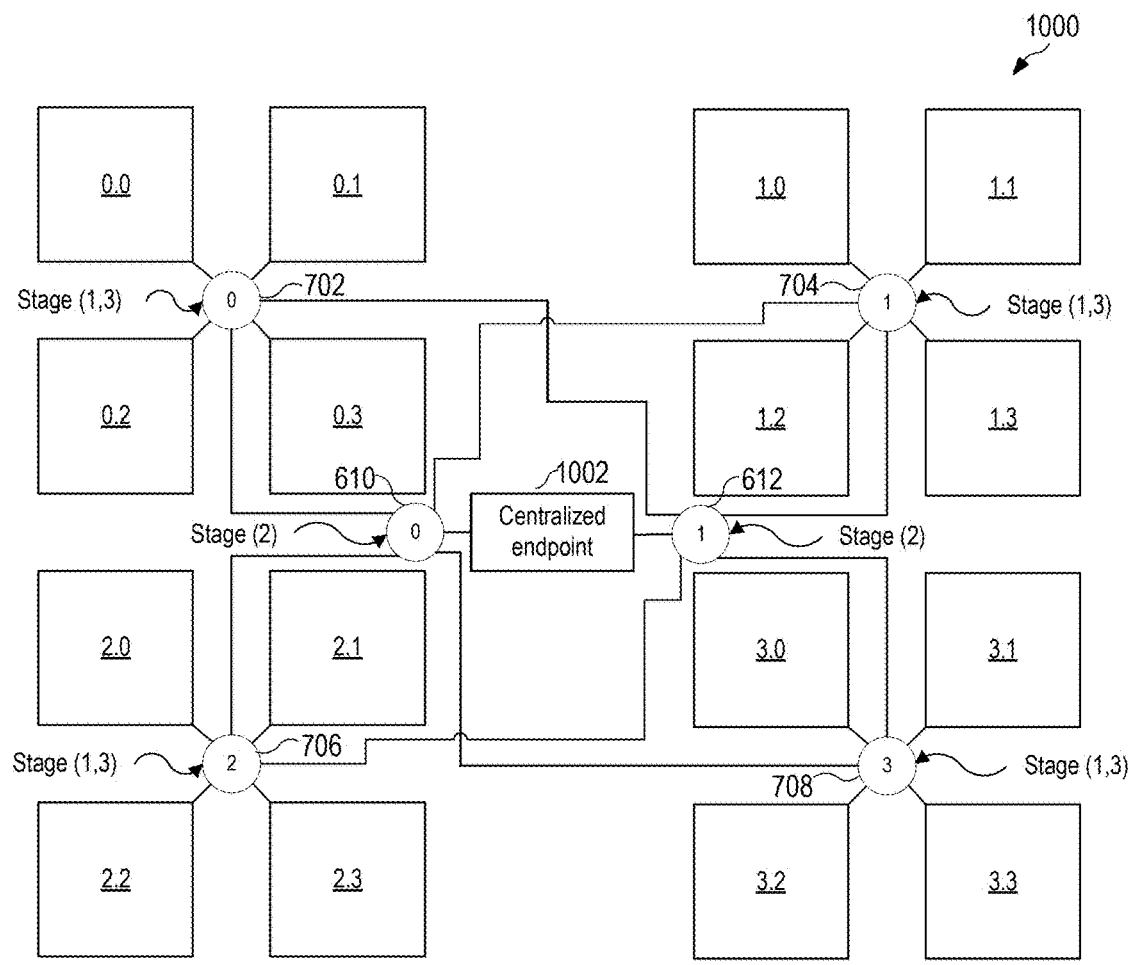
FIG. 10 is a topological diagram showing a variation of SoC of FIG. 9.

FIG. 10 is a variation of the device of FIG. 9. In this embodiment, the centralized endpoint is internal memory 1002 and is positioned at the center of SoC 1000. This minimizes latency for all communications involving the central endpoint by minimizing the length of the wires from centralized endpoint 902 and stage(2) routers 610 and 612. This configuration is particularly advantageous for cache memory. Cache memory is usually very fast SRAM. SRAMs commonly use the same fabrication technology as logic, and thus are easily incorporated into the central portion of the SoC.

Figure 11:
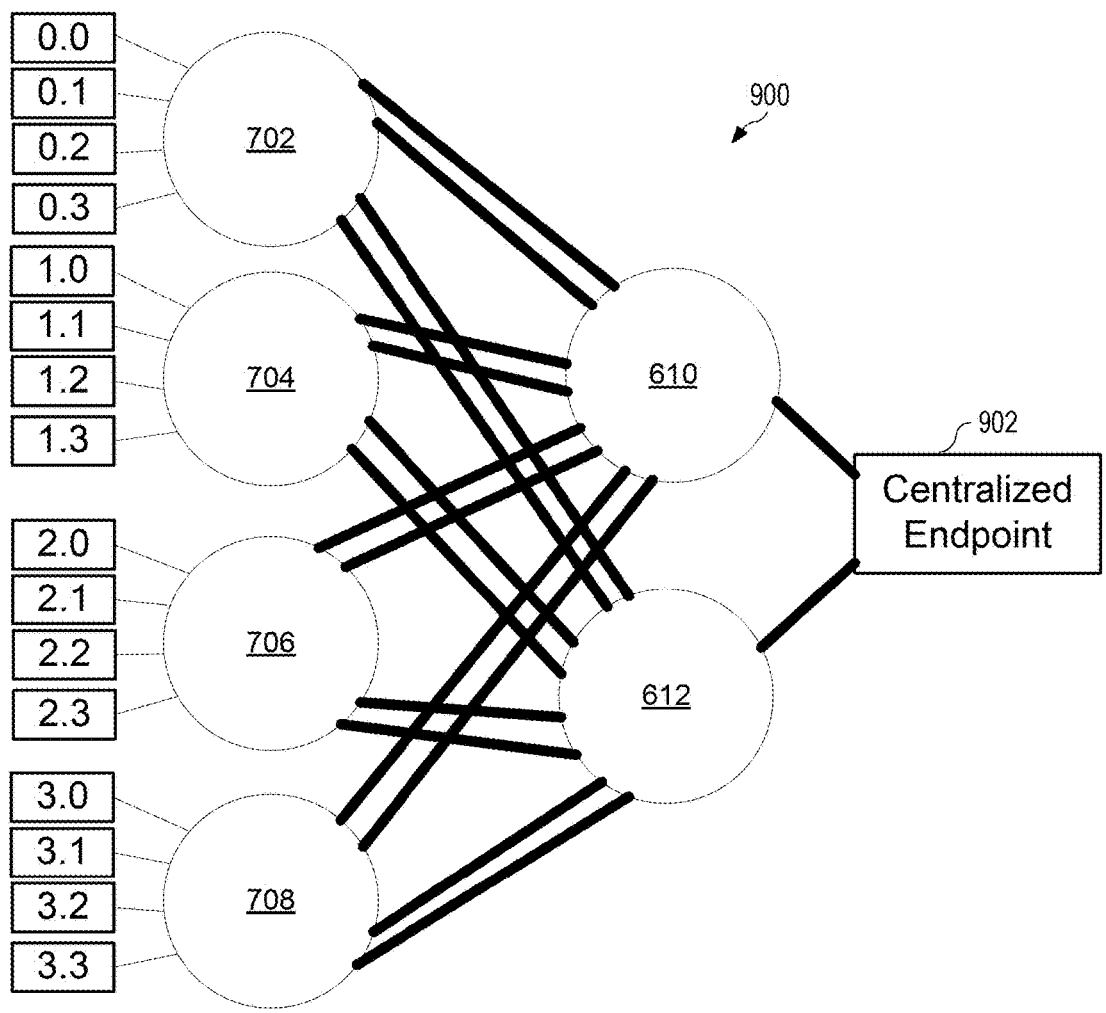
FIG. 11 is a logical diagram of SoC 900 of FIG. 9.

FIG. 11 is a topological diagram of the layout shown in FIG. 9. In this embodiment, stage(2) routers 610 and 612 are centrally located on SoC 900. This minimizes the length of the longest transmission and avoids significant mismatches in the propagation of transmissions using different routing. Of importance, in this embodiment, centralized endpoint 902 is connected to both stage(2) routers 610 and 612. The connection between stage(1,3) and stage(2) routers supports hierarchical communication in which the stage(2) routers are at a higher level of hierarchy than the stage(1,3) routers. Thus, SoC components that are centralized for the SoC can be connected to directly to the stage(2) routers. This reduces the hop count to 2 routers from the centralized endpoint 902 to the leaf endpoints (0.0-3.3) as compared to 3 hops if the centralized entity would be connected to stage(1,3).

Figure 12:
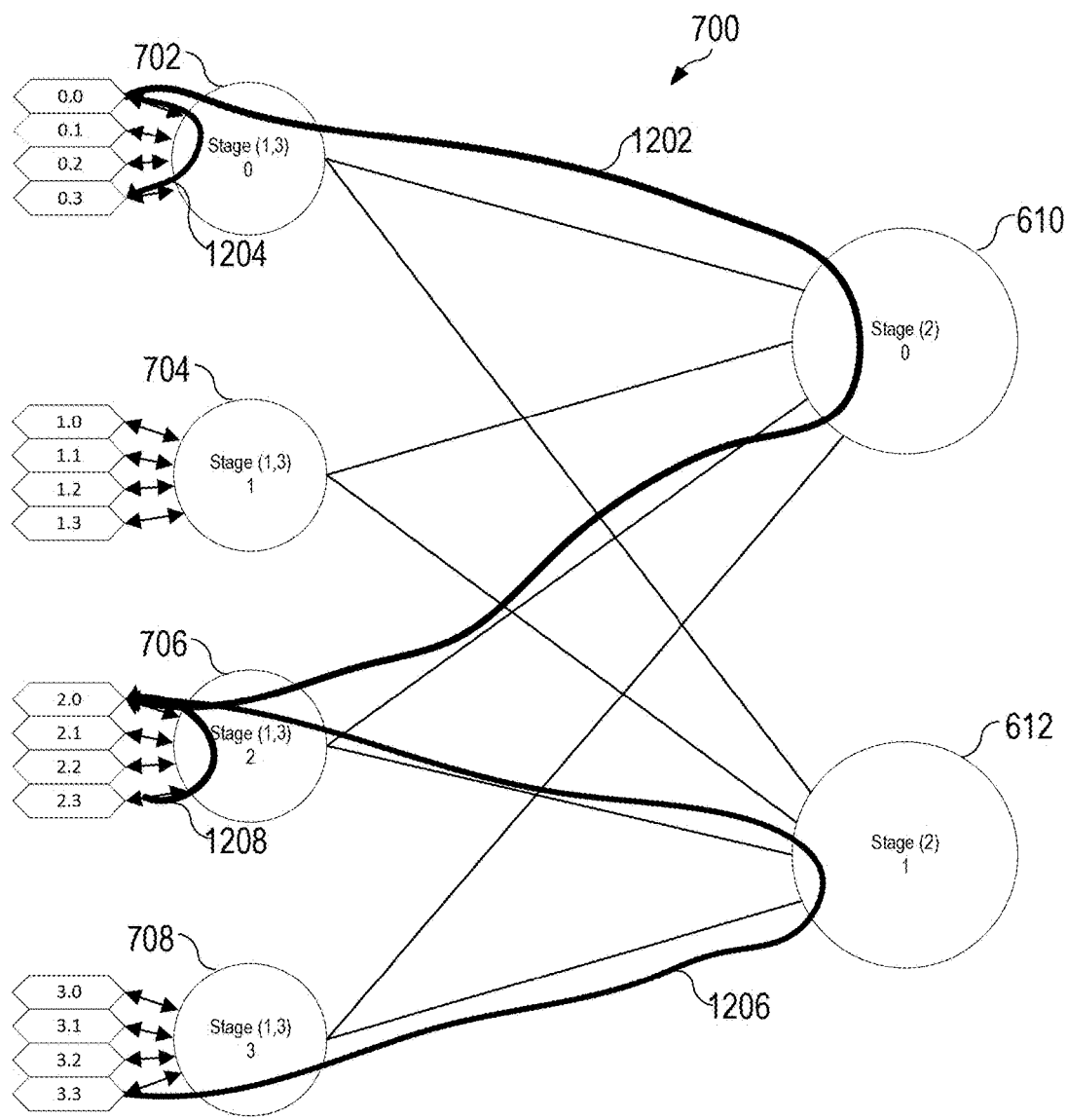
FIG. 12 is a simplified diagram of network 700 showing the paths of four flows of data transmissions.

FIG. 12 is a simplified diagram of network 700 showing the path of four flows of data transmissions. Path 702 is a transmission from component 0.0 to component 2.0. This path goes from stage(1,3) router 702, through stage(2) router 610, through stage(1,3) router 706 to component 2.0. Of note, this transmission could have been routed through stage(2) router 612 and this route would not have impacted performance. Thus adding stage(2) routers allows for scaling of the network 700. For example, if network 700 had four stage(2) routers, there would be four possible pathways.

The use of additional routes is illustrated by route 1206 of FIG. 12. This path goes from stage(1,3) router 708, through stage(2) router 612, through stage(1,3) router 706 to endpoint 2.0. If only stage(2) router 610 were available, routes 1202 and 1206 would share the connection from stage(2) router 610 to stage(1,3) router 706. Therefore, the bandwidth received by each flow would be reduced. An additional benefit of the embodiment of FIG. 12 is that it can be scaled at a fine rate of granularity by adding additional stage(2) routers. An additional route shown is route 1208. This path goes from endpoint 2.3 to endpoint 2.0 via stage(1,3) router 706. Thus, three flows (1202, 1206 and 1208) are contending for the link to endpoint 2.0 and each flow must be regulated to ⅓ bandwidth. However, by using virtual next hop queues and virtual output queues as explained in below with regard to FIGS. 18 through 24A and 24B, even though path 1202 is limited to ⅓ bandwidth, path 1204 is not limited because embodiments described herein prevent blocking of path 1204 by the slower path 1202.

Figure 13:
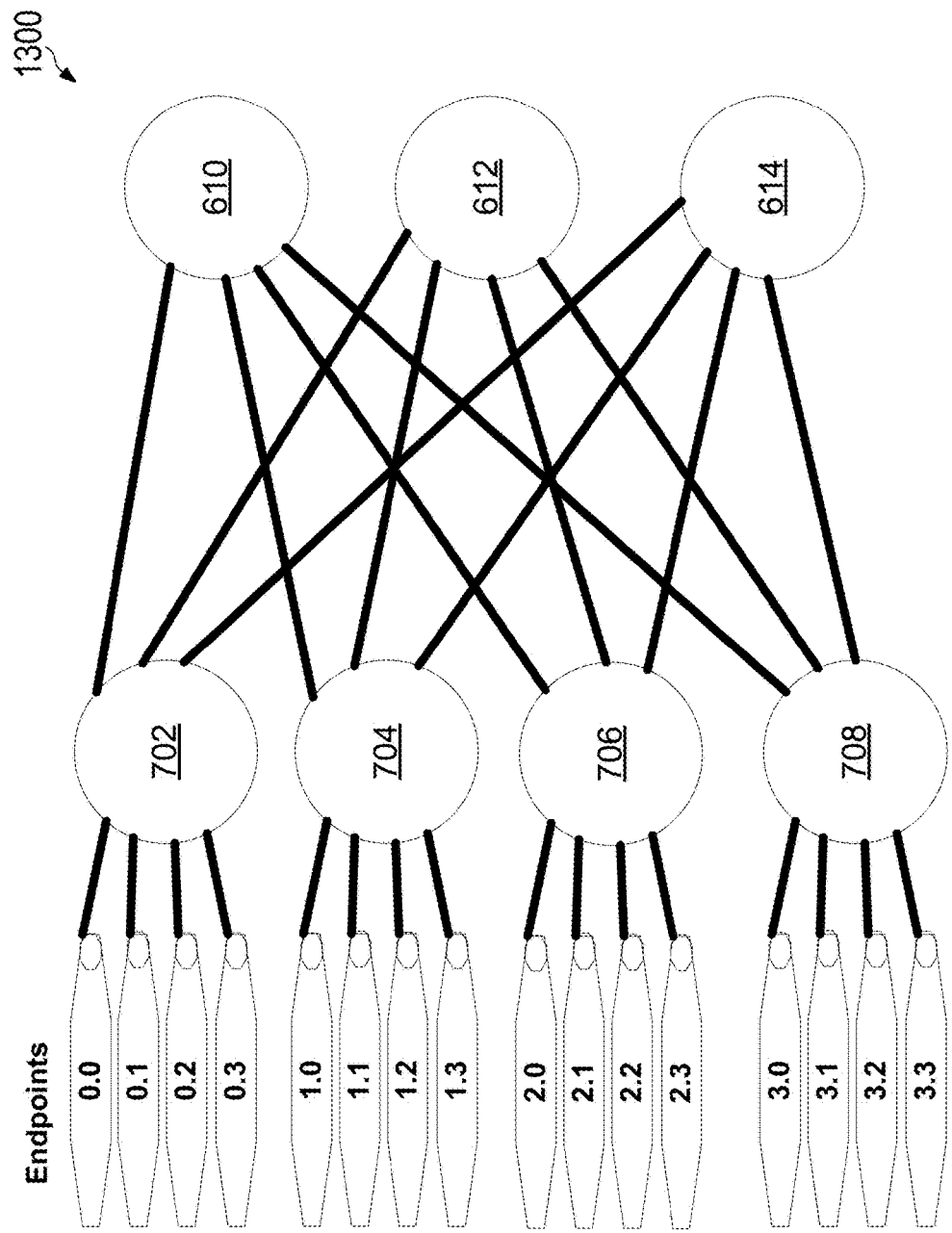
FIG. 13 is a diagram of a Clos-type network with 16 endpoints (0.0-3.3) connected according to an embodiment of the invention.

FIG. 13 shows 16 endpoints (0.0-3.3) connected by a network according to an embodiment of the invention. The 16 endpoints are connected to four stage(1,3) routers 702, 704, 706 and 708. Those stage(1,3) routers are connected to three stage(2) routers 610, 612 and 614. In network 1300, there are 16 total endpoints. Therefore, for each endpoint, there are 15 potential destinations. Three of those destinations are local to the stage(1,3) router attached to the endpoint, so the loading on the links from Stage(1) to Stage(2) is 12/16 per endpoint or 0.75 of capacity. In addition, there is a loading factor calculated by the ratio of the number of links between stage(1,3) and the endpoints to the number of links between stage(1,3) to stage(2). In the case of network 800, this ratio is 4/3=1.33. So the loading on network 800 is 0.75×1.33=1. Therefore, the available headroom capacity is 1/1=1.

Figure 14:
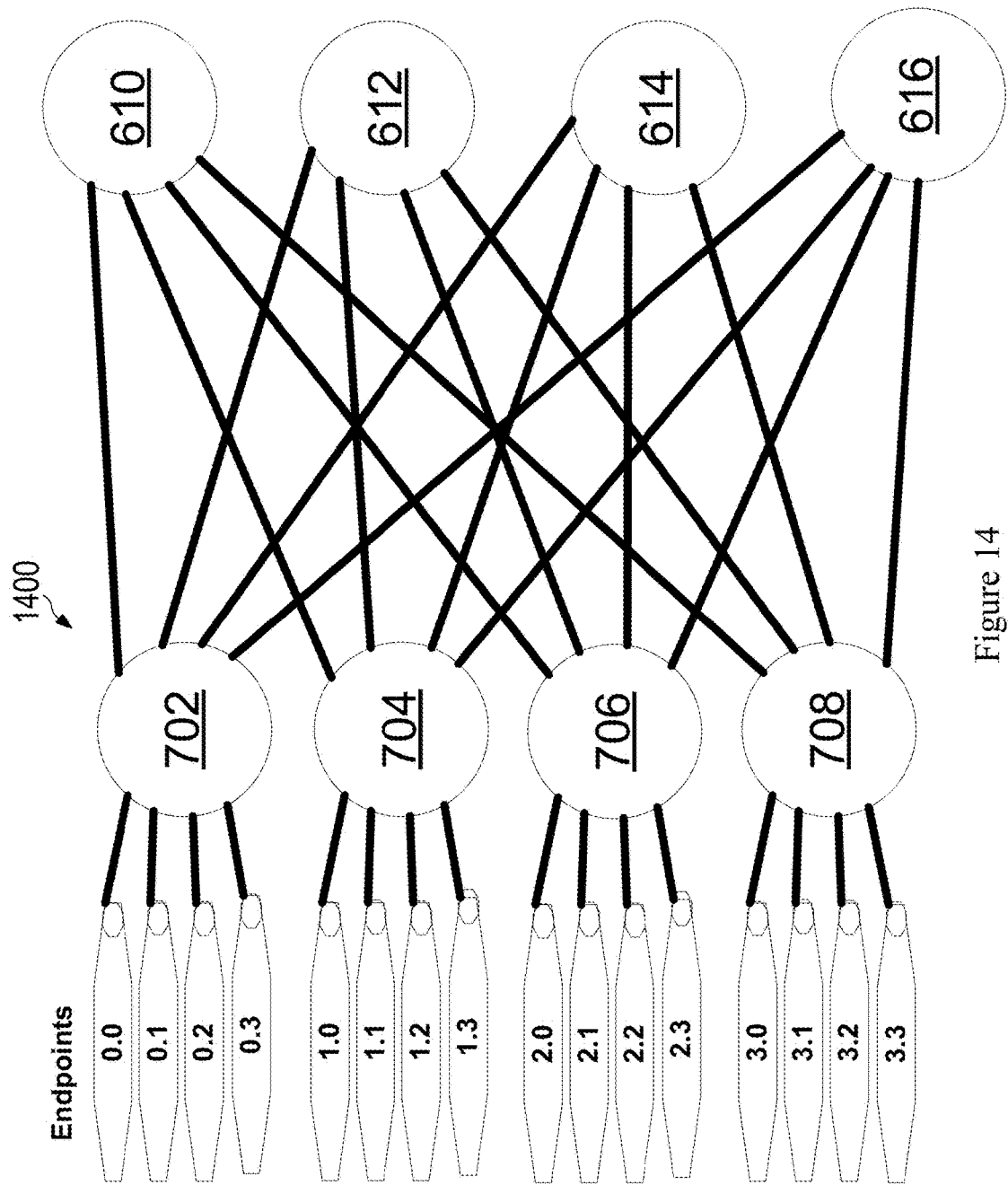
FIG. 14 is a diagram of another embodiment Clos-type network as shown in FIG. 13 which shows increased network capacity by adding an additional Stage(2) router.

FIG. 14 is an illustration of network 1400. Network 1400 is like network 1300 in that it has four stage(1,3) routers 702, 704, 706 and 708. However, network 1400 includes four stage(2) routers 610, 612, 614 and 616 compared to the three stage(2) routers in network 1300. The number of endpoints is the same, so the basic loading factor remains 12/16 or 0.75. However, the ratio of the number of links between Stage(1,3) and the endpoints to the number of links between Stage(1,3) and Stage(2) is now 1. Thus, the total loading factor is 0.75×1=0.75. Thus, the available headroom is 1/0.75=1.33. This additional headroom can be used to accommodate traffic patterns which are non-uniform, and therefore cause over-subscription on any of the links in the NoC. Therefore, headroom capacity needs of the network can easily be accommodated by adding stage(2) routers. In addition, only four two-way buses are added by adding stage(2) router 616. Therefore, adding headroom capacity provides minimal layout and routing complications.

Figure 15:
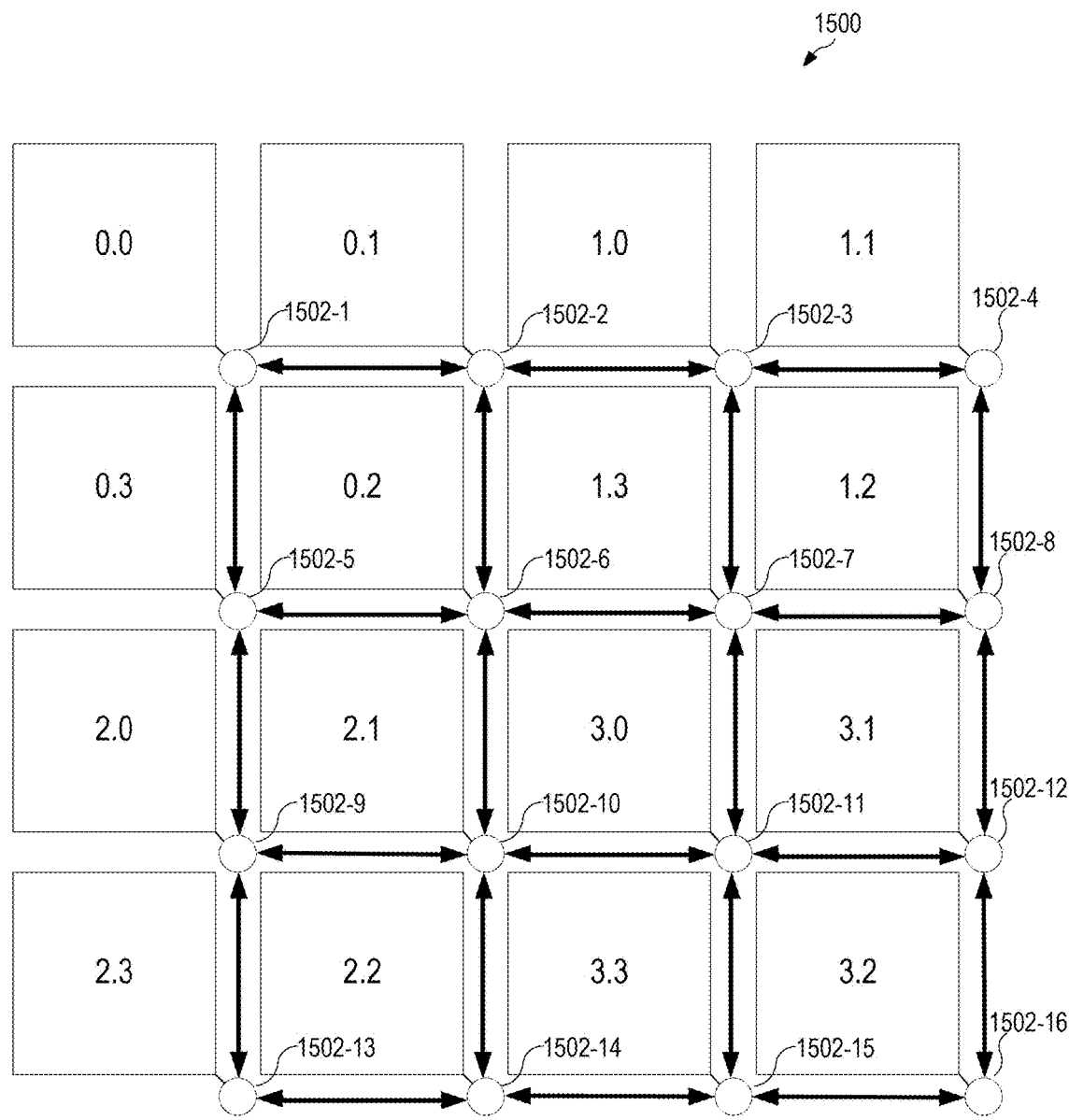
FIG. 15 is a diagram of a 2-dimensional mesh network supporting N=16 Endpoints.

FIG. 15 shows a simple mesh network 1500 with 16 endpoints (0.0-3.3). As an example, if a flit must be transferred from endpoint 0.0 to endpoint 3.2, the flit must pass through router 1502-1 and then at least five other of 1502-2 through 1502-15 to reach endpoint 3.2 through router 1502-16.

Figure 16:
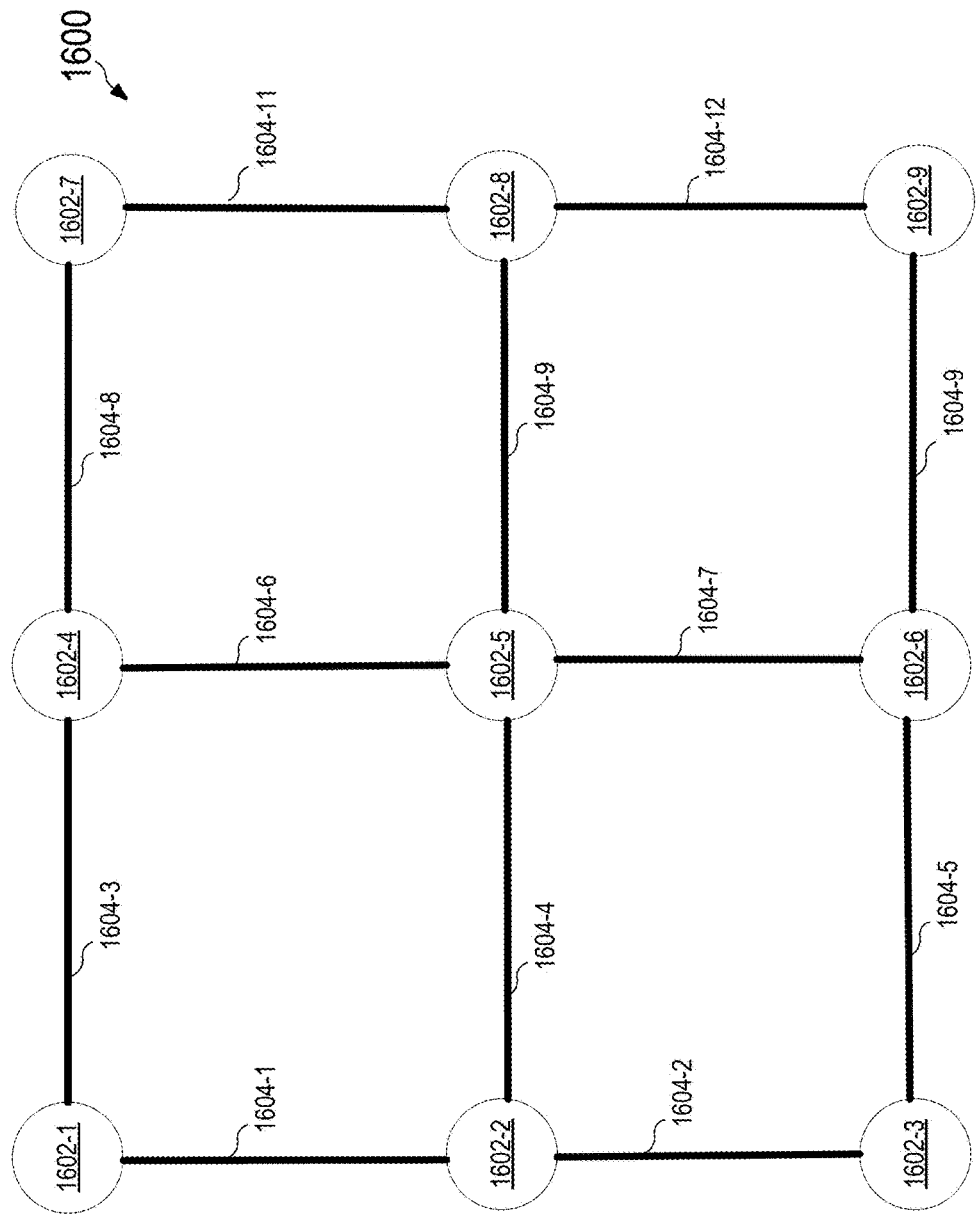
FIG. 16 is a mesh network as in FIG. 15 showing only the routers.

FIG. 16 is a mesh network 1600 that is a simplified version of network in FIG. 15 in that mesh network 1500 is limited to nine routers 1602-1 through 1602-9. FIG. 16 is a version of mesh network 1500 with the endpoints excluded for clarity. Each router of network 1600 has an endpoint connected to it, as in network 1500. Unlike network 1400, to expand a mesh network like network 1600 of FIG. 16, additional paths must be added between each router. Network 1600 includes nine routers 1602-1 through 1602-9 connected by 12 links 1604-1 through 1604-12.

Figure 17:
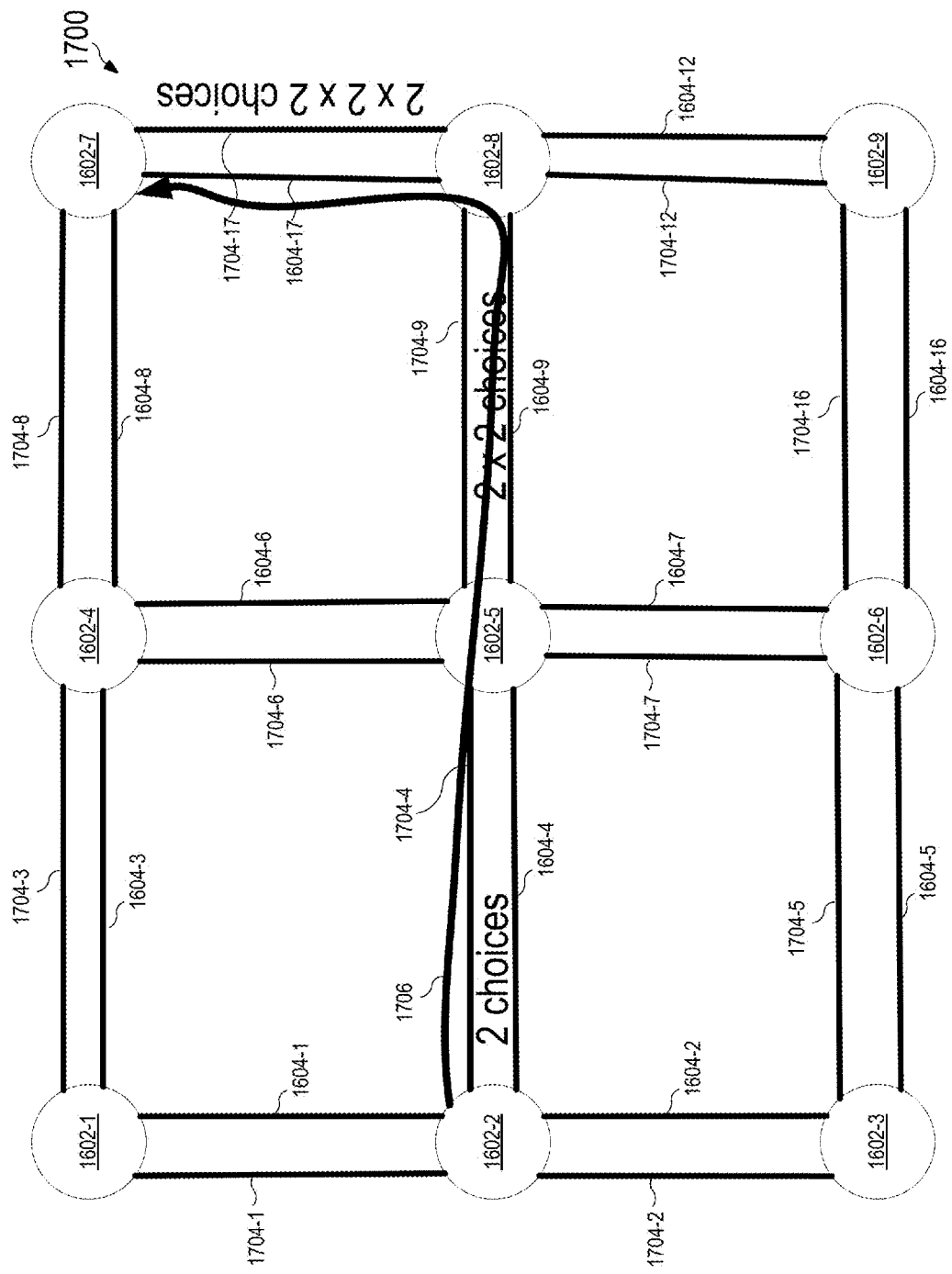
FIG. 17 is a diagram illustrating expanding the capacity of the mesh network of FIG. 16.

FIG. 17 illustrates expanding capacity of network 1600. In this example, to expand capacity requires using an additional link for each of links 1604-1 through 1604-12 must be added. This is shown in FIG. 17. In addition to the routers of network 1600, network 1700 includes 12 additional links 1704-1 through 1704-12. This provides approximately double the capacity, but requires 12 more links for this fairly simple network. In addition, this exponentially complicates routing. Assuming a horizontal (x direction), followed by vertical (y direction) routing, the number of possible routes is xy where x is the number of links between routers and y is the number of hops. In the example route 1706 of FIG. 11, x is 2 and y is 3, so 8 possibilities must be processed for a three hop route. Routing from router 1602-3 to 1602-7 requires four hops, which provides $2^4$=16 possibilities, which is even more complicated. Adding an additional line between routers would involve $3^4$=81 possibilities, which complicates routing, makes load-balancing difficult, resulting in degraded performance. Therefore, the 2D Mesh topology presents more routing challenges when scaling, compared to the Clos topology of FIGS. 13 and 14.

Figure 18:
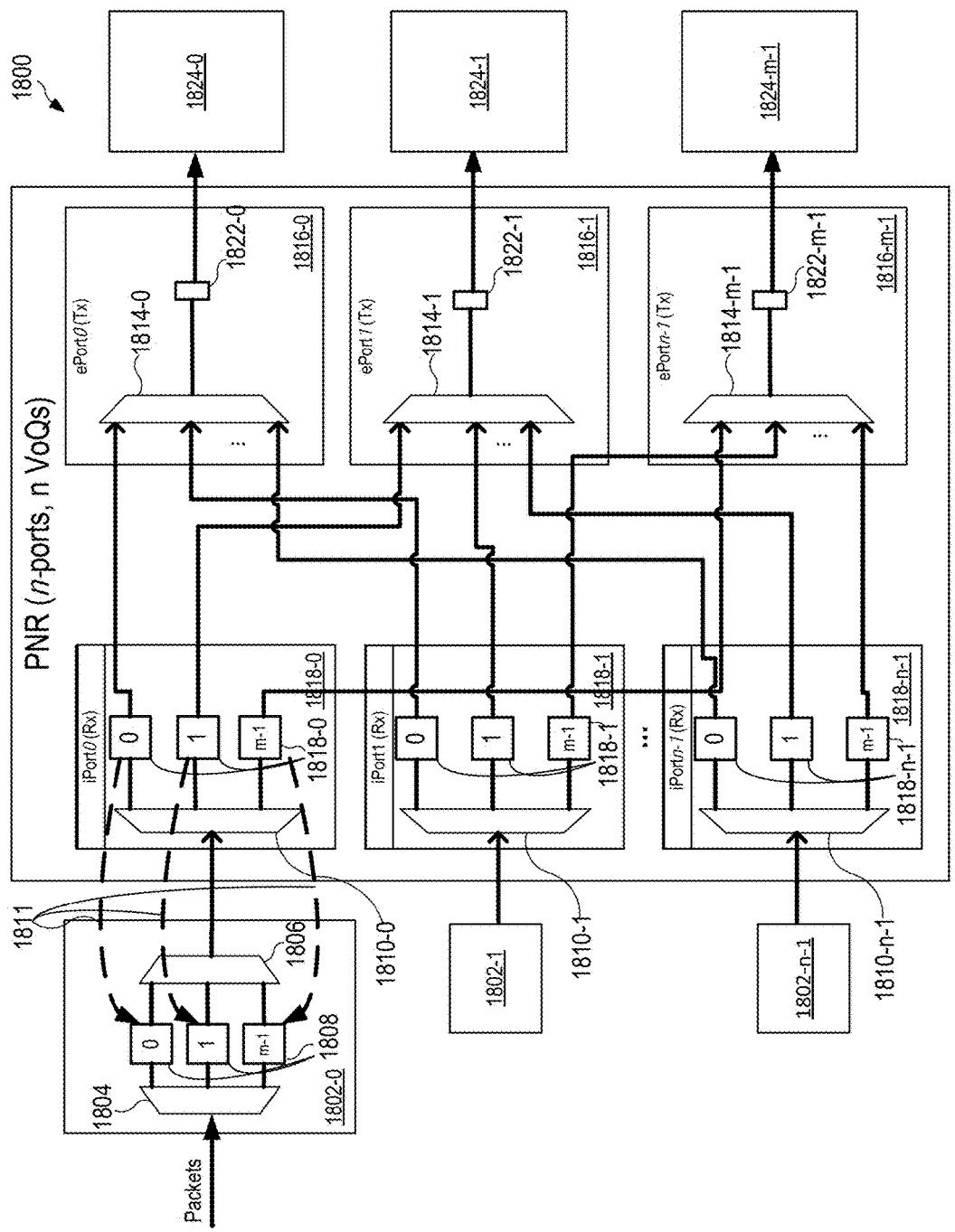
FIG. 18 is a schematic diagram of a type of router that may be used as a router in the previously described embodiments, but includes virtual output queueing (VOQ) and next-hop virtual output queueing (NHVOQ)

FIG. 18 is a schematic diagram of multiple (three) interposers and a single router that may be used as a router in the previously described embodiments, but includes virtual output queueing (VoQ) and next-hop virtual output queueing (NHVoQ). Data is provided to router 1800 from interposers 1802-0 through 1802-$n$-1, where n is the total number of inputs. Router 1800 is a stage(1,3) router and the interposers are connected to the endpoints providing the data for transmission.

Each of interposers 1802-0 through 1802-$n$-1 includes a demultiplexer 1804 and a multiplexer 1806. Demultiplexer 1804 feeds m next-hop virtual output queues (NHVoQs) 1808, where m is the number of output ports 1816-0-1816-$m$-1. NHVoQs 1808 correspond to the Tx queues in ITP 215 of FIG. 2. NHVoQs 1808 each include one or more registers. A better embodiment includes at least two registers, but may include many more registers. Each register is capable of storing an entire data flit with its associated control signals. A "flit" is defined as a part of a data message which fits within one cycle on a bus. A "packet," is composed of one or more flits. In this embodiment, the NHVoQs are configured in a first-in, first-out (FIFO) configuration. In one embodiment, data is stored in the NHVoQ that corresponds to the output port to which the data is directed. In the router, each input port 1818-0-1818-$n$-1 includes m virtual output queues (VOQs) 1812-1812-$m$-1.

Router 1800 uses a credit-based flow-control scheme to reduce Head-of-Link (HoL) blocking between the interposer and the router. That means that before data is allowed to be transferred out of, for example queue 0 of NHVoQ 1808, queue 0 must receive a credit 1811 from queue 0 of VoQ 1812-0. Generally, a credit is issued when a data flit is transferred out of queue 0 of VoQ 1812-0. However, other criteria may be usefully employed with this embodiment.

To illustrate the operation of router 1800, an example data transfer from the input of interposer 1802-0 to output interposer 1824-1 is described. The data flit is received by demultiplexer 1804. In this embodiment, the data is routed by demultiplexer 1804 to queue 0 of NVHoQ 1808, in accordance with its destination output-port, which is provided along with the data flit. When a credit is provided to queue 1 of NHVoQ 1808 from queue 1 of VoQ 1812-0, queue 1 of NHVoQ is eligible to be chosen by multiplexer 1806. At some point, the head-of-line flit in queue 1 of NHVoQs is selected by multiplexer 1806 and transmitted to demultiplexer 1810-0 and then stored in queue 1 of VoQ 1812-0. The data is then transferred to multiplexer 1814-0 and stored in output buffer 1822-1. The data is then transferred to interposer 1824-1 which serves the receiving Endpoint. Interposer 1824-1 may or may not include a NHVoQ system like interposer 1802-0. In a similar manner, in one embodiment, every transfer may be controlled by credit signal provided from a subsequent queue.

Figure 19:
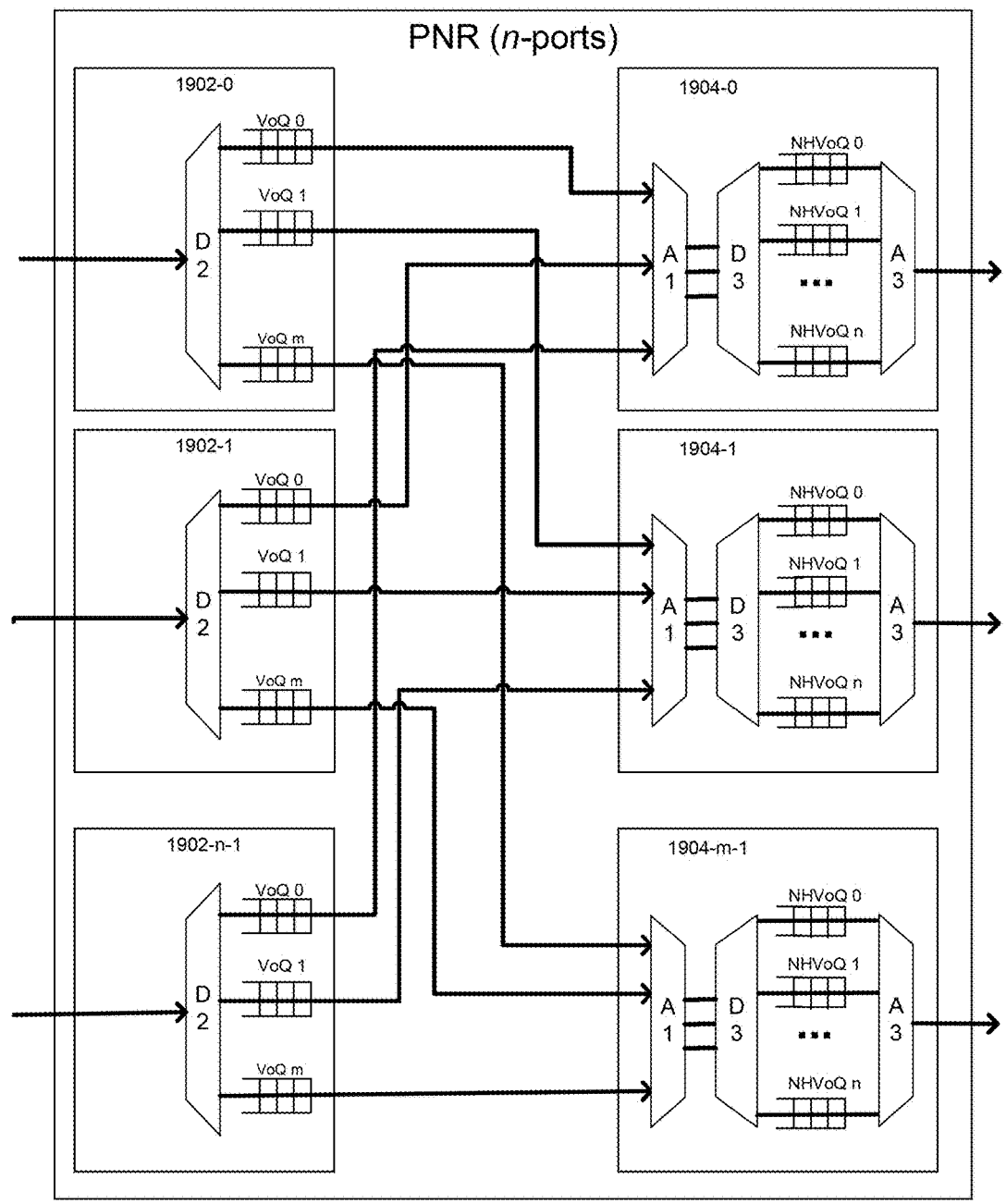
FIG. 19 is a diagram of another embodiment router, such as for a Stage(2) router.

FIG. 19 illustrates another embodiment. Router 1900 includes n input ports 1902-0-1902-n-1 and m output ports 1904-0-1904-m-1. In this configuration, each input port includes a VoQ for each output and each output port includes an NHVoQ corresponding to the next Stage's VoQ. NHVoQs corresponding to each VoQ would be included in an interposer on each input, but are excluded here for clarity. As with the embodiment of FIG. 18, a credit based system is used to prevent HoL blocking when transferring from the NHVoQ to the next Stage's VoQ. Also, the VoQ in the router is used to prevent HoL blocking to the output ports.

Figure 20:
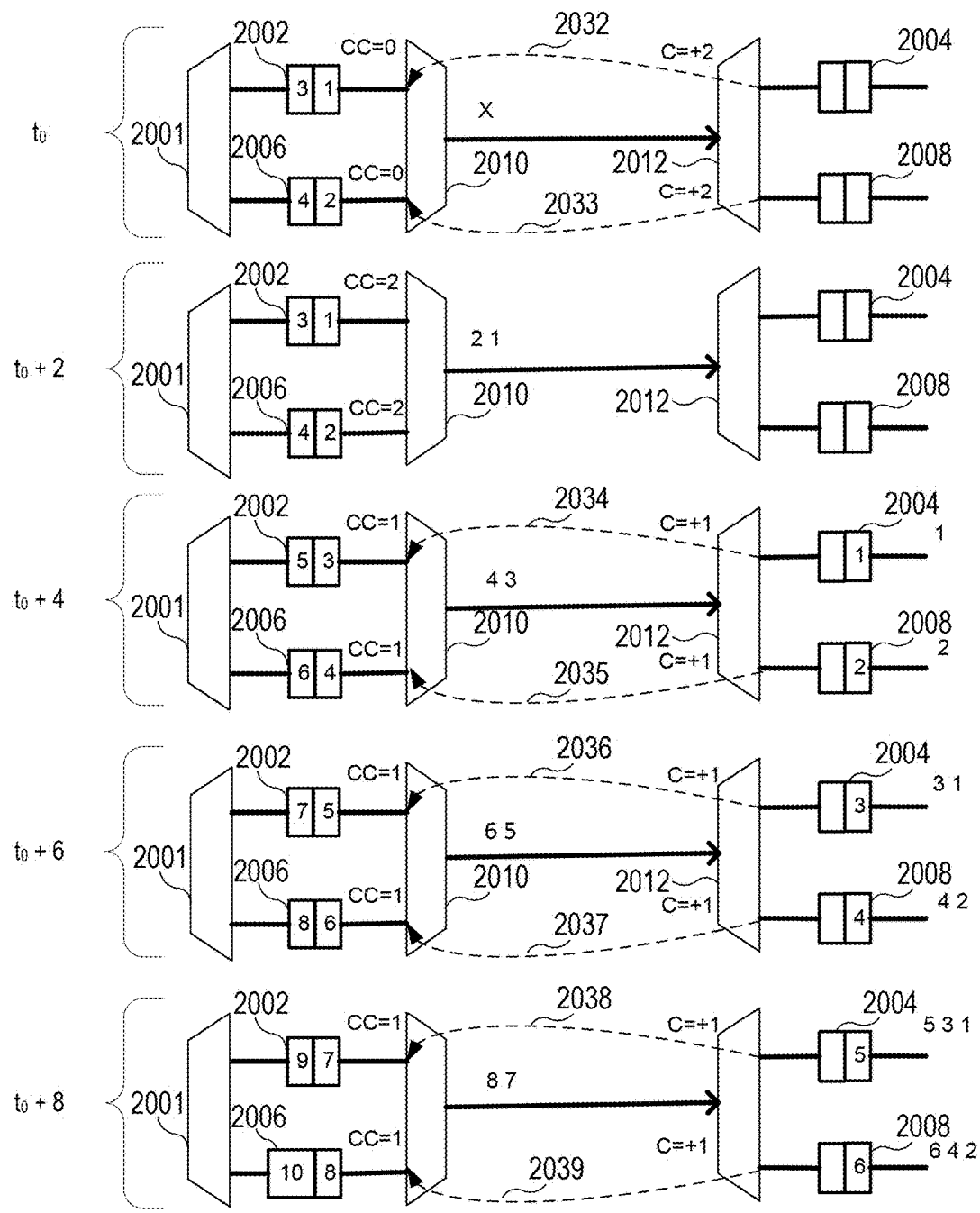
FIG. 20 is a diagram illustrating the operation of a credit based system.

FIG. 20 further illustrates the operation of a credit based system. Queues 2002 and 2006 receive data from demultiplexer 2001 Queue 2002 is an NHVoQ and the next hop is VoQ 2004 via multiplexer 2010 and demultiplexer 2012. Each of times $t_0$ to $t_0+8$ include two clock cycles, and thus two data flits are transferred in each step. At time $t_0$, VoQ 2004 is empty, so it has two spots available. Therefore, it provides a credit 2032 of +2 to NHVoQ 2002 at time $t_0$. Using this credit, data flit 1 is transferred to VoQ 2004 at time $t_0+2$. While data flit 2 is being transferred, data flit 1 is delivered downstream (time $t_0+4$) and thus an additional credit 2034 of +1 is provided to NHVOQ 2002.

As with queue 2002, queue 2006 is an NHVoQ and the next hop is to VoQ 2008 via multiplexer 2010 and demultiplexer 2012. NHVoQ 2006 and VoQ 2008 provide another channel to that of NHVoQ 2002 and VoQ 2004. At time $t_0$, VoQ 2008 is empty, so it has two spots available. Therefore, it provides a credit 2033 of +2 to NHVoQ 2006 at time $t_0$. Using this credit, data flit 3 is transferred to VoQ 2008 at time $t_0+2$. While data flit 4 is being transferred, data flit 3 is delivered downstream and thus an additional credit 2035 of +1 is provided to NHVoQ 2006.

This process continues at times $t_0+6$ and $t_0+8$ where credits 2036, 2035, 2038 and 2039 are provided as data is moved out of VoQs 2004 and 2006. Using the combination of VoQ and NHVoQ prevents the HoL blocking problem. The HoL blocking problem occurs when a flit cannot go to its next hop and is at some choke point. Therefore, the flit blocks the path of other flits that are trying to pass through the choke point.

Figure 21:
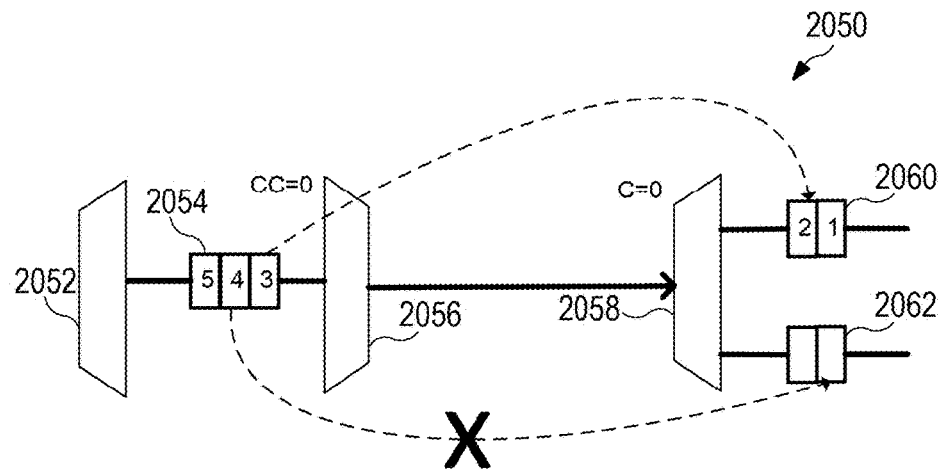
FIGS. 21 is a diagram illustrating the HoL problem.

FIG. 21 illustrates the HoL problem. In this illustration, queue 2060 is full and cannot move for several clock cycles. This could be due to flit 1 not being routed to its destination due to contention. Flit 3 in queue 2054 is directed to queue 2060, but cannot get a credit and thus cannot be moved out of queue 2054. Flits behind flit 3, such as flit 4 that are directed to a different output queue cannot exit queue 2054 even though their destination queue 2062 is empty.

Figure 22:
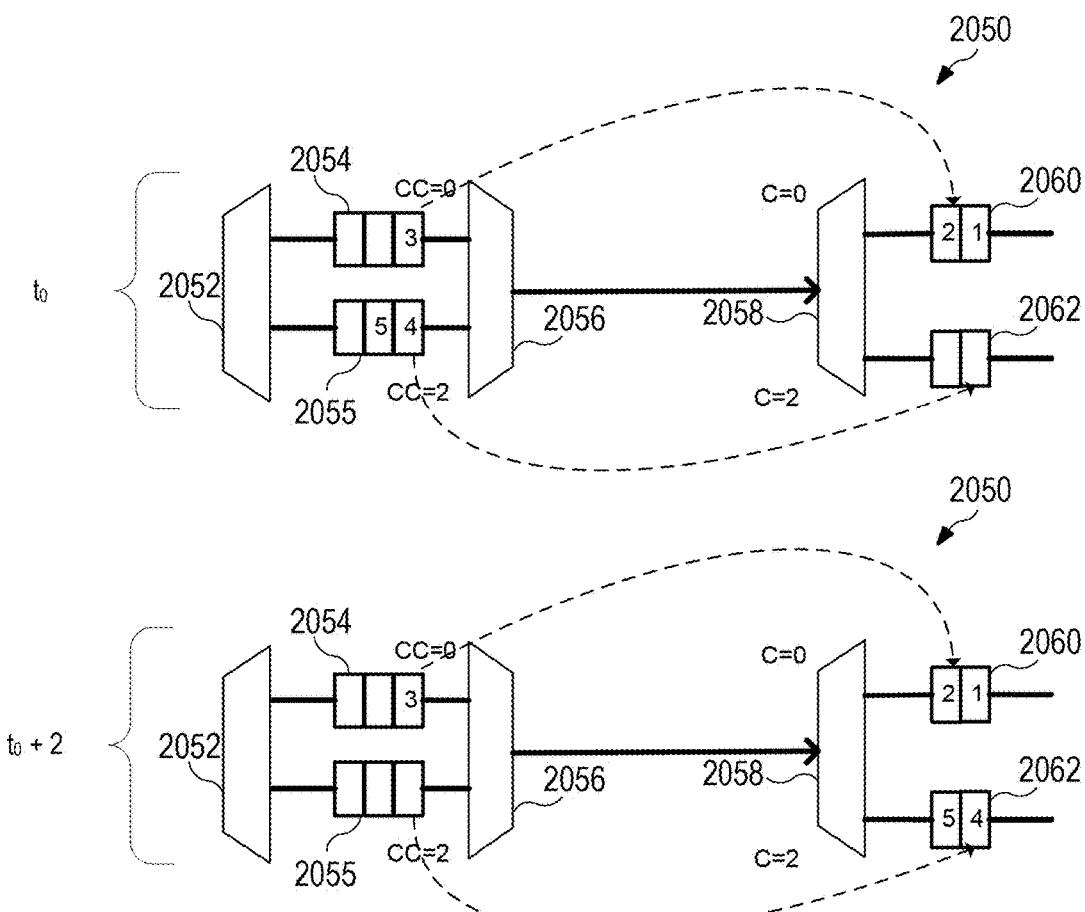
FIG. 22 is a diagram illustrating how described embodiments avoid the HoL problem illustrated in FIG. 21.

FIG. 22 illustrates how next hop virtual output queues avoids the HoL problem. In FIG. 22, queues 2054 and 2055 are configured as next hop queues. That is, flits directed to virtual output queue 2060 are queued in queue 2054 and flits directed to virtual output queue 2062 are queued in queue 2055. At time $t_0$, the two credits available from VoQ 2062 can be used to move flits in NHVoQ 2055 because flit 3 is no longer blocking flits 4 and 5. After two cycles (i.e.at time $t_0+2$), flits 4 and 5 are in VoQ 2062, even though flits 1 and 2 have been unable to move do to downstream issues. Thus, providing an NHVoQ with a VoQ using a credit based system avoids the HoL problem.

FIG. 23 shows an embodiment implementing FIGS. 7 and 8 in which an interposer, stage(1,3) router and stage(2) router are connected. Network 2300 shows one stage(1,3) router 2310-x. However, this represents K stage(1,3) routers as indicated by x ranging from 0 to K−1. Similarly, one stage(2) router 2340-y is shown in FIG. 23, but this represents M stage(2) routers as indicated by y ranging from 0 to M−1. L is the number of endpoints per stage(1,3) router. So the endpoints connected to stage(1,3) router 2310-x are denoted x.0 to x.L−1. Each stage(1,3) router has L interposers 2302-0 through 2302-L−1 receiving transmissions from endpoints x.0 to x.L−1, respectively. Each interposer includes a demultiplexer 2304 and a multiplexer 2306.

Each interposer 2302 includes 0 through L−1 and L through L+M−1 next hop virtual output queues. This corresponds to the queues 2312-x for each input of stage(1,3) router. This also corresponds to the Tx queues in ITP 215 of FIG. 2. At the input of each stage(1,3) router, there are two places that a data flit may be directed: 1) to another endpoint connected to that stage(1,3) router or 2) to one of the stage 2 routers. Including the endpoint from which the flit is transmitted, there are L endpoints to which the flit may be directed and M stage(2) routers. In some circumstances, it may be useful to route the flit back to its original endpoint (as shown in FIG. 23) or to include an additional route for other purposes. Thus L queues (labeled 0 to L−1) are used plus M queues (labeled L to L+M−1) in each interposer. Queues 2308 are next hop virtual output queues that correspond to virtual output queues 2312. As with the embodiment of FIG. 12, a credit-based flow-control scheme is used to reduce HoL blocking between the interposer and the router. Each of the queues can consist of any number of registers and the queues may be configured in a first-in-first-out (FIFO) configuration.

Demultiplexer 2311-x routes the data flit to its appropriate queue in queues 2312-x, which is then transmitted to either an endpoint output port 2314-x (0, L−1) or to a stage(2) output multiplexer 2326-x (0, M−1). Each output port 2314-x to an endpoint has one multiplexor 2315-x and one NHVoQ 2316-x. Each output port 2314-x to an endpoint is connected to a receiving interposer 2318-x, which may or may not include a virtual output queue. The receiving interposer outputs its flits to the endpoint x.0-x.L−1 to which it is attached.

If the data flit is directed to a stage(2) router, the data flows from various points are multiplexed by multiplexer 2328-x and then demultiplexed by demultiplexer 2330-x to one of K queues 2331-x (0 to K−1), where K corresponds to the number of stage(1,3) routers. Note that multiple flits can be transferred in each clock cycle from the multiplexer 2328 to demultiplexer 2330. The max number of flits which can be transferred is the minimum of {L, K}. Queues 2331-*x* provide the NHVoQ to VoQs 2346-*y* via multiplexers 2332-*x* and demultiplexers 2343-*x*.

In stage(2) router 2340-*y*, demultiplexer 2344-*y* places the flit into the appropriate VoQ 2346-*y* (0, K−1) for one of K stage(1,3) routers 2310-*x*. The output of queues 2346-*y* are multiplexed by multiplexor 2348-*y*. Note that multiple flits can be transferred in each clock cycle from the multiplexer 2348 to demultiplexer 2350. The maximum number of flits that can be transferred is the minimum of {K, L}. The destination router has been defined at this point, so demultiplexer 2350-*y* now places the flit in one of L NHVoQs 2351-*y*. There are L queues because there are L endpoints attached to each stage(1,3) router. NHVoQs 2351-*y* correspond to VoQs 2324-*x* at the input of the destination stage (1,3) router. Input ports 2320-*x* only have L VoQs 2324-*x* (0, L−1). This is because data coming from a stage(2) router will not be routed to another stage(2) router by the stage(1,3) router, but rather it will only be routed to one of the L endpoints connected to that stage(1,3) router.

Figure 24A:
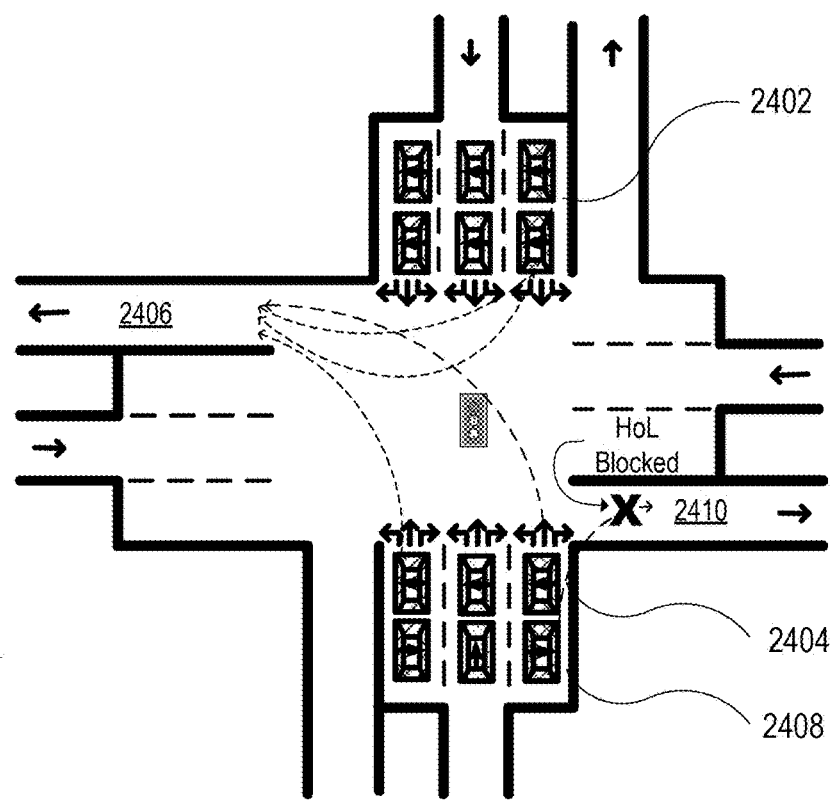
FIGS. 24A and B are diagrams illustrating the HoL problem using a traffic analogy.
Figure 24B:
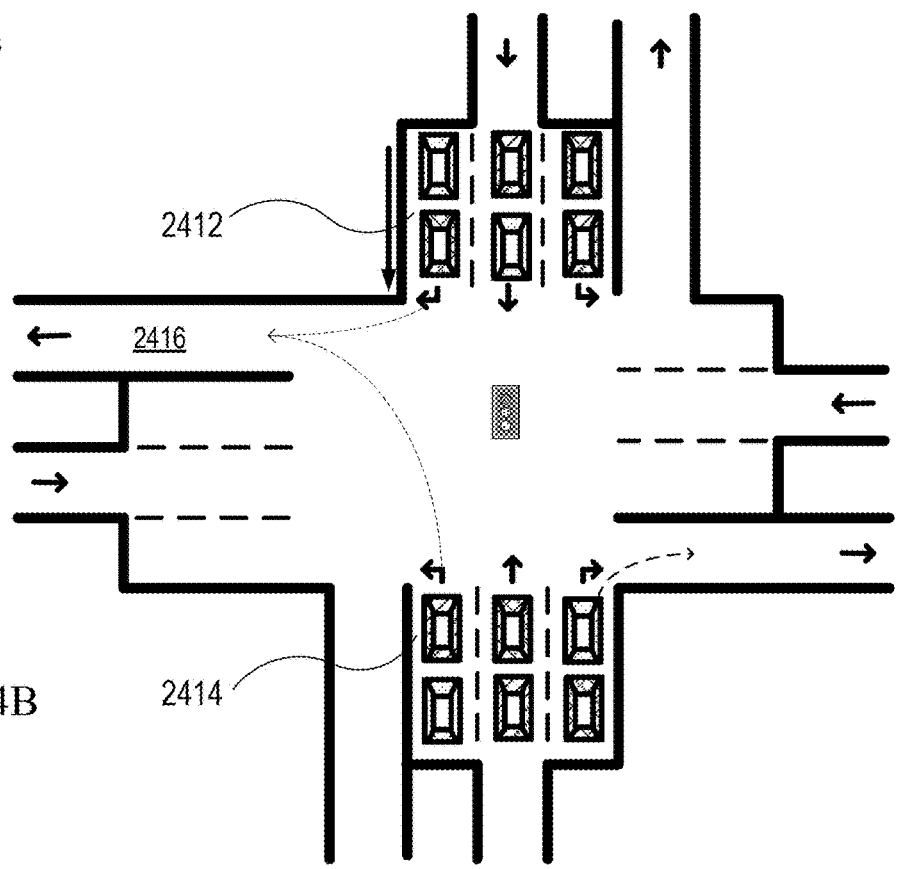

FIGS. 24A and B illustrate the HoL problem using a traffic analogy. FIG. 24A is configured using a Virtual Channel queueing structure. In this type of structure, data flits (illustrated as cars) are queued according to their assigned VC. An assigned VC could represent a priority-level or some type of traffic. A particular data flit may be directed in any direction. In FIG. 24A, two data flits of type 3 are queued in queue 2402, where the HOL data flit is directed to output port 2406. Data flit 2404 is also directed to port 2406, but must wait for the traffic from queue 2402. Because of this, flit 2408, which is directed to port 2410 must wait until flit 2404 clears, even though port 2410 is clear and ready to accept flit 2408. In contrast, FIG. 24B illustrates next hop virtual queueing in accordance with the teachings of this specification. Each input to the intersection has a queue for each possible direction. In the analogy of FIG. 24B, there is one queue for right turns, one queue to go straight and one queue to turn left. A flit may be required to wait, but only because its destination port has high traffic. No queue is blocked by traffic destined to another port. In FIG. 24B, both queues 2412 and 2414 are directed to output port 2416 and in no other direction. Thus, flits in those queues are only impeded by traffic on port 2416 and not by traffic on any other port.

Figure 25:
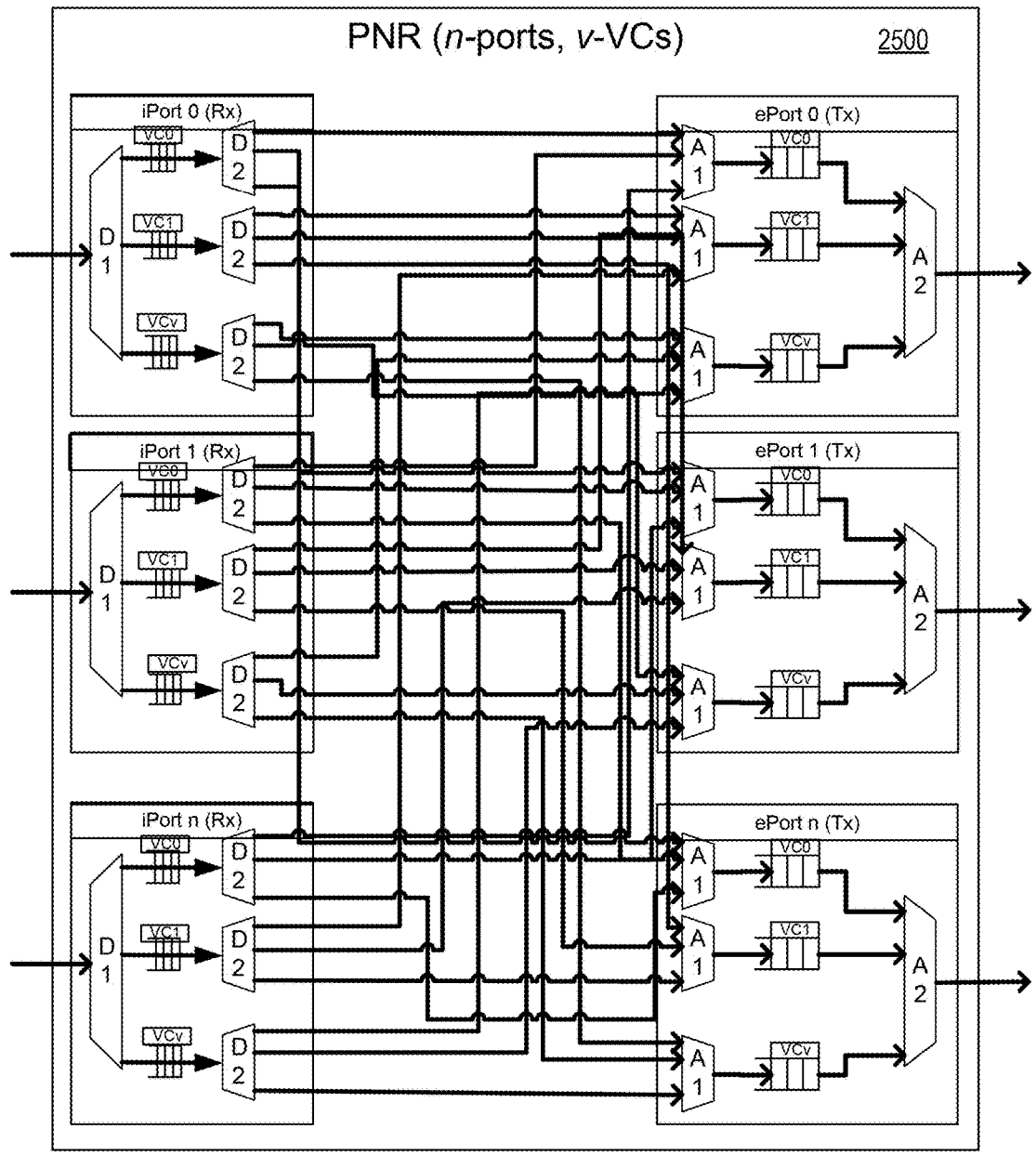
FIG. 25 is a diagram showing a router using a Virtual Channel (VC) queueing.

FIG. 25 shows a router using a Virtual Channel (VC) queueing. An additional disadvantage of VC queueing is that it requires connections to every output multiplexer. As can be seen from router 2500, the router requires n (n is the number of input ports) times m (m is the number output ports) internal buses times v (v is the number of VC queues). For 8 inputs, 8 outputs, and 4 VCs, there must be 8×8×4=256 internal buses in the router. As noted above, each bus may have hundreds of wires. This means that this configuration requires hundreds of thousands to millions of wires in one router. This creates problems in layout since the routing tool must route each wire using the various metal layers. A comparison with router 1800 of FIG. 18 shows that router 1800 routs the same traffic using 8×8=64 internal buses, which is far more efficient in terms of space and energy.

Figure 26:
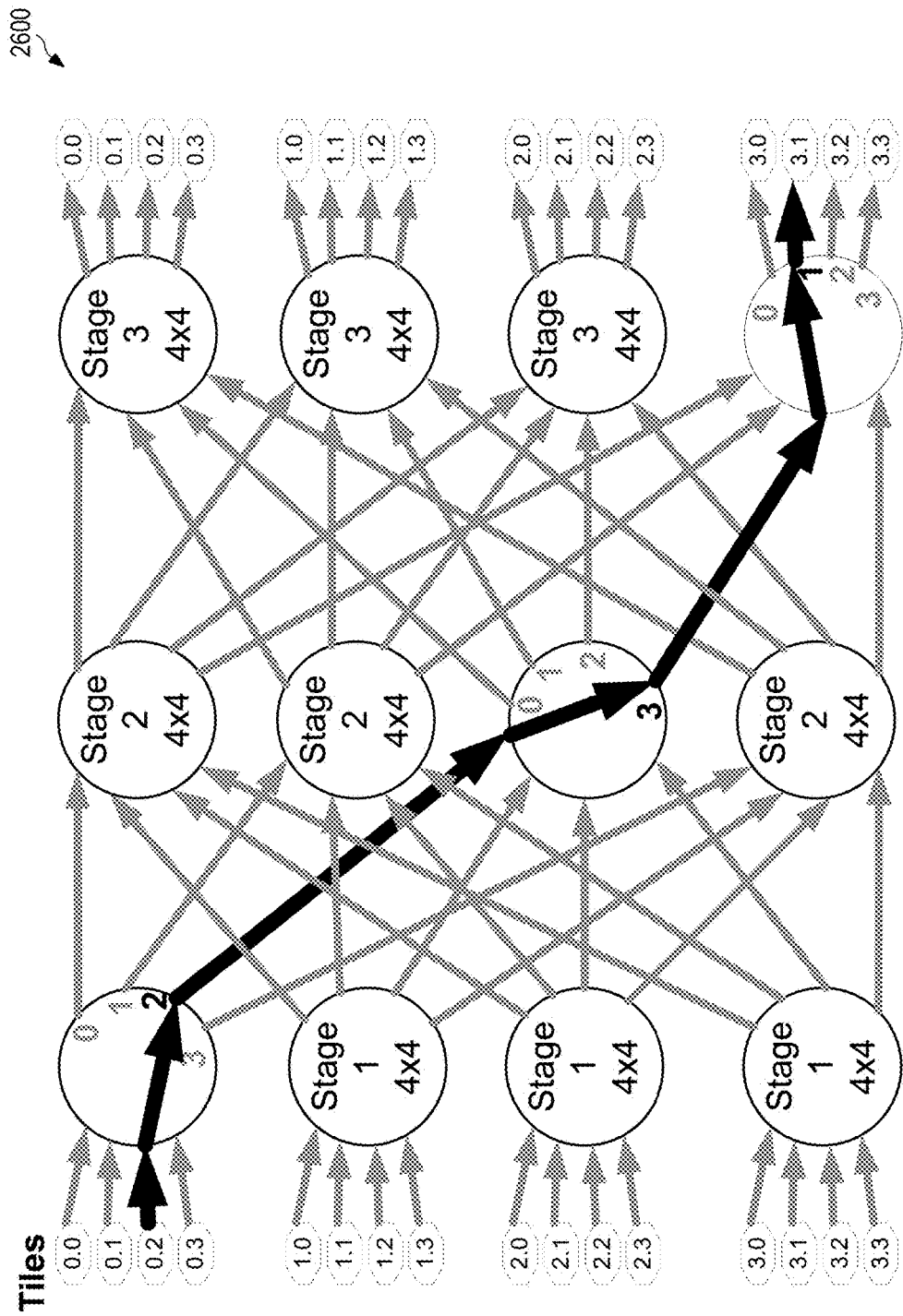
FIG. 26 is a diagram to illustrate an additional advantage of described embodiments.

FIG. 26 illustrates an additional advantage of the described embodiments. Network 2600 is an unfolded Clos network with four routers in each stage. It is shown in an unfolded configuration for clarity, but the same principals apply to the folded configuration. In a conventional Clos configuration, routing of the data is determined by the network manager and set at the input to the first stage, usually at an input interposer. As illustrated in FIG. 26, a data flit from endpoint 0.2 is routed along a predetermined course to its destination at component 3.1. However, if another route is determined at around the same time that uses output port 3 of the same stage(2) router, one of these data flits will be forced to wait until the other has cleared stage(2). This is a potential source of inefficiency.

Figure 27:
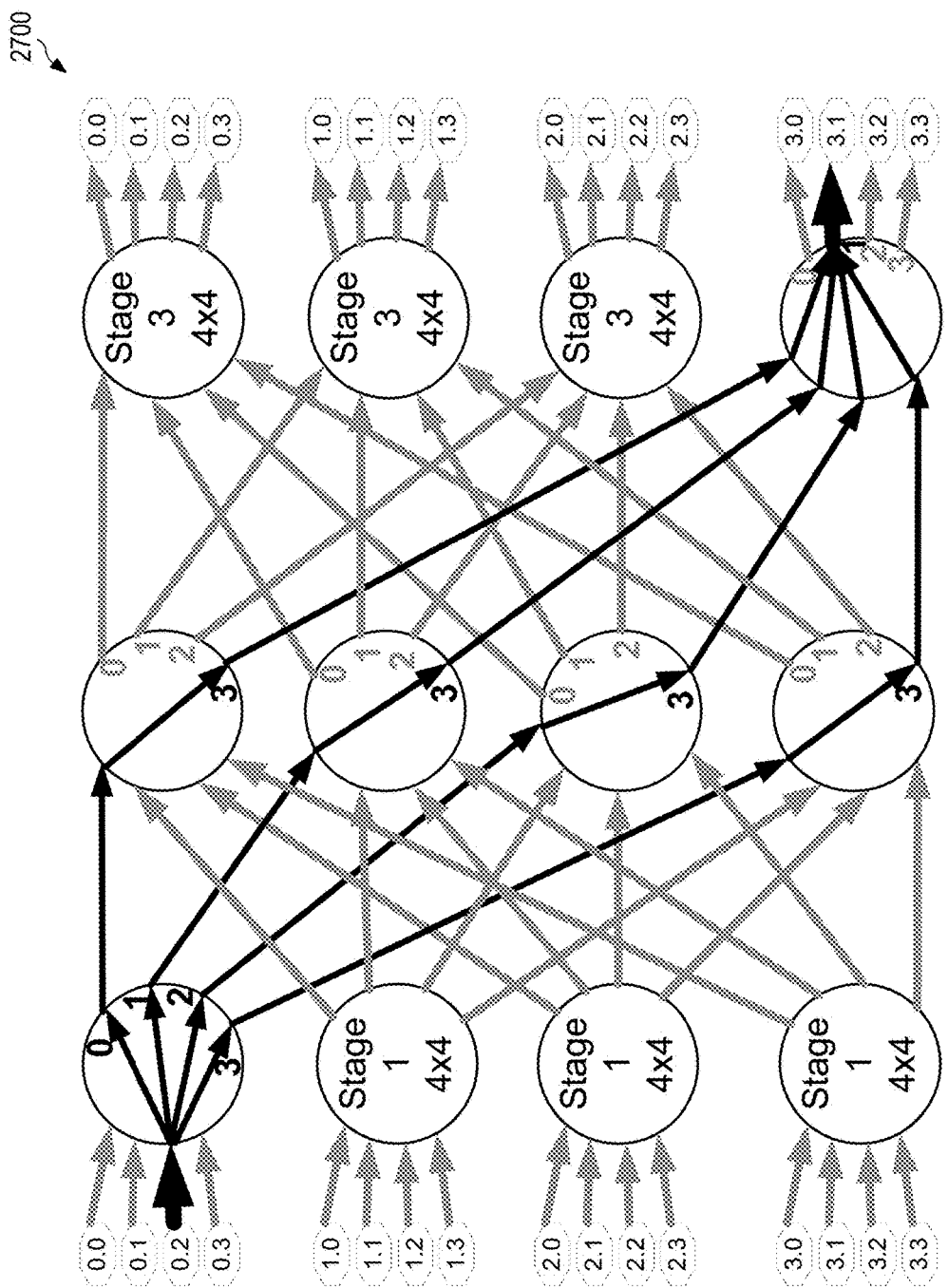
FIG. 27 is a diagram illustrating how a network employing an embodiment can avoid the inefficiency of network shown in FIG. 26.

FIG. 27 illustrates how a network employing an embodiment can avoid the inefficiency of network 1800. Network 2700 includes NHVoQs with a credit based system as explained with regard to FIG. 14. Rather than following a predetermined path set at the input of stage 1, the data from component 0.2 can be loaded into any one of the NHVoQs having available space. The credit system insures that this is the path with the least congestion at this time. In addition, the credit system insures that the data will not be forwarded until there is available bandwidth for transferring the data, thus promoting efficiency of network 2700.

Figure 28:
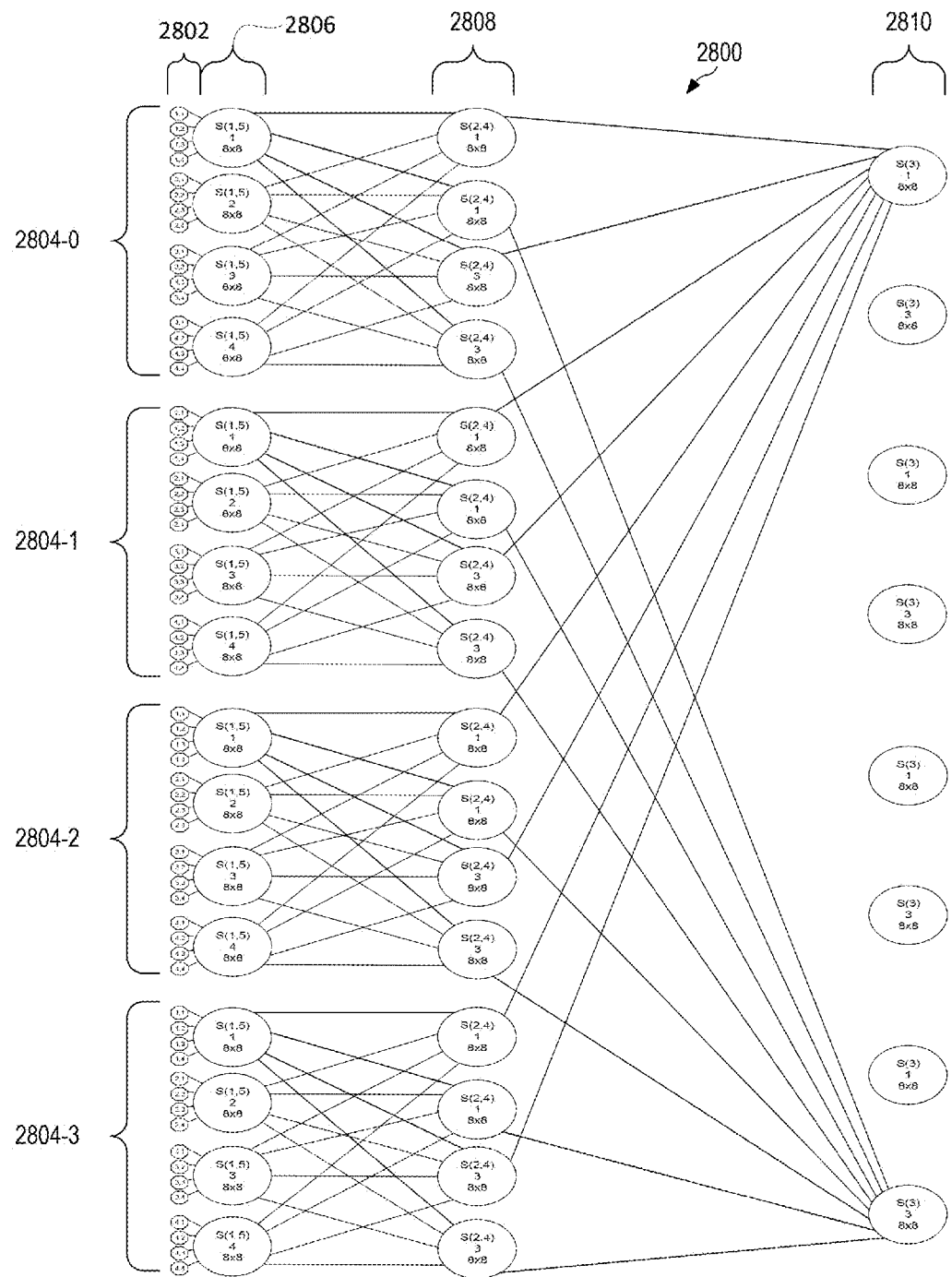
FIG. 28 is a diagram showing a five stage folded Clos-type network.

FIG. 28 shows a five stage folded Clos-type network. Network 2800 illustrates another strategy for expanding the capacity of a network according to the teaching of this specification. In network 2800, 64 endpoints 2802 are connected to 16 stage(1,5) routers 2806. Each of the stage(1,5) routers 2806 are connected to four stage(2,4) routers 2808. There may be more or fewer stage(2,4) routers in each of groups 2804-0 through 2804-3. However, in each group, each stage(1,5) router 2806 must be connected to every stage(2,4) router in its group. Each of the connections shown in FIG. 28 is a bi-directional connection. In addition, there are a number of stage(3) routers 2810. The number of stage(3) routers depends on capacity needs. However, each stage(3) must be connected to at least one stage(2,4) router in each of groups 2804-0 through 2804-3. In FIG. 28, the first stage(3) router 2810 is connected to the first and third stage(2,4) router in each group and the last stage(3) router 2810 is connected to the second and fourth stage(2,4) router in each group. Connections to the other stage(3) routers 2810 are omitted for clarity. This configuration is advantageous because it allows for 8-input ×8-output routers at each stage. This type of router provides good connectivity without excessive circuit complexity. Network 2800 allows for the use of these routers to serve 64 or more endpoints. A three stage Clos-type network, such as network 100 of FIG. 1 would require much larger routers to serve 64 endpoints. For instance, if each stage(1,3) router served 16 endpoints (and thus 16 interposers), such a router would need 32 ports, which greatly increases the difficulty in implementation. The number of wires grows as $N^2$, and timing closure is challenging for 32 ported multiplexers high clock-rates (e.g. GHz). In contrast, a five stage configuration like network 2800 uses smaller routers for simpler implementation and can exploit an additional level of locality. For example, if a packet originating in group 2804-0 is directed to an endpoint connected to another stage(1,5) router in group 2804-0, that packet can be routed through any of the stage(2,4) routers in group 2804-0 back to the stage(1,5) router connected to the destination endpoint without routing the packet through any stage(3) routers. This is similar to the locality described with regard to FIG. 7 above, except that the routing goes through an additional stage to get to the appropriate stage(1,5) router. Using a similar concept, it is possible to scale the folded-Clos topology for 1, 3, 5, 7, 9, etc logical stages, which correspond to 1, 2, 3, 4, 5, . . . physical stages when folded.

Figure 29:
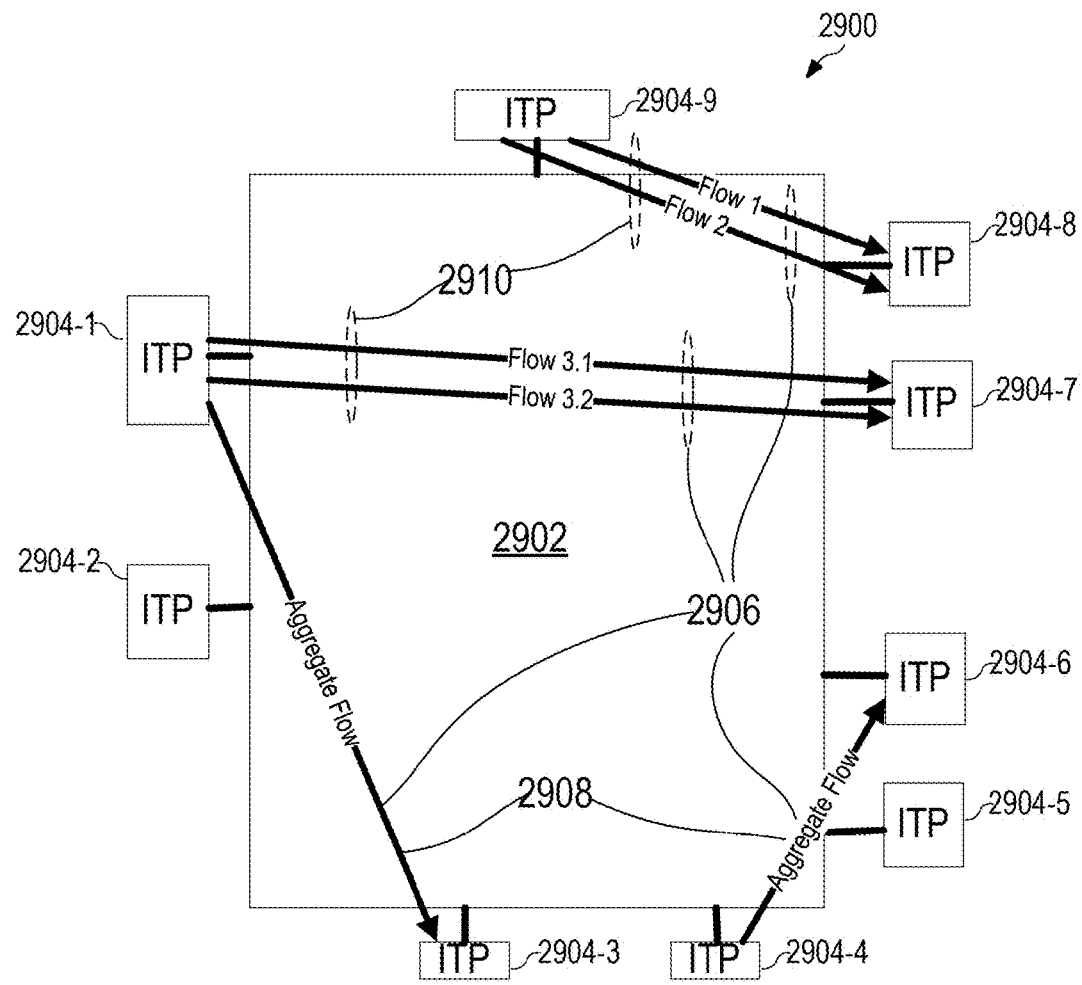
FIG. 29 is a diagram illustrating message-flows through a network-on-chip (NoC) that may be used in an SoC.

To provide quality of service (QoS) in an NoC, the flows in the NoC must be managed. FIG. 29 illustrates a network-on-chip (NoC) that may be used in an SoC. NoC 2900 includes a network fabric for transporting data between the interposers 2904-1 through 2904-9. Flows 2906 show different granularities of data flows, with aggregate-flows 2908 being the coarsest (all flows between a pair of Interposers) and flows 2910 which may belong to different modes or contexts, within an aggregate-flow.

Figure 30:
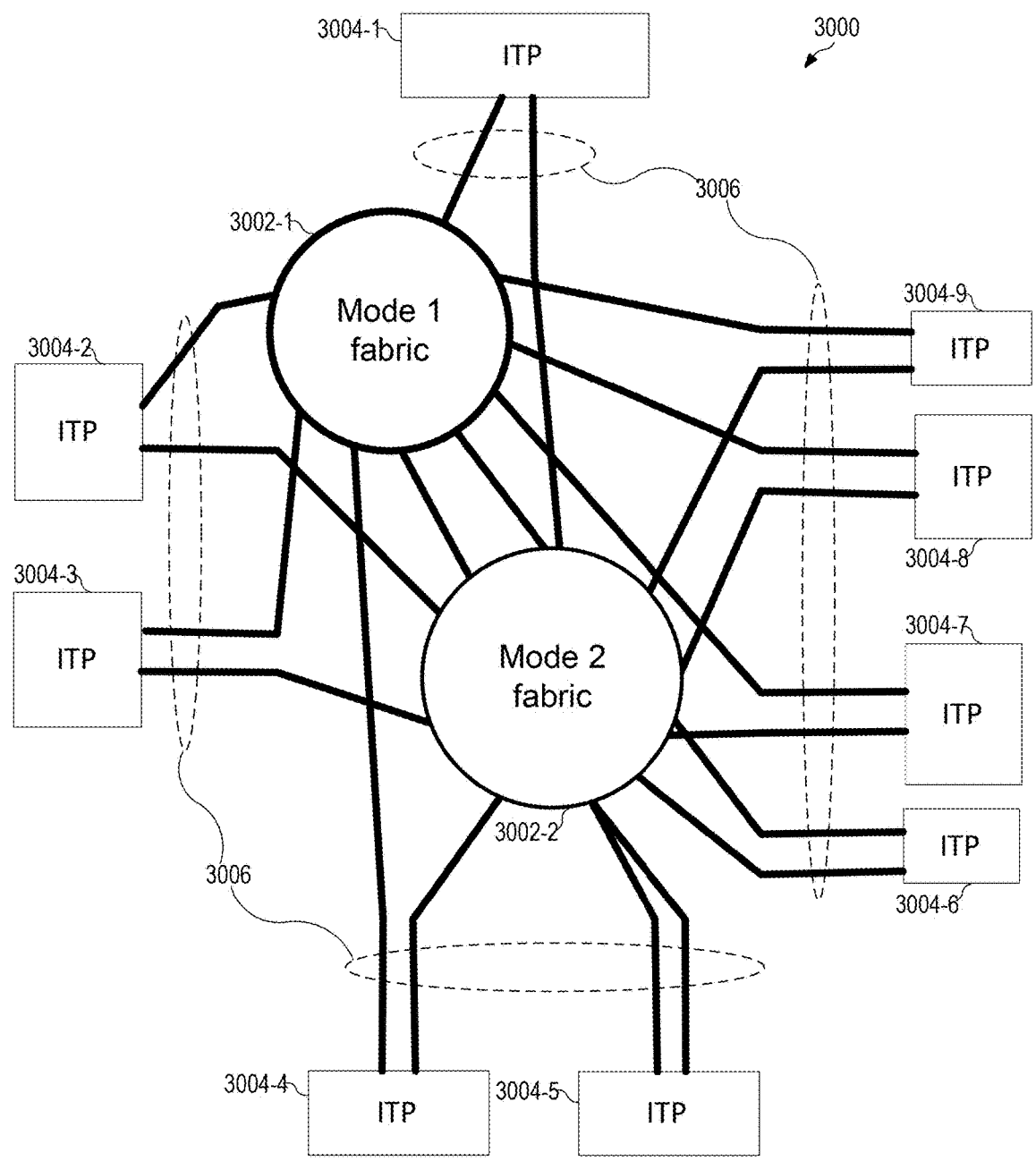
FIG. 30 is a diagram illustrating one technique used in the art for providing isolation between messages belong to two different applications (modes)

FIG. 30 illustrates one technique used in the art for providing QoS Isolation. This approach physically separates the traffic belonging to different modes by routing them over separate fabrics, and thus aims to achieve isolation between the two modes. Network 3000 includes mode 1 fabric 3002-1 and mode 2 fabric 3002-2. Each interposer 3004-1 through 3004-9 includes a connection 3006 to each of mode 1 fabric 3002-1 and mode 2 fabric 3002-2. One of the fabrics, for example 3002-1, is reserved for messages belonging to Mode 1 (for instance, for a particular application, e.g. 4G Cellular), while the other fabric 3002-2 is reserved for messages belonging to Mode 2 (for instance, for another application, e.g. Wi-Fi). However, as is clear from FIG. 30, this technique requires two or more fabrics and at least two connections from those fabrics to each interposer. This uses a large amount of layout space and more than doubles the layout complexity. In addition, two or more fabrics requires more than double the energy necessary to drive the network and more than double the logical complexity.

Figure 31:
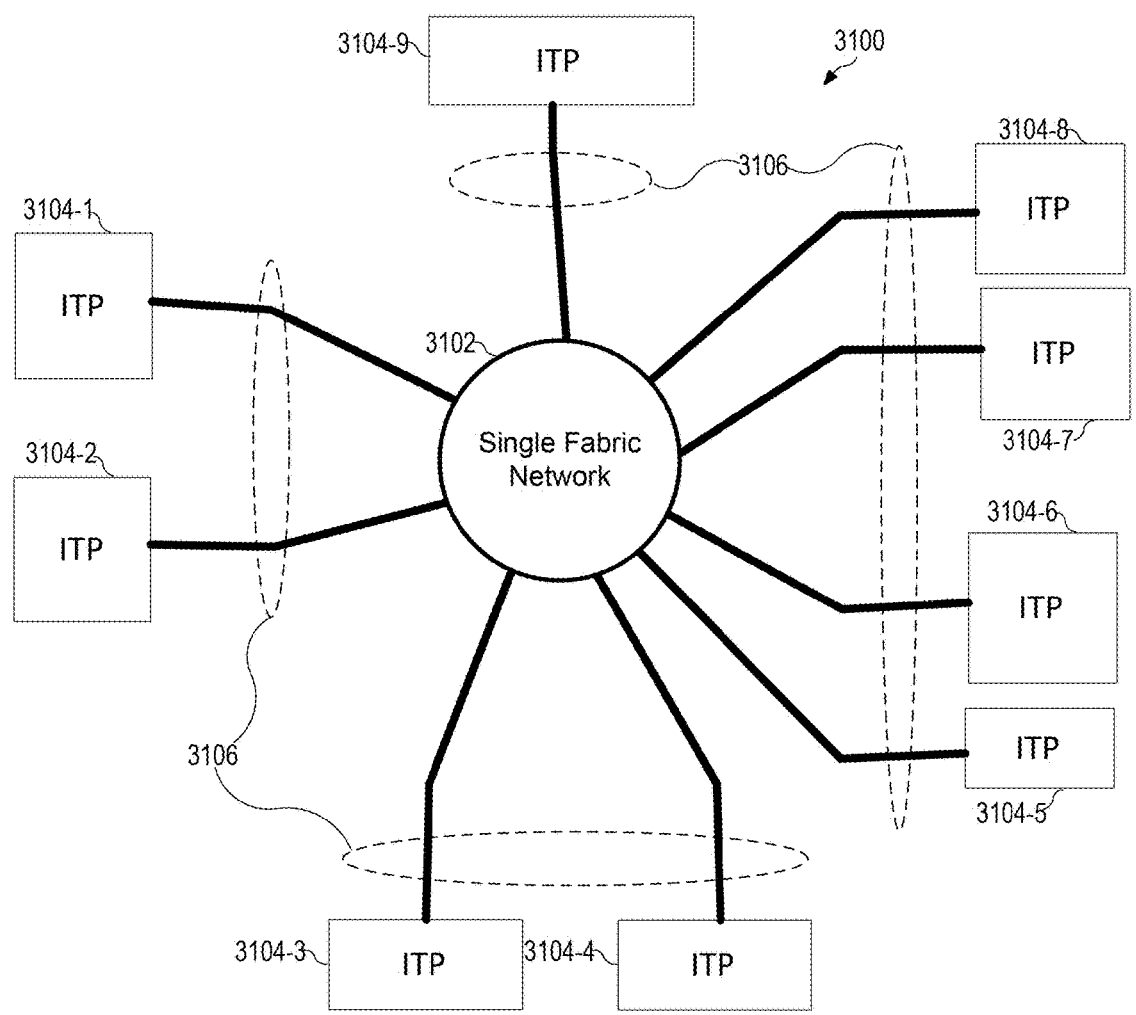
FIG. 31 is diagram illustrating a network using a single fabric.

FIG. 31 is an illustration of network using a single NoC fabric 3102 in which interposers provide QoS isolation. Interposers 3104-1 through 3104-9 include one connection 3106 to the fabric 3102. This configuration minimizes the power consumption and the complexity of the network. The Interposers work with the single fabric to ensure QoS guarantees and therefore isolation between various provisioned flows.

Figure 32:
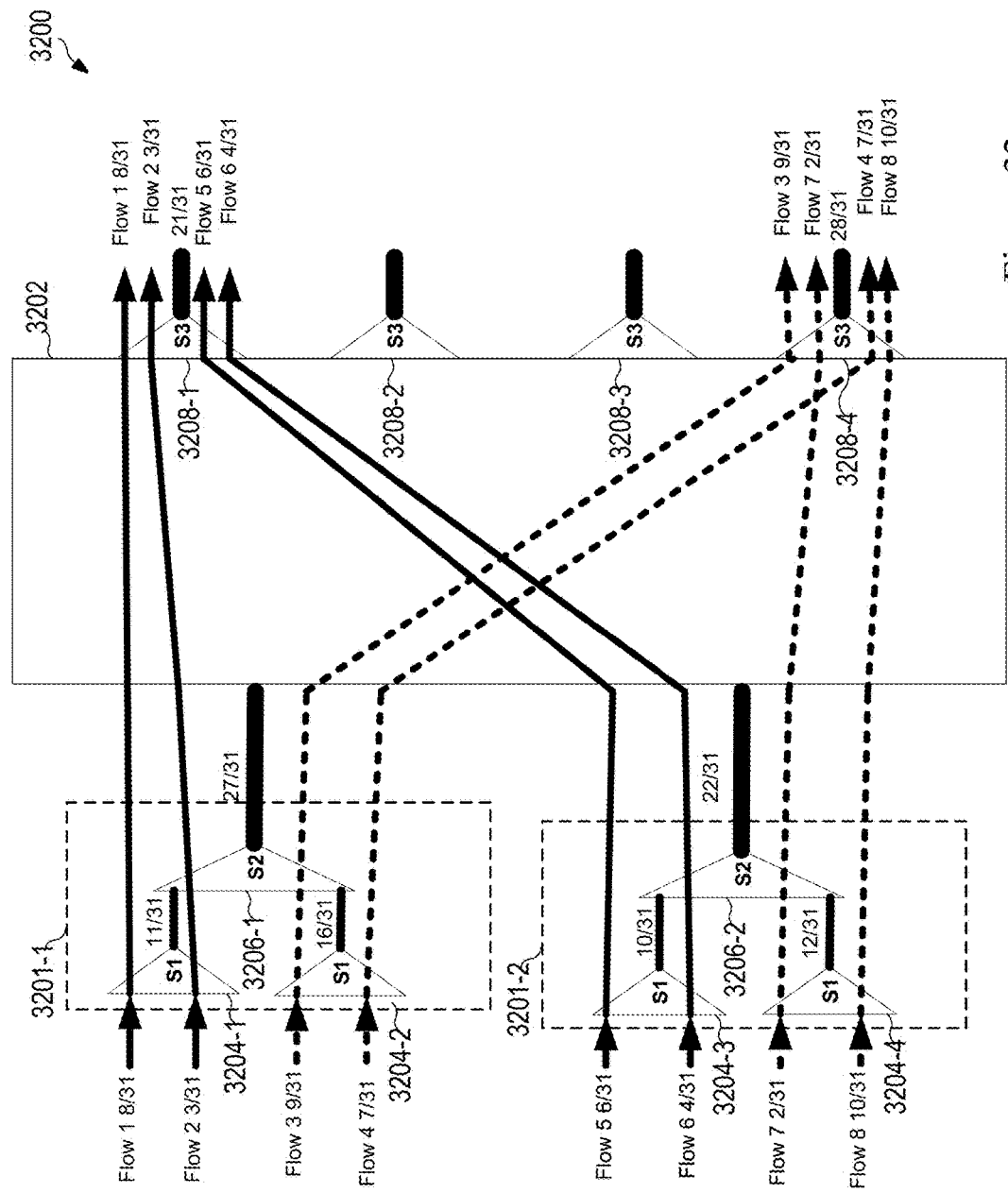
FIG. 32 is a diagram illustrating a simplified network managing message-flows in accordance with an embodiment.

FIG. 32 illustrates a method 3200 for QoS isolation with interposers and a single-stage NoC router in accordance with an embodiment. Network 3200 is greatly simplified in that it only includes one router 3202. Of course, most networks will include multiple stages of routers and will be configured in configurations like those shown in FIGS. 4-7. In the configuration shown in FIG. 32, interposers 3201-1 and 3201-2 include two stages of arbitrators. For interposer 3201-1, first stage arbitrators 3204-1 and 3204-2 receive flows 1-4 and second stage arbitrator 3206-1 receives the output of first stage arbitrators 3204-1 and 3204-2. Similarly, for interposer 3201-2, first stage arbitrators 3204-3 and 3204-4 receive flows 5-8 and second stage arbitrator 3206-2 receives the output of first stage arbitrators 3204-3 and 3204-4.

Flows 1-8 each have a weighting indicating the number of network traversals that are allotted to that flow during a given period. For example, flow 1 has a weighting figure of 8/31. This means that the output interposer 3201-1 is divided into groups of 31 traversals per scheduling cycle. Each scheduling cycle consists of 31 clock cycles. The amount of data accepted by interposer 3201-1 may or may not be sufficient to accept an entire message at one time from each flow. Therefore, the amount of data from each flow for a single traversal is known as a flit to distinguish it from messages. A flit occupies a bus for one clock cycle and includes, in parallel, the routing control signals, as well as the data signals (e.g. 256 bits or 32 bytes). A message is transmitted as one or more flits depending on the length of the message. For instance, a 128 byte message is sent as 4 flits (32 bytes per flit) for a 256 bit data bus. For a five bit counter, there are32 counter values; however, the zero value is skipped. Therefore, there are 31 traversals in a scheduling cycle. The FIG. 8/31 means that for every 31 traversals allowed to interposer 3201-1, flow 1 is allowed 8 traversals.

One technique for implementing this allocation is a weighted round-robin allocation (WRR). With this type of allocation, 8 flits are accepted from flow 1, then 3 flits from flow 2, then 9 flits from flow 3 and 7 flits from flow 4. Then this cycle would repeat. However, this type of allocation is not optimal because a large number of flits from one flow may create a downstream head of line (HoL) problem. For example, while the 8 flits of flow 1 are being passed by arbitrator 3208-1 none of the other flows may pass. That is, flow 1 is at the head of the line (HoL) and is blocking the other flows. This is a minor issue for a very simple network like network 3200. However, the HoL problem can create very severe inefficiencies in larger networks. Also, FIFOs in the NoC are usually dimensioned to be at least twice the size of packets to prevent the HoL problem. So, with larger packet sizes, larger FIFOs are required and higher cost is incurred. The NoC is cost and performance optimized by using the minimum packet size, which is a single cycle (single ket), thus allowing the NoC to be designed to see only such ket-sized packets. The transmit interposer, operating at a higher message-passing layer, segments messages into flits and transmits them to the NoC accordingly. The receive interposer receives the flits and writes them into memory at the receiving endpoint, thus reassembling the message from the constituent flits.

When provisioning the flows to support guaranteed QoS, it is important to maximize utilization while minimizing contention. To realize this, the summation of the bandwidth (BW) weights of all flows passing through any arbitration point must be less than or equal to 31/31. For example, arbiter 3206-1 arbitrates 4 flows, with a total of 27/31 BW. Arbiter 3208-4 arbitrates 4 flows, with a total of 28/31 BW.

Figure 33:
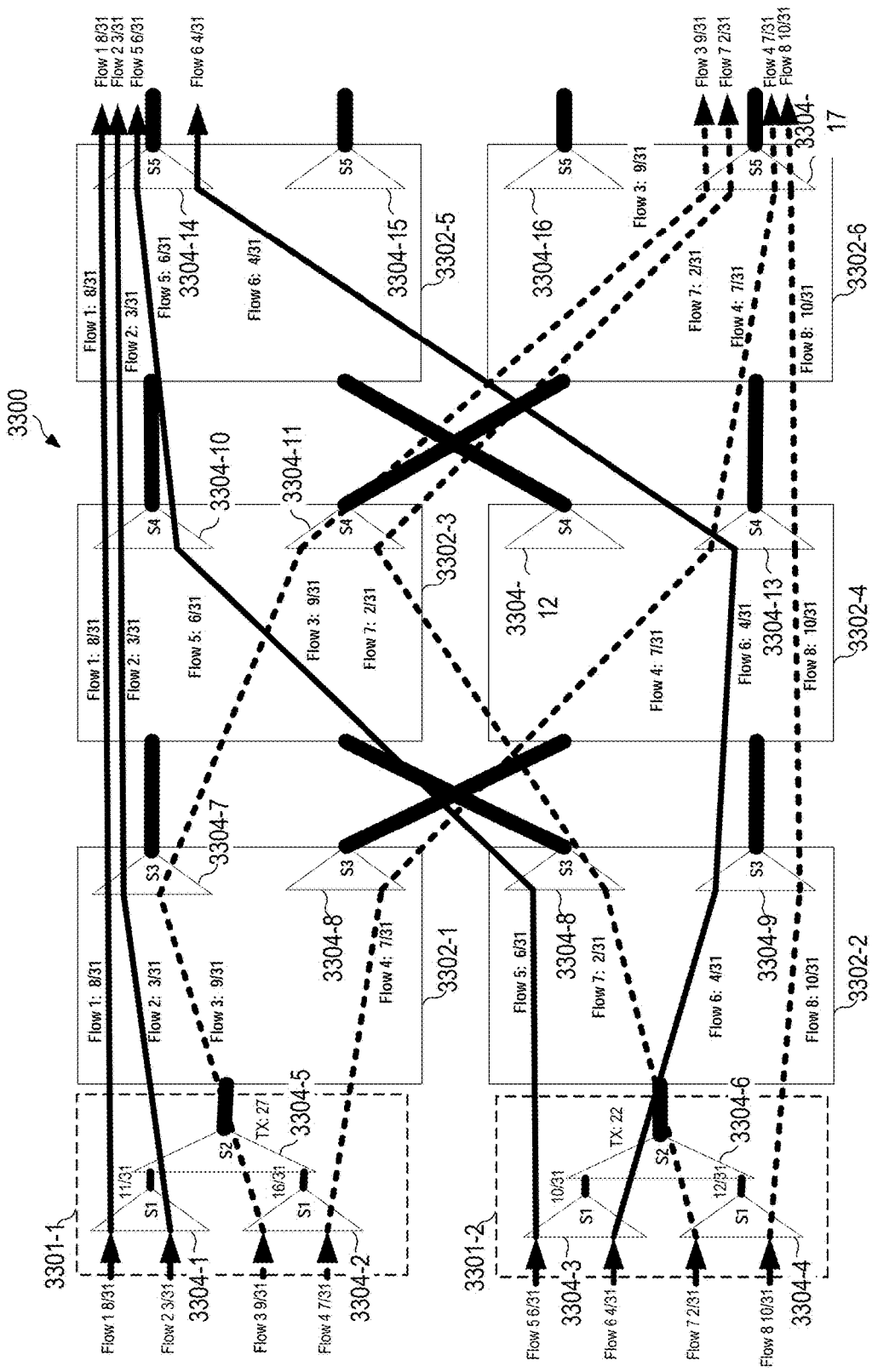
FIG. 33 is a diagram illustrating a multi-stage version of the network of FIG. 32.

FIG. 33 shows a method for QoS isolation with interposers and a multi-stage NoC fabric of network 3300 of FIG. 33. In network 3300, three stages are provided by routers 3302 -1 through 3302-6. Router 3302-1 is fed by interposer 3301-1, which includes arbiters 3304-1, 3304-2 and 3304-5. Router 3302-2 is fed by interposer 3301-2, which includes arbiters 3304-3, 3304-4 and 3304-6. Each of routers 3302-1 through 3302-6 has two outputs that are connected to each of two downstream routers using an interposer including one arbitrator. For example, router 3302-1 provides its output through arbitrator 3304-7 to router 3302-3. The second output of router 3302-1 is provided through arbitrator 3304-8, which is connected to router 3302-4. In this manner, a three stage Clos type network is provided with two routers at each stage. A configuration with two routers per stage is shown for simplicity. NoCs usually have many more routers per stage and can have more stages (e.g. 5, 7, or 9 stages).

Routing in network 3300 is managed so that the sum of the traversal weights for any arbitrator are less than or equal to 1 (for instance 15/15, 31/31, or 63/63). For example, flows 1, 2 and 5 flow through stage 4 arbitrator 3304-10. The sum of the weights of these flows is 8/31+3/31+6/31=17/31, which is less than the traversal capacity of 1=31/31 of arbitrator 3304-10. Flows are routed so that the combined flow rate for all flows through any arbitrator is less than 1. Combining this type of structure with the weighted fair queueing (WFQ) arbitration described with regard to FIGS. 10 through 13 below nearly eliminates congestion at each arbiter and therefore minimizes the latency variance, which is needed for guaranteed QoS. Also, a virtual output queue (VoQ) and next-hop virtual output queue (NHVoQ) architecture may be used in the routers to minimize HoL issues.

Figure 34:
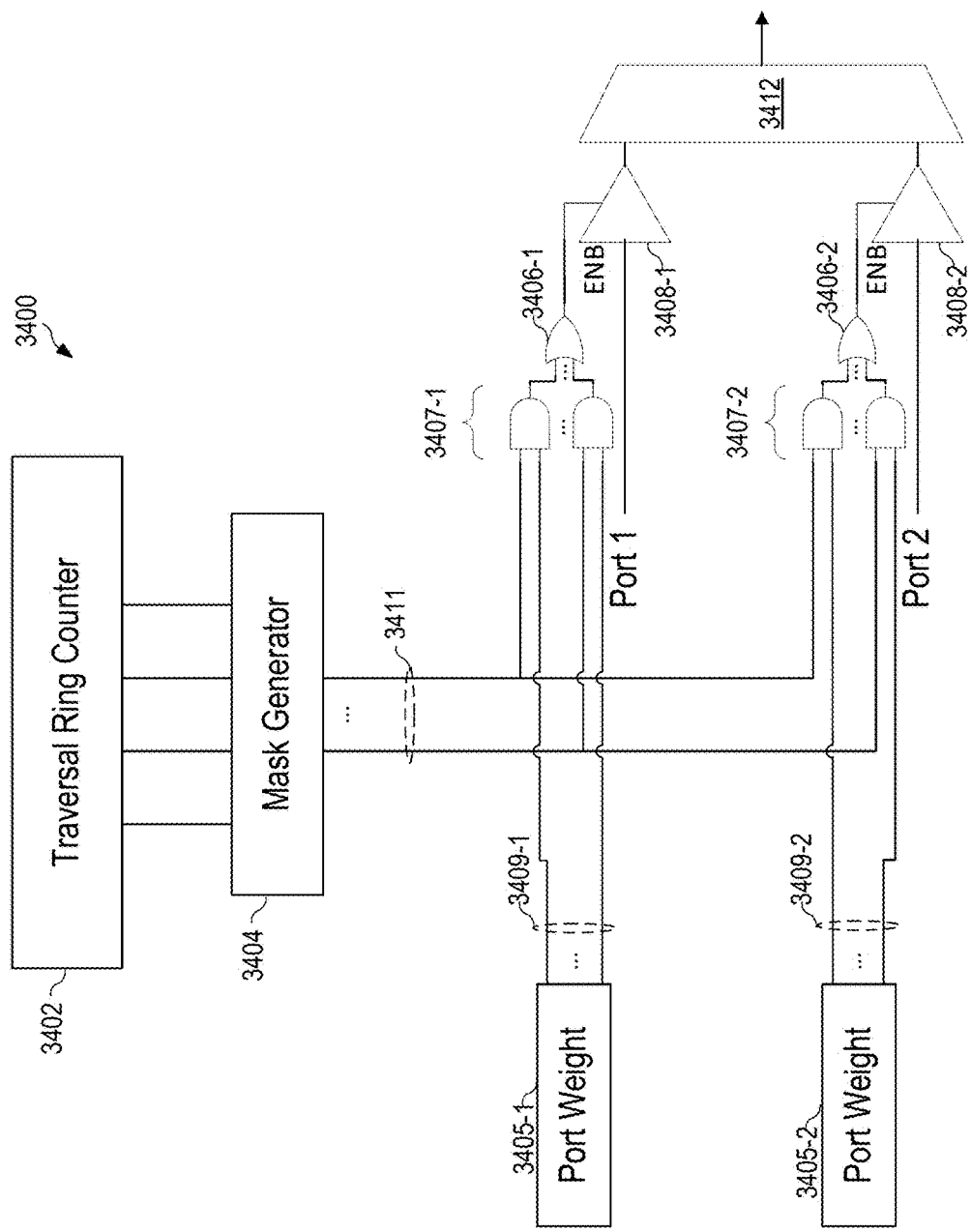
FIG. 34 is a diagram illustrating a simplified arbitrator according to an embodiment.

FIG. 34 illustrates a weighted fair queueing (WFQ) scheduler 3400 according to an embodiment. Traversal ring counter 3402 is an n-bit counter. For n=4 bits, the count in this embodiment is from 1 to 15, and back to 1 (0 is skipped). However, the number of bits for the counter is not limited. For instance, a 5-bit traversal ring counter counts from 1 to 31 and back to 1 again. Any interval may be chosen. Traversal ring counter 3402 counts from 1 to 15 for simplicity of explanation. The output of traversal ring counter 3402 is fed to mask generator 3404, which generates the masks as explained below. The mask is then compared bitwise to the port weights stored in registers 3405-1 and 3405-2 are connected to AND gates 3407-1 and 3407-2, respectively, by buses 3409-1 and 3409-2, respectively. Similarly, mask generator 3404 is connected to both of sets AND gates 3407-1 and 3407-2 by bus 3411. The output of AND gates 3407-1 and 3407-2 is ORed by OR gates 3406-1 and 3406-2, respectively. The port weights are stored in binary form. For example, if the mask includes a 1 in a bit position where the port weight stored in 3405-1 has a 1, the AND gate 3407-1 for that bit of will produce a 1, and thus OR gate 3406-1 will provide a 1 signal to the enable input of tristate buffer 3408-1. This allows the flit queued at the port 1 to pass to multiplexor 3412. Multiplexor 3412 then resolves any conflicts when more than one port is enabled. Multiplexor 3412 can select inputs using round-robin method and can choose from among the outputs of the "ENB" (enabled) buffers.

FIG. 35 illustrates the operation of mask generator 3404 of FIG. 34. A Ring Traversal Counter counts from 1 to 15 (skipping zero) and then back to 1, which constitutes one scheduling cycle. In this embodiment, mask generator 3404 reverses the input counter bit positions and provides a one when encountering the first "1" bit (reading from right to left). For example, at count 1, the least significant or is bit of the traversal ring counter 3402 (FIG. 34) is a 1. The output is reversed in bit position, so the least significant bit of the input affects the most significant bit of the outputted mask. Mathematically, if the counter has m bits, the bit positions affected by the 0 to 1 transition is the kth position of the mask, where $k=m-j+1$, and where j is an integer from 1 to m indicating the bit position of the counter that transitioned. Therefore at count 1, the most significant bit of the mask is a 1. All other bits are 0. Because the traversal ring counter 3402 (FIG. 10) is a counter, there will always be only one bit that transitions from a "0" to a "1" (since 0000 is skipped). Therefore, all of the masks generated as shown in FIG. 35 include a "1" at one bit position and "0s" in all other bit positions. The arrows show how to map from the ring traversal counter to the mask. In the resultant masks there are eight evenly distributed masks with a 1 in the most significant bit position, four masks with a 1 in the next most significant bit position, two masks with a 1 in the next most significant bit position and one mask with a 1 in the least significant bit position. As shown below, this allows for an even distribution of flit traversals with the appropriate weighting.

FIG. 36 shows how the mask generated by mask generator 1004 is applied to the port weighting. In this example, port weighting 3602 is 7 out of 15 traversals. Expressed in binary, seven is 0111. To determine if this port can traverse a ket, the binary weight is simply ANDed with each corresponding bit of the mask. If the mask has a 1 in any position of the weight that also has a 1, a traversal is enabled for this port. In the case when multiple ports are enabled, they are each served in a round-robin manner. With WFQ, contention does not build up (and thus the FIFO sizes do not need to be large) because the sum of the weights cannot be more than the total number of traversals available in a scheduling cycle.

As shown in FIG. 36, this process allows a port with weight 7 to traverse on counts 2, 6, 10 and 14 because the weight has a 1 in the $3^{rd}$ bit position, to traverse on counts 4 and 12, because the weight has a 1 in the $2^{nd}$ bit position, and to traverse on count 8 because the weight has a 1 in the $1^{st}$ (least significant) bit position. Therefore, a total of seven, evenly distributed traversals are allowed. Because the traversals are evenly distributed, the possibility of contention during a 15 cycle interval is greatly reduced. Furthermore, as noted above, VoQs and NHVoQs can be used in order to reduce inefficiencies due to HoL blocking.

Table 1 below shows the count(s) in a 15 traversal cycle when each weighting is allowed a traversal. For every weight, the number of traversals allowed is evenly distributed across the cycle. With WFQ, this is true for any size of traversal cycle.

TABLE 1

| Weight | Binary Weight | Traversals | | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| 0 | 0000 | | | | | | | | | | | | | | | |
| 1 | 0001 | | | | | | | | x | | | | | | | |
| 2 | 0010 | | | | x | | | | | | | | x | | | |
| 3 | 0011 | | | | x | | | | x | | | | x | | | |
| 4 | 0100 | | x | | | | x | | | | x | | | | x | |
| 5 | 0101 | | x | | | | x | | x | | x | | | | x | |
| 6 | 0110 | | x | | x | | x | | | | x | | x | | x | |
| 7 | 0111 | | x | | x | | x | | x | | x | | x | | x | |
| 8 | 1000 | x | | x | | x | | x | | x | | x | | x | | x |
| 9 | 1001 | x | | x | | x | | x | x | x | | x | | x | | x |
| 10 | 1010 | x | | x | x | x | | x | | x | | x | x | x | | x |
| 11 | 1011 | x | | x | x | x | | x | x | x | | x | x | x | | x |
| 12 | 1100 | x | x | x | | x | x | x | | x | x | x | | x | x | x |
| 13 | 1101 | x | x | x | | x | x | x | x | x | x | x | | x | x | x |
| 14 | 1110 | x | x | x | x | x | x | x | | x | x | x | x | x | x | x |
| 15 | 1111 | x | x | x | x | x | x | x | x | x | x | x | x | x | x | x |

Figure 37:
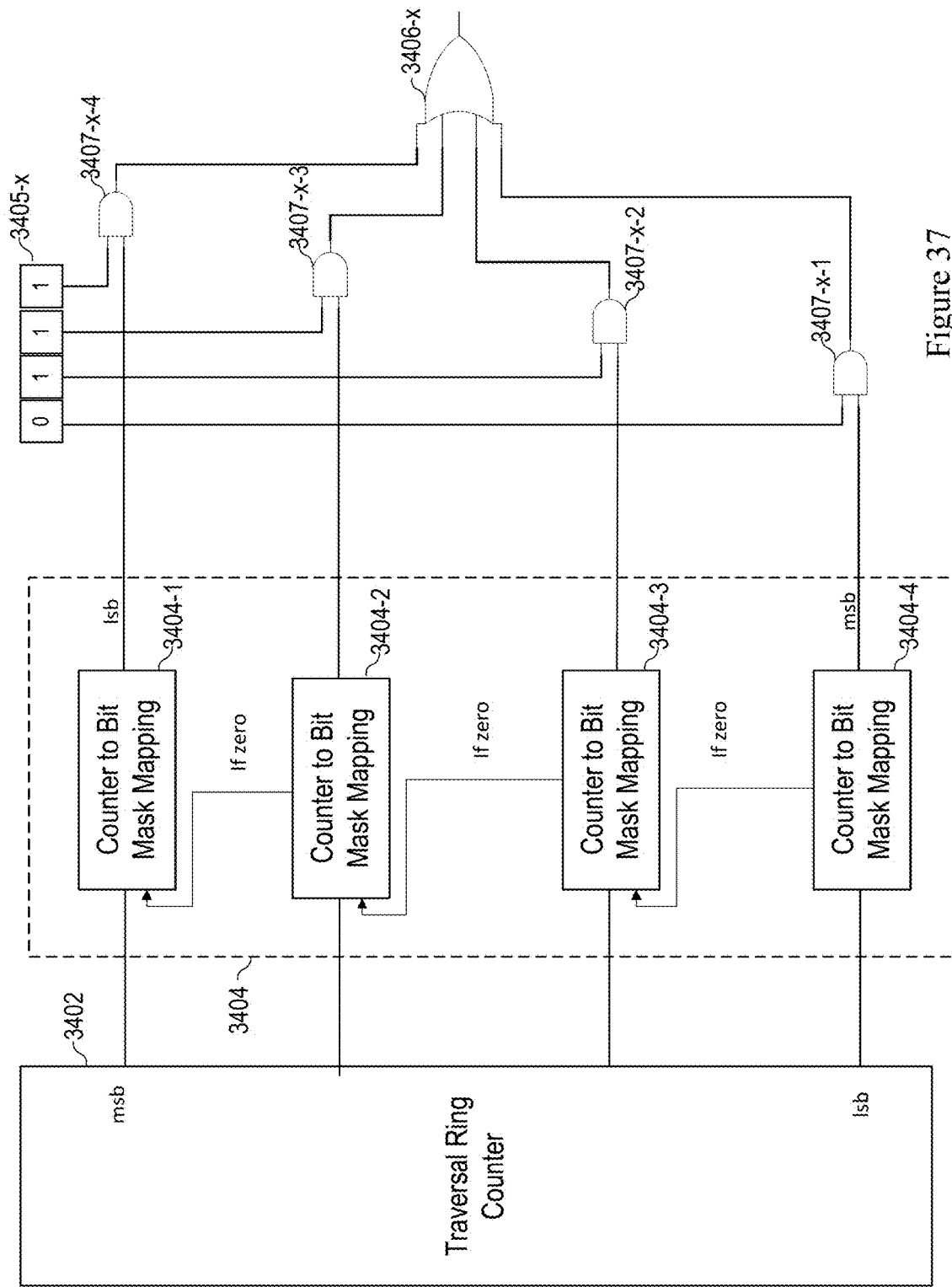
FIG. 37 is a schematic diagram illustrating an implementation of the mask generator of FIG. 34.

FIG. 37 is a schematic diagram showing how the system of FIGS. 35 and 36 may be implemented. Traversal ring counter 3402 provides the traversal count in binary form, which is fed to mask generator 3404. The most significant bit is provided to counter to bit map mask mapper 3404-1, the next most significant bit to counter to bit map mask mapper 3404-2, and so on. One output of each counter to bit map mask mappers 3404-2 through 3404-4 indicates to the counter to bit map mask mappers of next most significant bit if that output is zero. The output of counter to bit map mask mapper 3404-4 is the most significant bit of the output of the mask generator 3404, the output of counter to bit map mask mapper 3404-3 is the next most significant bit of the output of the mask generator 3404, and so on. The mask is generated as follows:

Traversal ring counter ($c3,c2,c1,c0$)→Bit-mask
IF $c0$==1 then Bit-mask=1000
ELSE, IF $c1$==1 then Bit-mask=0100
ELSE, IF $c2$==1 then Bit-mask=0010
ELSE, IF $c3$==1 then Bit-mask=0001
The weight is stored in port weight register 3405-$x$. In the example of FIG. 12, the weight of 7/15 is stored in port weight register 3405-$x$. Each bit of the weight is compared to its corresponding bit in AND gates 3407-$x$-1 through 3407-$x$-4. If any of those AND gates produces a 1 output, OR gate 3406-$x$ produces a 1 output and this port is allowed a traversal.

Using the process of FIGS. 34-37 allows for a guaranteed message flow and thus a guaranteed quality of service. The time required for a first flit will be one cycle time plus the time for transport across the fabric. Using the embodiments of the invention, the remaining flits are the weighting bandwidth divided by the total bandwidth of the first interposer. Maximum latency for message transmission is =1stKet Latency+(K/BW), where 1stKet Latency=1stKet scheduled +1 stKet transport, and BW=#Flits per time-frame for WFQ, and K is the number of flits for the message. For example, assume a flow is assigned BW=8/31=8 Flits scheduled per 31 cycles. For an 80 flit Data-Msg, Latency for transmission is sum of:

Ceiling (1/BW)=Ceiling (31/8)=4 cycles to be scheduled
1stKet Latency transport through fabric=20 cycles
K/BW=80/(8/31)=310
Max latency=4+20+310=334 cycles Thus, using embodiments described herein allows for a guaranteed data rate and thus isolation of the data flows from interference by other data flows.

Figure 38:
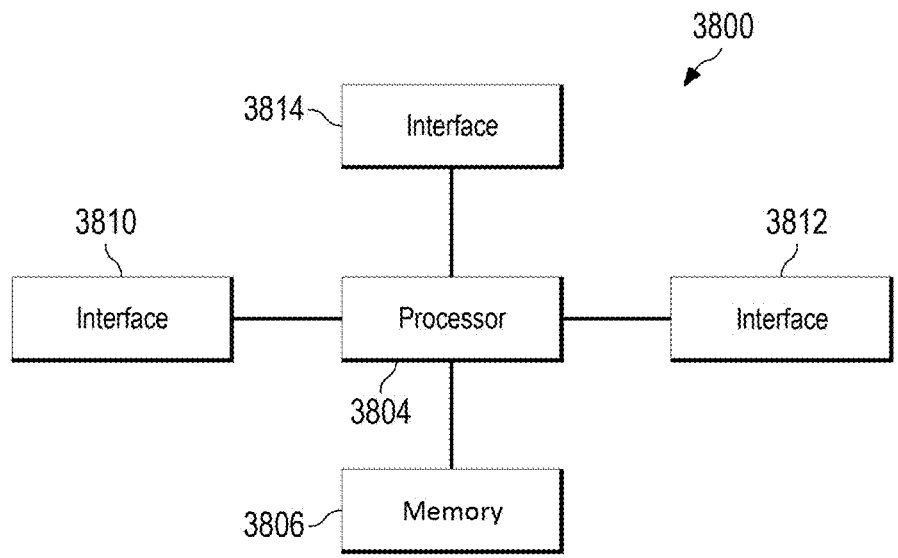
FIG. 38 is a block diagram illustrating an embodiment processing system 3800 which may be implemented as an SoC using the NoC embodiments described herein.

FIG. 38 illustrates a block diagram of an embodiment processing system 3800 which may be implemented as an SoC using the NoC embodiments described herein, and which may be installed in a host device. In addition, a processing system such as system 3800 may be used as a control system for operating the described NoCs. As shown, the processing system 3800 includes a processor 3804, a memory 3806, and interfaces 3810-3814, which may (or may not) be arranged as shown in FIG. 38. The processor 3804 may be any component or collection of components adapted to perform computations and/or other processing related tasks, and the memory 3806 may be any component or collection of components adapted to store programming and/or instructions for execution by the processor 3804. In an embodiment, the memory 3806 includes a non-transitory computer readable medium. The interfaces 3810, 3812, 3814 may be any component or collection of components that allow the processing system 3800 to communicate with other devices/components and/or a user. For example, one or more of the interfaces 3810, 3812, 3814 may be adapted to communicate data, control, or management messages from the processor 3804 to applications installed on the host device and/or a remote device. As another example, one or more of the interfaces 3810, 3812, 3814 may be adapted to allow a user or user device (e.g., personal computer (PC), etc.) to interact/communicate with the processing system 3800. The processing system 3800 may include additional components not depicted in FIG. 38, such as long term storage (e.g., disk storage, non-volatile memory, etc.).

In some embodiments, the processing system 3800 is included in a network device that is accessing, or part otherwise of, a telecommunications network. In one example, the processing system 3800 is in a network-side device in a wireless or wireline telecommunications network, such as a base station, a relay station, a scheduler, a controller, a gateway, a router, an applications server, or any other device in the telecommunications network. In other embodiments, the processing system 3800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 39:
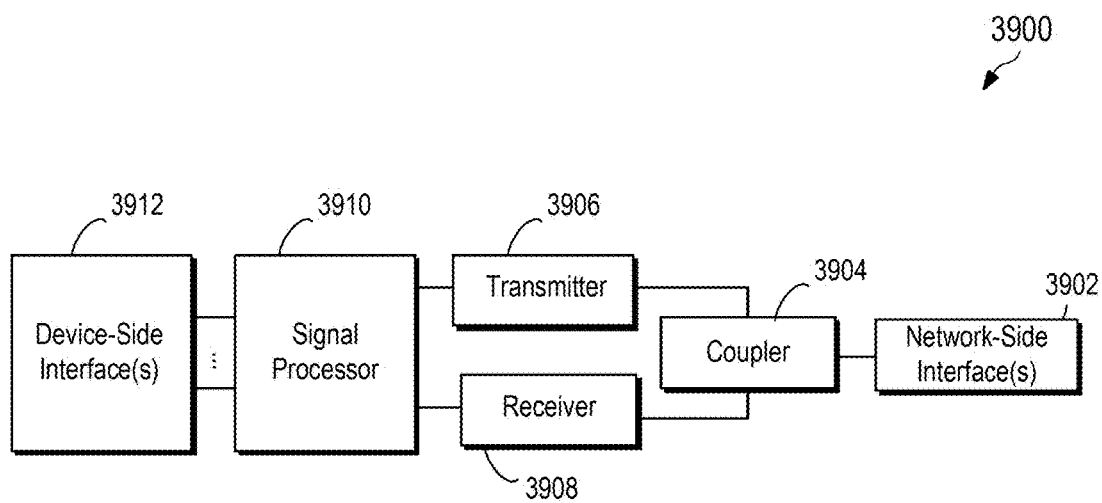
FIG. 39 is a block diagram illustrating an embodiment transceiver 3900 adapted to transmit and receive signaling over a telecommunications network.

In some embodiments, one or more of the interfaces 3810, 3812, 3814 connects the processing system 3800 to a transceiver adapted to transmit and receive signaling over the telecommunications network which may be implemented using the NoC embodiments described herein. FIG. 39 illustrates a block diagram of a transceiver 3900 adapted to transmit and receive signaling over a telecommunications network. The transceiver 3900 may be installed in a host device. As shown, the transceiver 3900 comprises a network-side interface 3902, a coupler 3904, a transmitter 3906, a receiver 3908, a signal processor 3910, and a device-side interface 3912. The network-side interface 3902 may include any component or collection of components adapted to transmit or receive signaling over a wireless or wireline telecommunications network. The coupler 3904 may include any component or collection of components adapted to facilitate bi-directional communication over the network-side interface 3902. The transmitter 3906 may include any component or collection of components (e.g., up-converter, power amplifier, etc.) adapted to convert a baseband signal into a modulated carrier signal suitable for transmission over the network-side interface 3902. The receiver 3908 may include any component or collection of components (e.g., down-converter, low noise amplifier, etc.) adapted to convert a carrier signal received over the network-side interface 3902 into a baseband signal. The signal processor 3910 may include any component or collection of components adapted to convert a baseband signal into a data signal suitable for communication over the device-side interface(s) 3912, or vice-versa. The device-side interface(s) 3912 may include any component or collection of components adapted to communicate data-signals between the signal processor 3910 and components within the host device (e.g., local area network (LAN) ports, etc.).

The transceiver 3900 may transmit and receive signaling over any type of communications medium. In some embodiments, the transceiver 3900 transmits and receives signaling over a wireless medium. For example, the transceiver 3900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 3902 comprises one or more antenna/radiating elements. For example, the network-side interface 3902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 3900 transmits and receives signaling over a wireline medium, e.g., twisted-pair cable, coaxial cable, optical fiber, etc. Specific processing systems and/or transceivers may utilize all of the components shown, or only a subset of the components and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit for routing network communications between a plurality of endpoints, comprising:
   a plurality of n interposers, each interposer serving one endpoint, each interposer including:
      a first demultiplexer having an input and m outputs, the input of the first demultiplexer configured to receive data from the endpoint served by the interposer;
      m first queues, each first queue having an input and an output, the input of the first queue configured to receive data from respective ones of the m outputs of the first demultiplexer; and
      a first multiplexer having m inputs and an output, each input of the first multiplexer configured to receive data from the output of one of the m first queues;
   at least one router including n input ports, each input port of the n input ports connecting to a respective interposer the plurality of n interposers and including:
      a separate second demultiplexer configured to receive data from the output of the first multiplexer of the respective one of the plurality of n interposers and including m outputs;
      m second queues, each second queue having an input and an output, the input of the second queue configured to receive data from a respective one of the m first queues on a respective one of the m outputs of a respective second demultiplexer; and
   the at least one router further including a plurality of m second multiplexers, each having n inputs and an output, each input of a respective m second multiplexer configured to receive data on a corresponding one of the m outputs of the m second queues of a respective input port of the n input ports of the at least one router.

2. The circuit of claim 1 wherein each of the first queues is configured to not provide output data to the first multiplexer until a credit signal is provided from a corresponding one of the m second queues indicating that space is available in the corresponding one of the m second queues to store the output data.

3. The circuit of claim 1 wherein the circuit and the endpoints are formed on a monolithic substrate.

4. The circuit of claim 1 wherein the first and second queues each include at least two storage positions.

5. The circuit of claim 1 wherein the n input ports each include a bus having one lead for each data bit.

6. The circuit of claim 5 wherein the n input ports include control signal leads.

7. A network comprising:
   a plurality of n interposers, each interposer including:
      a first demultiplexer having an input and m outputs, the input of the first demultiplexer connected to an endpoint;
      m first queues, each first queue having an input and an output, the input of the first queue of the m first queues configured to receive data from respective ones of the m outputs of the first demultiplexer; and
      a multiplexer having m inputs and an output, each input of the m inputs of the multiplexer configured to receive data from the output of one of the m first queues;
   a first plurality of routers, each of the first plurality of routers having n input ports connected to an output port of one of the plurality of n interposers and having m output ports,
   a second plurality of m routers having a plurality of input ports, each input port of the plurality of input ports connected to one of the m output ports of the first plurality of routers, and having a plurality of output ports; and
   a third plurality of routers, each of the third plurality of routers having a plurality of input ports, one input port connected to one of the output ports of a corresponding one of the second plurality of routers, and having a plurality of output ports connected to a portion of the plurality of interposers such that each interposer is connected to at least one output of one of the third plurality of routers;
   wherein at least one of the first plurality of routers comprises:
      a separate second demultiplexer for each interposer, each separate second demultiplexer having an input and m outputs, the input of the second demultiplexer configured to receive data from the output of the multiplexer of a respective one of the plurality of n interposers; and
      m second queues, each second queue having an input configured to receive data from a respective one of the m outputs of a respective second demultiplexer and an output configured to provide data on respective ones of the m output ports of the at least one of the first plurality of routers.

8. The network of claim 7 wherein the network has an odd number of stages greater than or equal to three, each stage including a plurality of routers, and is formed in a folded Clos-type network and each of the first plurality of routers is combined with a corresponding one of a last plurality of routers.

9. The network of claim 7 wherein each of the first queues of an interposer of the n interposers is configured to not provide output data to the multiplexer of the interposer until a credit signal is provided from a corresponding one of the m second queues indicating that space is available in the corresponding one of the m second queues to store the output data.

10. The network of claim 7 wherein:
   each output port of the m output ports of the first plurality of routers includes:
      a first demultiplexer having an input configured to receive data and k outputs;
      k first queues, each first queue having an input configured to receive data and an output; and
      a multiplexer having k inputs and an output, each input of the multiplexer configured to receive data from the output of one of the k first queues; and
   each of the second plurality of routers comprises:
      a second demultiplexer for each of the first plurality of routers, the second demultiplexer having an input and k outputs, the input of the second demultiplexer configured to receive data from an output port of the m output ports of one of the first plurality of routers; and k second queues, each having an input configured to receive data from a respective one of the k outputs of the second demultiplexer and an output configured to provide data on respective ones of k output ports of the second plurality of routers.

11. The network of claim 10 wherein each of the k first queues is configured to not provide output data to the multiplexer of the output port of the first plurality of routers until a credit signal is provided from a corresponding one of the k second queues indicating that space is available in the corresponding one of the m second queues to store the output data.

12. The network of claim 7 wherein the first and second queues each include at least two storage positions.

13. The network of claim 7 wherein the input ports each include a bus having one lead for each data bit.

14. The network of claim 13 wherein the input ports include control signal leads.

15. The network of claim 11 wherein:
each of the second plurality of routers includes:
 a first demultiplexer having an input configured to receive data and m outputs;
 n first queues, each first queue having an input and an output, the input of the first queue configured to receive data from respective ones of the m outputs of the first demultiplexer of the router of the second plurality of routers; and
 a multiplexer having n inputs and an output, each input of the multiplexer configured to receive data from an output of one of the n first queues of the router of the second plurality of routers; and
each of the third plurality of routers includes:
 a second demultiplexer for each of the second plurality of routers, each second demultiplexer having an input and m outputs, the input of the second demultiplexer configured to receive data from the output of the multiplexer of one of the second plurality of routers; and
 n second queues, each second queue having an input configured to receive data from a respective one of the m outputs of the second demultiplexer and an output configured to provide data on respective ones of the m outputs; and
each of the n first queues of the router of the second plurality of routers does not provide output data to the multiplexer of the router of the second plurality of routers until a credit signal is provided from a corresponding one of the n second queues indicating that space is available in the corresponding one of the n second queues to store the output data.

16. The network of claim 15 wherein each of the n second queues of the second plurality of routers is configured to not provide output data to the input port of one of the third plurality of routers until a credit signal is provided from a corresponding one of the first queues of the one of the third plurality of routers indicating that space is available in the corresponding one of the first queues of the one of the third plurality of routers to store the output data.

17. The network as in claim 7 wherein at least one of the third plurality of routers is collocated with one or more of the first plurality of routers.

18. The network as in claim 7 wherein each of the third plurality of routers is collocated with a corresponding one of the first plurality of routers and further includes a local bus between the one of the third plurality of routers and the corresponding one of the first plurality of routers.

19. The network as in claim 7 wherein each of the third plurality of routers is collocated with a corresponding one of the first plurality of routers and is connected to the endpoints to which the corresponding one of the first plurality of routers is connected.

20. The network as in claim 7 further comprising a memory connected to at least one of the second plurality of routers.

21. A router, comprising:
n input ports, each input port of the n input ports being configured to connect to a respective interposer of a plurality of n interposers, each interposer serving an endpoint and including:
 a first demultiplexer having an input and m outputs, the input of the first demultiplexer configured to receive data from the endpoint served by the interposer;
 m first queues, each first queue having an input and an output, the input of the first queue configured to receive data from respective outputs of the m outputs of the first demultiplexer; and
 a multiplexer having m inputs and an output, each input of the multiplexer configured to receive data from an output of a first queue of the m first queues;
m second queues; and
m output ports;
wherein: each input port of the n input ports is configured to connect to a separate second demultiplexer for each interposer, each separate second demultiplexer configured to receive data from the output of the multiplexer of a respective interposer of the n interposers; and each second queue of the m second queues has an input and an output, the input configured to receive data from a respective first queue of the m first queues on a respective output of the m outputs of a respective second demultiplexer and an output.

* * * * *